US010715280B2

(12) United States Patent
Hu et al.

(10) Patent No.: US 10,715,280 B2
(45) Date of Patent: Jul. 14, 2020

(54) METHOD AND APPARATUS FOR DETERMINING A FEEDBACK TIME SEQUENCE, AND DEVICE AND STORAGE MEDIUM

(71) Applicants: CHINA MOBILE COMMUNICATION LTD., RESEARCH INSTITUTE, Beijing (CN); CHINA MOBILE COMMUNICATIONS CORPORATION, Beijing (CN)

(72) Inventors: Lijie Hu, Beijing (CN); Xueying Hou, Beijing (CN); Xiaodong Shen, Beijing (CN); Jing Dong, Beijing (CN)

(73) Assignees: China Mobile Comm. Co., Ltd. Research Institute, Beijing (CN); China Mobile Communications Corporation, Beijing (CN)

( * ) Notice: Subject to any disclaimer, the term of this patent is extended or adjusted under 35 U.S.C. 154(b) by 11 days.

(21) Appl. No.: 16/300,946

(22) PCT Filed: May 12, 2017

(86) PCT No.: PCT/CN2017/084245
§ 371 (c)(1),
(2) Date: Nov. 12, 2018

(87) PCT Pub. No.: WO2017/194015
PCT Pub. Date: Nov. 16, 2017

(65) Prior Publication Data

US 2019/0296863 A1 Sep. 26, 2019

(30) Foreign Application Priority Data

May 12, 2016 (CN) .......................... 2016 1 0319419

(51) Int. Cl.
*H04L 1/18* (2006.01)
*H04L 5/14* (2006.01)
(Continued)

(52) U.S. Cl.
CPC .......... *H04L 1/1812* (2013.01); *H04L 1/1854* (2013.01); *H04L 5/14* (2013.01);
(Continued)

(58) Field of Classification Search
CPC .. H04W 28/04; H04W 72/042; H04L 1/1854; H04L 5/14
See application file for complete search history.

(56) References Cited

U.S. PATENT DOCUMENTS 9,729,295 B2 * 8/2017 Zhang .................. H04L 5/0053
2011/0211503 A1 9/2011 Che
(Continued)

FOREIGN PATENT DOCUMENTS

CN 101414900 A 4/2009
CN 101888661 A 11/2010
(Continued)

OTHER PUBLICATIONS

Supplementary European Search Report in the European application No. 17795633.1, dated May 24, 2019.
(Continued)

*Primary Examiner* — Wei Zhao
(74) *Attorney, Agent, or Firm* — Syncoda LLC; Feng Ma

(57) ABSTRACT

Method and apparatus are provided for determining a feedback time sequence of a hybrid automatic repeat request. The method includes: determining a configuration of a currently used TDD frame structure, wherein the configuration of the TDD frame structure comprises uplink and downlink configurations and a special sub-frame ratio; determining the size of a currently used transmission time
(Continued)

0 1 2 3 4 5 6 7 8 9
Tx
Rx
ACK/NACK interval (TTI); and according to the configuration of the TDD frame structure and the size of the TTI, determining a relative position relationship between a data transmission TTI and a feedback TTI thereof in a HARQ process, or a relative position relationship between an initial transmission TTI, a feedback TTI and a retransmission TTI. A communication device and a storage medium are also provided.

19 Claims, 17 Drawing Sheets

(51) Int. Cl.
*H04W 72/04* (2009.01)
*H04W 28/04* (2009.01)

(52) U.S. Cl.
CPC ......... *H04W 28/04* (2013.01); *H04W 72/042* (2013.01); *H04W 72/0446* (2013.01)

(56) References Cited

U.S. PATENT DOCUMENTS

| | | | | |
|---|---|---|---|---|
| 2012/0269179 | A1 | 10/2012 | Li | |
| 2017/0155495 | A1 | 6/2017 | Che et al. | |
| 2017/0288841 | A1* | 10/2017 | Park | H04W 72/14 |
| 2019/0109677 | A1* | 4/2019 | Wang | H04L 5/0057 |

FOREIGN PATENT DOCUMENTS

| | | | |
|---|---|---|---|
| CN | 102447538 | A | 5/2012 |
| CN | 102752089 | A | 10/2012 |
| CN | 2709299 | A2 | 3/2014 |
| WO | 2015172363 | A1 | 11/2015 |

OTHER PUBLICATIONS

CMCC: "Discussion on HARQ timing design for reduced TTI", 3GPP Draft; R1-162866, 3rd Generation Partnership Project (3GPP), Mobile Competence Centre; 650, Route Des Lucioles; F-06921 Sophia-Antipolis Cedex; France, vol. RAN WG1, No. Busan, Korea; 20160411-0160411 Apr. 2, 2016 (Apr. 2, 2016), XP051080392.

International Search Report in international application No. PCT/CN2017/084245, dated Aug. 3, 2017.

English Translation of the Written Opinion of the International Search Authority in international application No. PCT/CN2017/084245, dated Aug. 3, 2017.

3GPP., "3GPP TS 36.211 V 13.1.0". 3GPP Technical Specification, Mar. 29, 2016 (Mar. 29, 2016), the whole document.

"3GPP TSG-RAN WG1 #51 R1-074822". Special Subframe Design for Optimized TDD Type 2, Nov. 9, 2007 (Sep. 11, 2007),the whole document.

Wenwen Xu et al.: "Research on downlink HARQ in TD-LTE systems ", issued on May 31, 2013.

* cited by examiner

| Subframe | 0 | | 1 | | 2 | | 3 | | 4 | | 5 | | 6 | | 7 | | 8 | | 9 | |
|---|---|---|---|---|---|---|---|---|---|---|---|---|---|---|---|---|---|---|---|---|
| | ↓ | | ♦ | | ↑ | | ↑ | | ↑ | | ↓ | | ♦ | | ↑ | | ↑ | | ↑ | |
| 0.5ms TTI | 0 | 1 | 2 | 3 | 4 | 5 | 6 | 7 | 8 | 9 | 10 | 11 | 12 | 13 | 14 | 15 | 16 | 17 | 18 | 19 |
| Special subframe configuration 0 | ↓ | ↓ | 3:4:0 | 0:6:1 | ↑ | ↑ | ↑ | ↑ | ↑ | ↑ | ↓ | ↓ | 3:4:0 | 0:6:1 | ↑ | ↑ | ↑ | ↑ | ↑ | ↑ |
| Special subframe configuration 1 | ↓ | ↓ | ↓ | 2:4:1 | ↑ | ↑ | ↑ | ↑ | ↑ | ↑ | ↓ | ↓ | ↓ | 2:4:1 | ↑ | ↑ | ↑ | ↑ | ↑ | ↑ |
| Special subframe configuration 2 | ↓ | ↓ | ↓ | 3:3:1 | ↑ | ↑ | ↑ | ↑ | ↑ | ↑ | ↓ | ↓ | ↓ | 3:3:1 | ↑ | ↑ | ↑ | ↑ | ↑ | ↑ |
| Special subframe configuration 3 | ↓ | ↓ | ↓ | 4:2:1 | ↑ | ↑ | ↑ | ↑ | ↑ | ↑ | ↓ | ↓ | ↓ | 4:2:1 | ↑ | ↑ | ↑ | ↑ | ↑ | ↑ |
| Special subframe configuration 4 | ↓ | ↓ | ↓ | 5:1:1 | ↑ | ↑ | ↑ | ↑ | ↑ | ↑ | ↓ | ↓ | ↓ | 5:1:1 | ↑ | ↑ | ↑ | ↑ | ↑ | ↑ |
| Special subframe configuration 5 | ↓ | ↓ | 3:4:0 | 0:5:2 | ↑ | ↑ | ↑ | ↑ | ↑ | ↑ | ↓ | ↓ | 3:4:0 | 0:5:2 | ↑ | ↑ | ↑ | ↑ | ↑ | ↑ |
| Special subframe configuration 6 | ↓ | ↓ | ↓ | 2:3:2 | ↑ | ↑ | ↑ | ↑ | ↑ | ↑ | ↓ | ↓ | ↓ | 2:3:2 | ↑ | ↑ | ↑ | ↑ | ↑ | ↑ |
| Special subframe configuration 7 | ↓ | ↓ | ↓ | 3:2:2 | ↑ | ↑ | ↑ | ↑ | ↑ | ↑ | ↓ | ↓ | ↓ | 3:2:2 | ↑ | ↑ | ↑ | ↑ | ↑ | ↑ |
| Special subframe configuration 8 | ↓ | ↓ | ↓ | 4:1:2 | ↑ | ↑ | ↑ | ↑ | ↑ | ↑ | ↓ | ↓ | ↓ | 4:1:2 | ↑ | ↑ | ↑ | ↑ | ↑ | ↑ |
| Special subframe configuration 9 | ↓ | ↓ | 6:1:0 | 0:5:2 | ↑ | ↑ | ↑ | ↑ | ↑ | ↑ | ↓ | ↓ | 6:1:0 | 0:5:2 | ↑ | ↑ | ↑ | ↑ | ↑ | ↑ |
| Special subframe configuration 10 | ↓ | ↓ | 6:1:0 | 0:1:6 | ↑ | ↑ | ↑ | ↑ | ↑ | ↑ | ↓ | ↓ | 6:1:0 | 0:1:6 | ↑ | ↑ | ↑ | ↑ | ↑ | ↑ |

FIG. 4

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| | | ◆ | ◆ | | | | | | | | | ◆ | ◆ | | | | | | |
| 10 | | | | 10 | | | | | | 10 | | | | 10 | | | | | |
| | 11 | | | | 11 | | | | | | 11 | | | | 11 | | | | |
| | | 12 | | | | 12 | | | | | | 12 | | | | 12 | | | |

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| | | ◆ | ◆ | | | | | | | | | ◆ | ◆ | | | | | | |
| 10 | | | | 10 | | | | | | 10 | | | | 10 | | | | | |
| | 11 | | | | 11 | | | | | | 11 | | | | 11 | | | | |
| | | 12 | | | | 12 | | | | | | 12 | | | | 12 | | | |

FIG. 5A

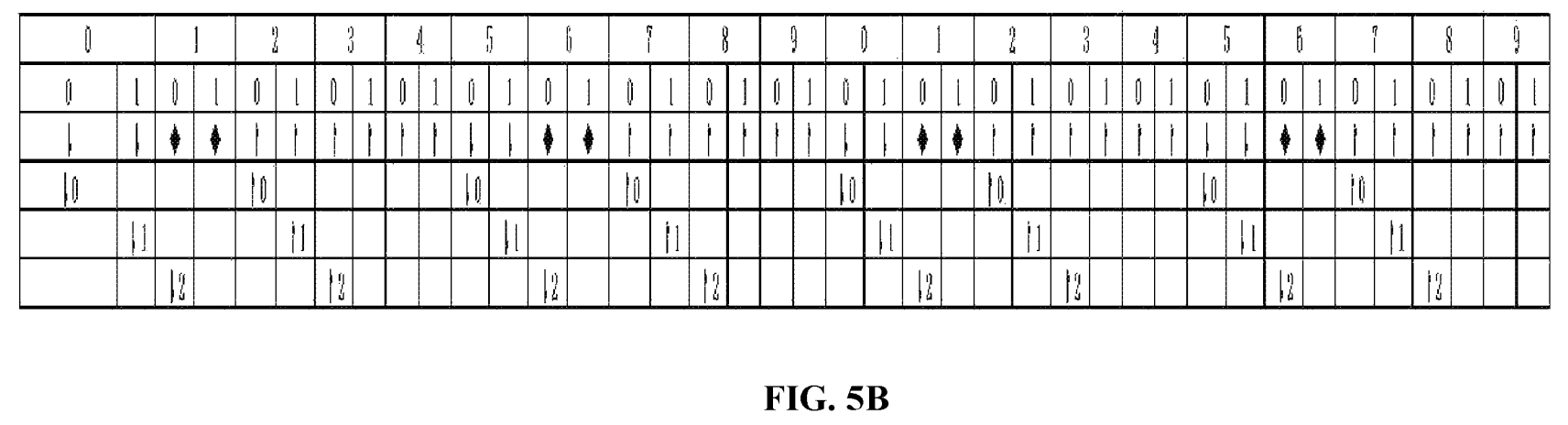

| 0 |  | 1 |  | 2 |  | 3 |  | 4 |  | 5 |  | 6 |  | 7 |  | 8 |  | 9 |  | 0 |  | 1 |  | 2 |  | 3 |  | 4 |  | 5 |  | 6 |  | 7 |  | 8 |  | 9 |  |
|---|---|---|---|---|---|---|---|---|---|---|---|---|---|---|---|---|---|---|---|---|---|---|---|---|---|---|---|---|---|---|---|---|---|---|---|---|---|---|---|
| 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| ↓ | ↓ | ◆ | ◆ | ↑ | ↑ | ↑ | ↑ | ↑ | ↑ | ↓ | ↓ | ◆ | ◆ | ↑ | ↑ | ↑ | ↑ | ↑ | ↑ | ↓ | ↓ | ◆ | ◆ | ↑ | ↑ | ↑ | ↑ | ↑ | ↑ | ↓ | ↓ | ◆ | ◆ | ↑ | ↑ | ↑ | ↑ | ↑ | ↑ |
| I0 |  |  |  | I0 |  |  |  |  |  | I0 |  |  |  | I0 |  |  |  |  |  | I0 |  |  |  | I0 |  |  |  |  |  | I0 |  |  |  | I0 |  |  |  |  |  |
|  | I1 |  |  |  | I1 |  |  |  |  |  | I1 |  |  |  | I1 |  |  |  |  |  | I1 |  |  |  | I1 |  |  |  |  |  | I1 |  |  |  | I1 |  |  |  |  |
|  |  | I2 |  |  |  | I2 |  |  |  |  |  | I2 |  |  |  | I2 |  |  |  |  |  | I2 |  |  |  | I2 |  |  |  |  |  | I2 |  |  |  | I2 |  |  |  |

FIG. 5B

| UL/DL configuration 0, and subframe of 1 ms | 0 | | | | 1 | | | | 2 | | | | 3 | | | | 4 | | | | 5 | | | | 6 | | | | 7 | | | | 8 | | | | 9 | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| | ↓ | | | | ◆ | | | | ↑ | | | | ↑ | | | | ↑ | | | | ↓ | | | | ◆ | | | | ↑ | | | | ↑ | | | | ↑ | | | |
| 4/3 OS TTI | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 |
| Special subframe configuration 0 | ↓ | ↓ | ↓ | ↓ | 3:1:0 | ◆ | ◆ | 0:2:1 | ↑ | ↑ | ↑ | ↑ | ↑ | ↑ | ↑ | ↑ | ↑ | ↑ | ↑ | ↑ | ↓ | ↓ | ↓ | ↓ | 3:1:0 | ◆ | ◆ | 0:2:1 | ↑ | ↑ | ↑ | ↑ | ↑ | ↑ | ↑ | ↑ | ↑ | ↑ | ↑ | ↑ |
| Special subframe configuration 1 | ↓ | ↓ | ↓ | ↓ | ↓ | ↓ | 2:2:0 | 0:2:1 | ↑ | ↑ | ↑ | ↑ | ↑ | ↑ | ↑ | ↑ | ↑ | ↑ | ↑ | ↑ | ↓ | ↓ | ↓ | ↓ | ↓ | ↓ | 2:2:0 | 0:2:1 | ↑ | ↑ | ↑ | ↑ | ↑ | ↑ | ↑ | ↑ | ↑ | ↑ | ↑ | ↑ |
| Special subframe configuration 2 | ↓ | ↓ | ↓ | ↓ | ↓ | ↓ | 3:1:0 | 0:2:1 | ↑ | ↑ | ↑ | ↑ | ↑ | ↑ | ↑ | ↑ | ↑ | ↑ | ↑ | ↑ | ↓ | ↓ | ↓ | ↓ | ↓ | ↓ | 3:1:0 | 0:2:1 | ↑ | ↑ | ↑ | ↑ | ↑ | ↑ | ↑ | ↑ | ↑ | ↑ | ↑ | ↑ |
| Special subframe configuration 3 | ↓ | ↓ | ↓ | ↓ | ↓ | ↓ | ↓ | 0:2:1 | ↑ | ↑ | ↑ | ↑ | ↑ | ↑ | ↑ | ↑ | ↑ | ↑ | ↑ | ↑ | ↓ | ↓ | ↓ | ↓ | ↓ | ↓ | ↓ | 0:2:1 | ↑ | ↑ | ↑ | ↑ | ↑ | ↑ | ↑ | ↑ | ↑ | ↑ | ↑ | ↑ |
| Special subframe configuration 4 | ↓ | ↓ | ↓ | ↓ | ↓ | ↓ | ↓ | 1:1:1 | ↑ | ↑ | ↑ | ↑ | ↑ | ↑ | ↑ | ↑ | ↑ | ↑ | ↑ | ↑ | ↓ | ↓ | ↓ | ↓ | ↓ | ↓ | ↓ | 1:1:1 | ↑ | ↑ | ↑ | ↑ | ↑ | ↑ | ↑ | ↑ | ↑ | ↑ | ↑ | ↑ |
| Special subframe configuration 5 | ↓ | ↓ | ↓ | ↓ | 3:1:0 | ◆ | ◆ | 0:1:2 | ↑ | ↑ | ↑ | ↑ | ↑ | ↑ | ↑ | ↑ | ↑ | ↑ | ↑ | ↑ | ↓ | ↓ | ↓ | ↓ | 3:1:0 | ◆ | ◆ | 0:1:2 | ↑ | ↑ | ↑ | ↑ | ↑ | ↑ | ↑ | ↑ | ↑ | ↑ | ↑ | ↑ |
| Special subframe configuration 6 | ↓ | ↓ | ↓ | ↓ | ↓ | ↓ | 2:2:0 | 0:1:2 | ↑ | ↑ | ↑ | ↑ | ↑ | ↑ | ↑ | ↑ | ↑ | ↑ | ↑ | ↑ | ↓ | ↓ | ↓ | ↓ | ↓ | ↓ | 2:2:0 | 0:1:2 | ↑ | ↑ | ↑ | ↑ | ↑ | ↑ | ↑ | ↑ | ↑ | ↑ | ↑ | ↑ |
| Special subframe configuration 7 | ↓ | ↓ | ↓ | ↓ | ↓ | ↓ | 3:1:0 | 0:1:2 | ↑ | ↑ | ↑ | ↑ | ↑ | ↑ | ↑ | ↑ | ↑ | ↑ | ↑ | ↑ | ↓ | ↓ | ↓ | ↓ | ↓ | ↓ | 3:1:0 | 0:1:2 | ↑ | ↑ | ↑ | ↑ | ↑ | ↑ | ↑ | ↑ | ↑ | ↑ | ↑ | ↑ |
| Special subframe configuration 8 | ↓ | ↓ | ↓ | ↓ | ↓ | ↓ | ↓ | 0:1:2 | ↑ | ↑ | ↑ | ↑ | ↑ | ↑ | ↑ | ↑ | ↑ | ↑ | ↑ | ↑ | ↓ | ↓ | ↓ | ↓ | ↓ | ↓ | ↓ | 0:1:2 | ↑ | ↑ | ↑ | ↑ | ↑ | ↑ | ↑ | ↑ | ↑ | ↑ | ↑ | ↑ |
| Special subframe configuration 9 | ↓ | ↓ | ↓ | ↓ | ↓ | 2:1:0 | ◆ | 0:1:2 | ↑ | ↑ | ↑ | ↑ | ↑ | ↑ | ↑ | ↑ | ↑ | ↑ | ↑ | ↑ | ↓ | ↓ | ↓ | ↓ | ↓ | 2:1:0 | ◆ | 0:1:2 | ↑ | ↑ | ↑ | ↑ | ↑ | ↑ | ↑ | ↑ | ↑ | ↑ | ↑ | ↑ |
| Special subframe configuration 10 | ↓ | ↓ | ↓ | ↓ | ↓ | 2:1:0 | 0:1:3 | ↑ | ↑ | ↑ | ↑ | ↑ | ↑ | ↑ | ↑ | ↑ | ↑ | ↑ | ↑ | ↑ | ↓ | ↓ | ↓ | ↓ | ↓ | 2:1:0 | 0:1:3 | ↑ | ↑ | ↑ | ↑ | ↑ | ↑ | ↑ | ↑ | ↑ | ↑ | ↑ | ↑ | ↑ |

FIG. 6

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|---|---|---|---|---|---|---|---|---|---|---|---|---|---|---|---|---|---|---|
| ↓ | ↓ | ↓ | ↓ | | ◆ | ◆ | | ↑ | ↑ | ↑ | ↑ | ↑ | ↑ | ↑ | ↑ | ↑ | ↑ | ↑ | ↑ | ↓ | ↓ | ↓ | ↓ | | ◆ | ◆ | | ↑ | ↑ | ↑ | ↑ | ↑ | ↑ | ↑ | ↑ | ↑ | ↑ | ↑ | ↑ |
| ↓10 | | | | | | | ↑10 | | | | | | | | | | | | | ↓10 | | | | | | | ↑10 | | | | | | | | | | | | |
| | ↓11 | | | | | | ▲11 | ↑11 | | | | | | | | | | | | | ↓11 | | | | | | ▲11 | ↑11 | | | | | | | | | | | |
| | | ↓12 | | | | | ▲12 | | ↑12 | | | | | | | | | | | | | ↓12 | | | | | ▲12 | | ↑12 | | | | | | | | | | |
| | | | ↓13 | | | | ▲13 | | | ↑13 | | | | | | | | | | | | | ↓13 | | | | ▲13 | | | ↑13 | | | | | | | | | |
| | | | | ↓14 | | | | ▲14 | | | ↑14 | | | | | | | | | | | | | ↓14 | | | | ▲14 | | | ↑14 | | | | | | | | |

FIG. 8A

| 1ms Subframe | 0 | | | | | | | 1 | | | | | | | 2 | | | | | | | 3 | | | | | | | 4 | | | | | | |
|---|---|---|---|---|---|---|---|---|---|---|---|---|---|---|---|---|---|---|---|---|---|---|---|---|---|---|---|---|---|---|---|---|---|---|---|
| | ↓ | | | | | | | ◆ | | | | | | | ↑ | | | | | | | ↑ | | | | | | | ↑ | | | | | | |
| 2 OS TTI | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 |
| Special subframe configuration 0 | ↓ | ↓ | ↓ | ↓ | ↓ | ↓ | ↓ | ↓ | 1:1:0 | | | | | 0:1:1 | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ |
| Special subframe configuration 1 | ↓ | ↓ | ↓ | ↓ | ↓ | ↓ | ↓ | ↓ | ↓ | ↓ | ↓ | 1:1:0 | | 0:1:1 | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ |
| Special subframe configuration 2 | ↓ | ↓ | ↓ | ↓ | ↓ | ↓ | ↓ | ↓ | ↓ | ↓ | ↓ | ↓ | | 0:1:1 | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ |
| Special subframe configuration 3 | ↓ | ↓ | ↓ | ↓ | ↓ | ↓ | ↓ | ↓ | ↓ | ↓ | ↓ | ↓ | 1:1:0 | 0:1:1 | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ |
| Special subframe configuration 4 | ↓ | ↓ | ↓ | ↓ | ↓ | ↓ | ↓ | ↓ | ↓ | ↓ | ↓ | ↓ | ↓ | 0:1:1 | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ |
| Special subframe configuration 5 | ↓ | ↓ | ↓ | ↓ | ↓ | ↓ | ↓ | ↓ | 1:1:0 | | | | | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ |
| Special subframe configuration 6 | ↓ | ↓ | ↓ | ↓ | ↓ | ↓ | ↓ | ↓ | ↓ | ↓ | ↓ | 1:1:0 | | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ |
| Special subframe configuration 7 | ↓ | ↓ | ↓ | ↓ | ↓ | ↓ | ↓ | ↓ | ↓ | ↓ | ↓ | ↓ | | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ |
| Special subframe configuration 8 | ↓ | ↓ | ↓ | ↓ | ↓ | ↓ | ↓ | ↓ | ↓ | ↓ | ↓ | ↓ | 1:1:0 | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ |
| Special subframe configuration 9 | ↓ | ↓ | ↓ | ↓ | ↓ | ↓ | ↓ | ↓ | ↓ | ↓ | | | | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ |
| Special subframe configuration 10 | ↓ | ↓ | ↓ | ↓ | ↓ | ↓ | ↓ | ↓ | ↓ | ↓ | | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ |

FIG. 9

| First radio frame | | | | | | | | | | | | | | | | | | | | Second radio frame··· | | | | | |
|---|---|---|---|---|---|---|---|---|---|---|---|---|---|---|---|---|---|---|---|---|---|---|---|---|---|
| First downlink-to-uplink switch-point periodicity | | | | | | | | | | Second downlink-to-uplink switch-point periodicity | | | | | | | | | | Third downlink-to-uplink switch-point periodicity··· | | | | | |
| 0 | | 1 | | 2 | | 3 | | 4 | | 5 | | 6 | | 7 | | 8 | | 9 | | 0 | | 1 | | 2 | |
| 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 0 | 1 | 2 | 3 | 4 | 5 | 6 | 7 | 8 | 9 | 10 | 11 | 12 | 13 | 14 | 15 | 16 | 17 | 18 | 19 | 0 | 1 | 2 | 3 | 4 | 5 |
| ↓ | ↓ | | | ↑ | ↑ | ↓ | ↓ | ↓ | ↓ | ↓ | ↓ | | | ↑ | ↑ | ↓ | ↓ | ↓ | ↓ | ↓ | ↓ | | | ↑ | ↑ |
| ↓0 | | | | ▲0 | ↑0 | | | | | | | | | | | ↓0 | | | | | | | | ↑0 | |
| | ↓1 | | | | ↑1 | | | | | | | | | | | | ↓1 | | | | | | | ↑1 | |
| | | ↓2 | | | | | | | | | | | | ↑2 | | | | ↓2 | | | | | | ↑2 | |
| | | | | | | ↓3 | | | | | | | | ↑3 | | | | | ↓3 | | | | | ▲3 | ↑3 |
| | | | | | | | ↓4 | | | | | | | ↑4 | | | | | | ↓4 | | | | ▲4 | ↑4 |
| | | | | | | | | ↓5 | | | | | | ↑5 | | | | | | | ↓5 | | | | ↑5 |
| | | | | | | | | | ↓6 | | | | | ▲6 | ↑6 | | | | | | | ↓6 | | | |
| | | | | | | | | | | ↓7 | | | | ▲7 | ↑7 | | | | | | | | | | |
| | | | | | | | | | | | ↓8 | | | | ↑8 | | | | | | | | | | |
| | | | | | | | | | | | | ↓9 | | | | | | | | | | | | ↑9 | |

FIG. 12

METHOD AND APPARATUS FOR DETERMINING A FEEDBACK TIME SEQUENCE, AND DEVICE AND STORAGE MEDIUM

CROSS-REFERENCE TO RELATED APPLICATIONS

The present application is based upon and claims benefit of Chinese Patent Application No. 2016103194192, filed on May 12, 2016, the contents of which are hereby incorporated by reference in its entirety.

TECHNICAL FIELD

The disclosure relates to the technical field of wireless communications, and in particular to a method and device for determining a Hybrid Automatic Repeat Request (HARQ) feedback timing, and a piece of communication equipment and a computer storage medium.

BACKGROUND

An HARQ is a combination of an Automatic Repeat Request (ARQ) and a Forward Error Correction (FEC), and is a means of LTE system link adaptation.

An LTE system adopts a stop-and-wait HARQ protocol of N channels, that is, N processes exist simultaneously, and each process adopts a stop-and-wait ARQ protocol for transmission. After sending a data packet, a transmitting end stops temporarily to wait for an Acknowledgement (ACK) message of a receiving end; when data reaches the receiving end, the reaching end checks the data; and if the received data is correct, the receiving end feeds back an ACK message to the transmitting end; or else, the receiving end feeds back a Negative Acknowledgement (NACK) message to the transmitting end. The transmitting end sends new data after receiving an ACK signal, otherwise the transmitting end retransmits the last data packet. The parallel N processes are in the stop-and-wait process, and other processes may use channel resources for transmission.

The minimum Round Trip Time (RTT) of the HARQ is defined as the completion time of a data packet transmission process, including a process in which the data packet is sent; the receiving end receives and processes the data packet, and then feeds back the ACK/NACK message; and after receiving and demodulating the ACK/NACK signal, the transmitting end determines to retransmit data or send a new data packet. For a Frequency Division Duplex (FDD) frame structure, uplink and downlink transmissions are always continuous, and ACK/NACK signal feedback or data retransmission may be performed in a fixed subframe. For a Time Division Duplex (TDD) frame structure, since the uplink and downlink transmissions are in time division multiplexing, it is impossible to find for each subframe feedback time intervals which are fixed and the same. For different uplink/downlink configurations of TDD and different subframes, the time intervals of ACK/NACK feedback and retransmission are different.

With the development of communication services, a service requirement of lower latency requires a communication system to support a data transmission of lower delay, and a shorter Transmission Time Interval (TTI) becomes a major way of implementing a low-delay transmission. So, it is urgently needed to redefine an HARQ feedback timing for a downlink Physical Downlink Shared Channel (PDSCH) transmission or a Physical Downlink Control Channel (PDCCH)/Enhanced Physical Downlink Control Channel (EPDCCH) indicating a Semi-Persistent Scheduling (SPS) release in the case of a variety of shorter TTIs, so that an HARQ feedback time association in the case of the shorter TTIs may be determined.

SUMMARY

The technical problem to be solved by embodiments of the disclosure is to provide a method and device for determining an HARQ feedback timing, and a piece of communication equipment and a computer storage medium, for determining HARQ feedback timing in the case of different TTIs.

The method for determining an HARQ feedback timing provided by the embodiments of the disclosure includes that:

a configuration of a currently-used TDD frame structure is determined;

a length of a currently-used TTI is determined; and according to the configuration of the TDD frame structure and the length of the TTI, a relative position association between a data transmission TTI and a feedback TTI of the data transmission TTI in an HARQ process, or a relative position association between an initial transmission TTI, a feedback TTI and a retransmission TTI in an HARQ process is determined.

The device for determining an HARQ feedback timing provided by the embodiments of the disclosure includes:

a configuration determining unit, which is configured to determine a configuration of a currently-used TDD frame structure; the configuration of the TDD frame structure includes uplink-downlink configurations and a special subframe configuration;

a TTI determining unit, which is configured to determine a length of a currently-used TTI; and a position determining unit, which is configured to determine, according to the configuration of the TDD frame structure and the length of the TTI, a relative position association between a data transmission TTI and a feedback TTI of the data transmission TTI in an HARQ process, or a relative position association between an initial transmission TTI, a feedback TTI and a retransmission TTI in an HARQ process.

The embodiments of the disclosure also provide a piece of communication equipment, which includes:

a memory, which is configured to store a computer program; and a processor, which is connected with the memory, and is configured to execute the above method for determining an HARQ feedback timing by executing the computer program.

The fourth aspect of the embodiments of the disclosure provides a computer storage medium, in which computer executable instructions are stored, wherein the computer executable instructions are used for executing the above method for determining an HARQ feedback timing.

Compared with the related art, the method and device for determining an HARQ feedback timing, and the communication equipment and the storage medium provided by the embodiments of the disclosure may determine, aiming at different uplink-downlink configurations and special subframe configurations of the TDD, the number of HARQ processes corresponding to the TTIs with different lengths under the condition that the interval between the feedback TTI and the initial transmission TTI is greater than a first threshold, and the interval between the feedback TTI and the retransmission TTI is greater than a second threshold, and may obtain the HARQ feedback timing in this case, thereby providing a support for the low-delay transmission. Moreover, the embodiments of the disclosure may provide the HARQ feedback timing for the above shorter threshold, thereby realizing the faster low-delay transmission. Moreover, the embodiments of the disclosure may also carry the HARQ feedbacks on all the feedback TTIs as evenly as possible, so as to avoid a certain feedback TTI/some feedback TTIs from carrying too much information.

BRIEF DESCRIPTION OF DRAWINGS

FIG. 4 is a schematic diagram of a TTI whose length is 0.5 ms in the case of TDD uplink-downlink configuration 0 and different special subframe configurations according to an embodiment of the disclosure.

FIG. 5A and FIG. 5B are respectively schematic diagram 1 and schematic diagram 2 of an HARQ feedback timing of the TTI whose length is 0.5 ms in the case of TDD uplink-downlink configuration 0 and special subframe configurations 0, 5, 9 and 10 according to embodiments of the disclosure.

FIG. 6 is a schematic diagram of the TTI whose length is four/three OSs in the case of TDD uplink-downlink configuration 0 and different special subframe configurations according to an embodiment of the disclosure.

FIG. 8A and FIG. 8B are respectively schematic diagram 1 and schematic diagram 2 of an HARQ feedback timing of the TTI whose length is four/three OSs in situation 2 and in the case of TDD uplink-downlink configuration 0 and special subframe configuration s 0 and 5 according to embodiments of the disclosure.

FIG. 9 is a schematic diagram of the TTI whose length is two OSs in the case of TDD uplink-downlink configuration 0 and different special subframe configurations according to an embodiment of the disclosure.

FIG. 12 is a schematic diagram of distributing the HARQ feedbacks evenly on all the feedback TTIs based on a second constraint condition according to an embodiment of the disclosure.

DETAILED DESCRIPTION

Figure 1:
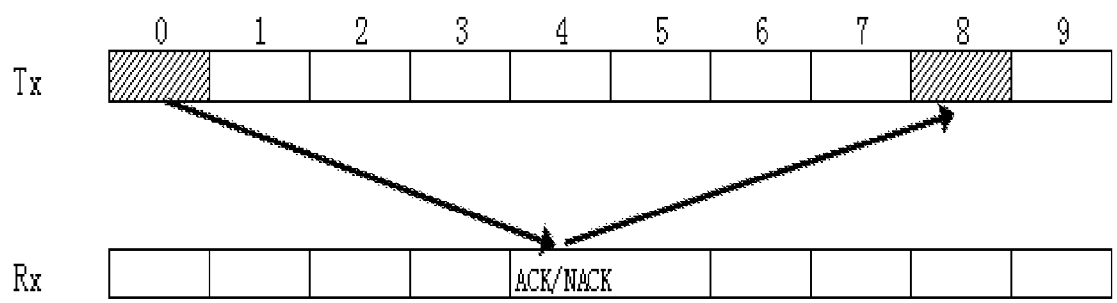
FIG. 1 is a schematic diagram of an HARQ feedback of the FDD according to the related art.

For making the technical problems to be solved by the disclosure, the technical solutions and the advantages of the disclosure more clear, an elaboration is given below in combination with the accompanying drawings and specific embodiments. In the description below, providing specific details of optional configurations and components is only for facilitating comprehensive understanding of the embodiments of the disclosure. So, those skilled in the art should understand that various changes and modifications may be made for the embodiments described here without departing from the scope and spirit of the disclosure. Moreover, for clarity and conciseness, descriptions of the known functions and structures are omitted.

It should be understood that "one embodiment" or "an embodiment" mentioned throughout the specification means that specific features, structures or characteristics related to the embodiments are included in at least one embodiment of the disclosure. So, "in one embodiment" or "in an embodiment" mentioned throughout the entire specification is not necessarily the same embodiment. Moreover, these specific features, structures or characteristics may be combined in one or more than one embodiment in any proper way.

In a variety of embodiments of the disclosure, it should be understood that the serial numbers of processes do not mean an execution sequence. The execution sequence of each process should be determined according to its function and inherent logic, but should not form any limit to the implementation process of the embodiments of the disclosure.

Moreover, the terms "system" and "network" in this application are often used interchangeably.

It should be understood that the term "and/or" in this application is only an association relationship describing associated objects, representing there possible relationships; for example, A and/or B may represent three situations where A exists alone, A and B exist simultaneously, and B exists alone. In the embodiments provided by this application, it should be understood that "B corresponding to A" indicates that B is associated with A, and B may be determined according to A. However, it should also be understood that determining B according to A does not mean that B is determined only according to A, but may also be determined according to A and/or other information.

A method for determining an HARQ feedback timing provided by the embodiments of the disclosure is applied to an LTE system adopting a TDD frame structure. It should be understood that the HARQ in this application may be an HARQ feedback aiming at downlink data, then the HARQ feedback is transmitted on an uplink TTI. The HARQ may also be the HARQ feedback aiming at uplink data, then the HARQ feedback is transmitted on a downlink TTI.

In this application, a transmission TTI is the TTI for transmitting data; the data may be the uplink data or the downlink data. The transmission TTI has a transmission direction, for example, an uplink direction or a downlink direction. The subsequent numbering processing in this application is numbering the TTIs in the same transmission direction. In this application, when being used for transmitting data, the transmission TTI is also called a data transmission TTI. A feedback TTI is the TTI for feeding back control information of transmitted data on the data transmission TTI; the control information may be ACK/NACK information. For example, by taking a downlink transmission for example, the transmission TTI may transmit the data on the PDSCH or the PDCCH/EPDCCH indicating the SPS release, and the feedback TTI corresponding to the transmission TTI may transmit ACK/NACK feedback information. Because the same data needs to be retransmitted, in this application, the transmission TTI for initially transmitting data may also be called an initial transmission TTI, then the feedback TTI is the TTI for feeding back the control information of the transmitted data on the initial transmission TTI. Alternatively, when it is needed to retransmit data, the transmission TTI for retransmitting the data is called a retransmission TTI.

Figure 2A:
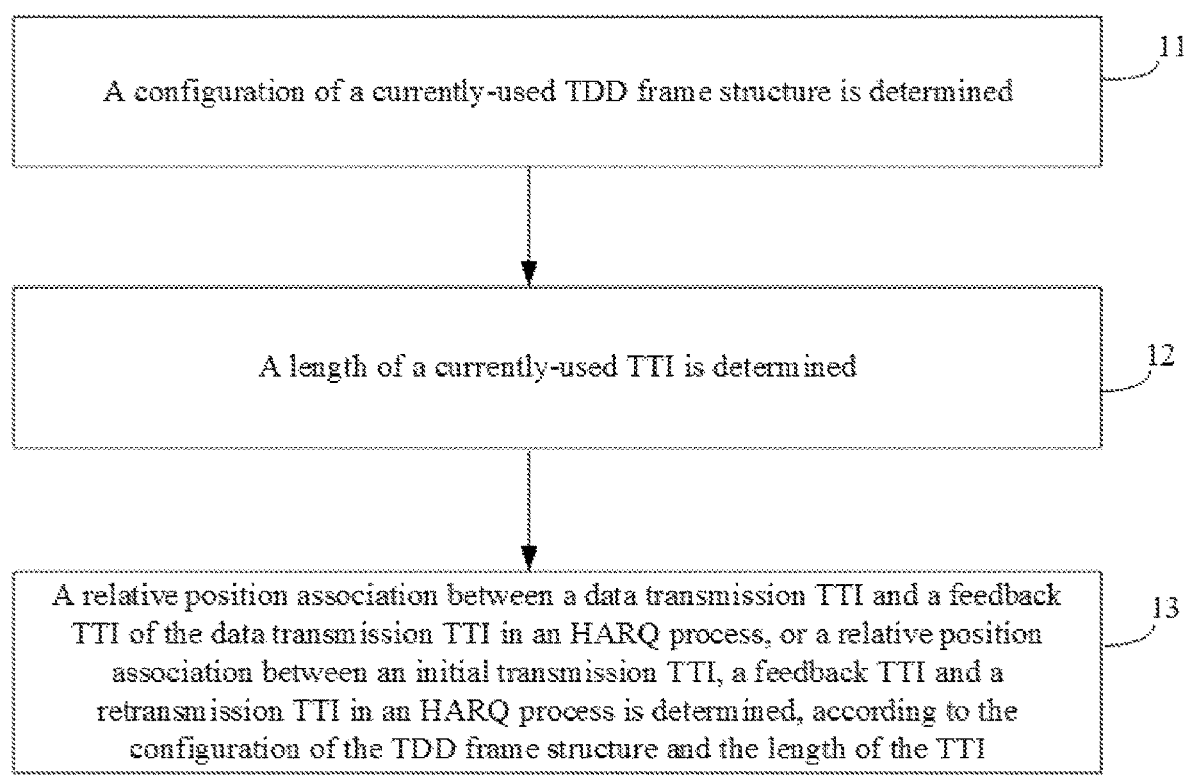
FIG. 2A and FIG. 2B are flowcharts of a method for determining an HARQ feedback timing according to embodiments of the disclosure.

Refer to FIG. 2A, the method for determining an HARQ feedback timing provided by the embodiments of the disclosure may include the following operations.

At block 11, a configuration of a currently-used TDD frame structure is determined; the configuration of the TDD frame structure includes uplink-downlink configurations and a special subframe configuration.

At block 12, a length of a currently-used TTI is determined.

At block 13, according to the configuration of the TDD frame structure and the length of the TTI, a relative position association between a data transmission TTI and a feedback TTI of the data transmission TTI in an HARQ process, or a relative position association between an initial transmission TTI, a feedback TTI and a retransmission TTI is determined. Here, the length of the TTI can be understood as the duration of the TTI.

Here, the data may be transmitted successfully, then the retransmission TTI is not needed, or for an asynchronous HARQ, the TTI for retransmission may be scheduled by a base station, so it is only needed to determine a first relative position association between the data transmission TTI and the feedback TTI of the data transmission TTI. When it is failed to transmit the data initially, or the HARQ is a synchronous HARQ, it may be needed to determine a second relative position association between the initial transmission TTI, the feedback TTI and the retransmission TTI. The relative position association between the initial transmission TTI and the feedback TTI in the second relative position association between the initial transmission TTI, the feedback TTI and the retransmission TTI is the first relative position association. An elaboration is given below by taking the second relative position association for example. When the second relative position association is obtained, because the second relative position association includes the first relative position association, the first relative position association may be obtained.

At block 13, the relative position association between the data transmission TTI and the feedback TTI thereof in the HARQ process, or the relative position association between the initial transmission TTI, the feedback TTI and the retransmission TTI may be obtained by determining the position of the initial transmission TTI in each HARQ process, and according to a preset feedback retransmission time association, selecting the feedback TTI and the retransmission TTI in the HARQ process from the TDD frame structure. One TTI may transmit data of no more than one HARQ process. The preset feedback retransmission time association is that the interval between the feedback TTI and the initial transmission TTI is greater than a first threshold, and the interval between the feedback TTI and the retransmission TTI is greater than a second threshold.

Figure 2B:
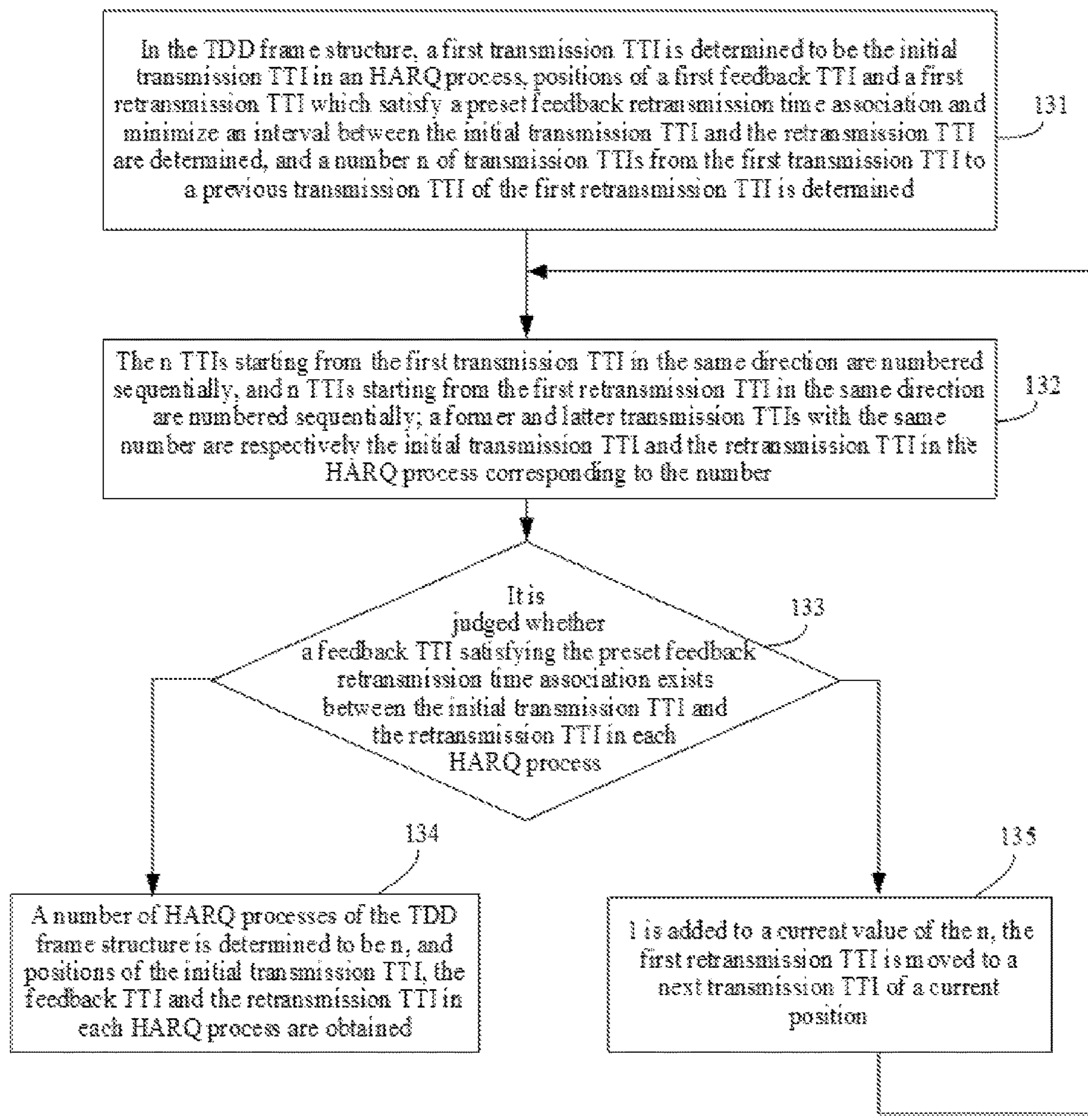

Refer to FIG. 2B, operation 13 may specifically include the following actions.

At block 131, in the TDD frame structure, a first transmission TTI is taken as the initial transmission TTI in an HARQ process, the positions of a first feedback TTI and a first retransmission TTI which satisfy the preset feedback retransmission time association and minimize the interval between the initial transmission TTI and the retransmission TTI are determined, and the number n of the transmission TTIs from the first transmission TTI to the previous transmission TTI of the first retransmission TTI is determined.

Here, the preset feedback retransmission time association is that the interval between the feedback TTI and the initial transmission TTI is greater than the first threshold, and the interval between the feedback TTI and the retransmission TTI is greater than the second threshold. The transmission TTI is an uplink transmission TTI or a downlink transmission TTI. The first threshold and the second threshold may usually be set according to a data transmission delay, time of processing the data by equipment and other factors. For example, the first threshold and the second threshold may usually be the length of time of 3 or 4 TTIs.

At block 132, the n Ms starting from the first transmission TTI in the same direction are numbered sequentially, the same direction means that both the n TTIs and the first transmission TTI are downlink transmissions or uplink transmissions, and the n TTIs starting from the first retransmission TTI in the same direction are numbered sequentially; the two transmission TTIs with the same number are the initial transmission TTI and the retransmission TTI respectively in the HARQ process corresponding to the number.

Here, the number of the transmission TTI may be regarded as the number of the HARQ process. The two transmission TTIs with the same number are the initial transmission TTI and the retransmission TTI respectively in the same HARQ process. The transmission TTIs with different numbers are the transmission TTIs in the different HARQ processes.

In the above numbering process, all the transmission TTIs starting from the first transmission TTI in the same direction are numbered sequentially. For example, by taking that the direction of the transmission TTI is the downlink direction, all the downlink transmission TTIs starting from the first transmission TTI are numbered, until all of n transmission TTIs are numbered. Similarly, all the transmission TTIs starting from the first retransmission TTI in the same direction are numbered sequentially. For example, by taking that the direction of the transmission TTI is the downlink direction, all the downlink transmission TTIs starting from the first retransmission TTI are numbered, until all of the n transmission TTIs are numbered. The start numbers of the above two numbering processes may be 0 or 1, and may also be other numbers. The start numbers of the two numbering processes should be the same, so as to ensure that the transmission TTIs in the same process have the same number.

At block 133, it is judged whether there is a feedback TTI satisfying the preset feedback retransmission time association between the initial transmission TTI and the retransmission TTI in each HARQ process; if so, the process proceeds to block 134; or else, the process proceeds to block 135.

At block 134, the number of the HARQ processes of the TDD frame structure is determined to be n, and the relative position association between the data transmission TTI and the feedback TTI of the data transmission TTI in each HARQ process, or the relative position association between the initial transmission TTI, the feedback TTI and the retransmission TTI is obtained.

Here, in the TDD frame structure of the embodiments of the disclosure, a radio frame of 10 ms includes ten subframes of 1 ms, and each subframe may include multiple TTIs.

As an implementation, the embodiment may number sequentially in each radio frame all the TTIs included in the radio frame, and the TTIs in all radio frames are numbered circularly, then the relative position association between the feedback TTI and the initial transmission TTI is a TTI interval between the feedback TTI and the initial transmission TTI.

As another implementation, the embodiment may number sequentially in each subframe all the TTIs included in the subframe, and the TTIs in all subframes are numbered circularly, then the relative position association between the feedback TTI and the initial transmission TTI is a subframe interval between the feedback TTI and the initial transmission TTI, and the numbers of the feedback TTI and the initial transmission TTI in the subframes they belong to.

At block 135, 1 is added to the current value of the n, the first retransmission TTI is moved to the next transmission TTI of the current position, and the process returns to block 132.

Through the above operations, in the embodiments of the disclosure, the number n of the HARQ processes and the positions of the initial transmission TTI, the feedback TTI and the retransmission TTI in each HARQ process are finally obtained. The n is the minimum value of the number of the HARQ processes under the condition of satisfying the preset feedback retransmission time association. Apparently, the embodiments of the disclosure may provide the corresponding HARQ feedback timings for the configurations of the frame structure with different lengths of the TTI, thereby providing a support for the low-delay transmission. Moreover, the embodiments of the disclosure may also carry the HARQ feedbacks on all the feedback TTIs as evenly as possible.

At block 134, an optional position of the feedback TTI, which is between the initial transmission TTI and the retransmission TTI in the HARQ process and satisfies the preset feedback retransmission time association, in the HARQ process may be determined according to the positions of the initial transmission TTI and the retransmission TTI in the same HARQ process; then, according to the positions of the initial transmission TTI and the retransmission TTI in each HARQ process, and the optional position of the feedback TTI, the relative position association between the data transmission TTI and the feedback TTI thereof in each HARQ process, or the relative position association between the initial transmission TTI, the feedback TTI and the retransmission TTI is obtained.

At block 134, the positions of the initial transmission TTI and the retransmission TTI in the HARQ process may be directly determined. For the feedback TTI in the HARQ process, any optional position of the feedback TTI, which is between the initial transmission TTI and the retransmission TTI in the HARQ process and satisfies the preset feedback retransmission time association may be taken as the feedback TTI of the HARQ process, so that the position of the feedback TTI in the HARQ process is obtained, and the relative position association between the feedback TTI and the initial transmission TTI is output.

In consideration of carrying the HARQ feedbacks on the feedback TTIs as evenly as possible, and avoiding the HARQ feedbacks from gathering on a few feedback Ms to perform feedback, which degrades uplink feedback performance, here, when the relative position association between the data transmission TTI and the feedback TTI thereof in each HARQ process, or the relative position association between the initial transmission TTI, the feedback TTI and the retransmission TTI is obtained according to the positions of the initial transmission TTI and the retransmission TTI in each HARQ process, and the optional position of the feedback TTI, it is feasible to first determine the optional position of the feedback TTI in each HARQ process; then, when it is needed to perform HARQ feedbacks of y HARQ processes on x optional positions, the HARQ feedbacks of they HARQ processes are distributed evenly on the x optional positions, the number of the HARQ processes fed back on each optional position is z or z+1, and the position of the feedback TTI in each HARQ process is obtained, the z is obtained by rounding down y/x; and according to the positions of the initial transmission TTI, the feedback TTI and the retransmission TTI in each HARQ process, the relative position association between the data transmission TTI and the feedback TTI thereof in each HARQ process, or the relative position association between the initial transmission TTI, the feedback TTI and the retransmission TTI is output.

In some embodiments, in order to ensure that the HARQ feedbacks are carried on the feedback TTIs as evenly as possible, the embodiments of the disclosure may also distribute the HARQ feedbacks of the y HARQ processes evenly on the x optional positions based on at least one of a first constraint condition or a second constraint condition.

Here, the first constraint condition is that: when the time of initial transmission of a first HARQ process is earlier than the time of initial transmission of a second HARQ process, the HARQ feedback of the initial transmission of the first HARQ process is not later than the HARQ feedback of the initial transmission of the second HARQ process, the second HARQ process and the first HARQ process are different processes.

The second constraint condition is that: when a transmission TTI in the first HARQ process and a transmission TTI in a third HARQ process are at the same position in different downlink-to-uplink switch-point periodicities, the HARQ feedback of a transmission TTI in the first HARQ process and the HARQ feedback of a transmission TTI in the third HARQ process are at another same position in the different downlink-to-uplink switch-point periodicities. Here, the third HARQ process and the first HARQ process are the same processes or different processes. The transmission TTI in the first HARQ process may be the initial transmission TTI or the retransmission TTI; similarly, the transmission TTI in the third HARQ process may also be the initial transmission TTI or the retransmission TTI. The downlink-to-uplink switch-point periodicity may refer to the following description.

For facilitating understanding of the second constraint condition, an interpretation is given in combination with FIG. 12. In FIG. 12, each smallest square represents a TTI, and each radio frame includes 20 TTIs numbered from 0-19. "↓n" represents the downlink HARQ process n, and the square where "↓n" is represents the TTI for the initial transmission or the data retransmission of the downlink HARQ process n. "↑n" represents the uplink HARQ feedback of the downlink HARQ process n, and the square where "↑n" is represents the TTI for transmitting the uplink HARQ feedback of the downlink HARQ process n. "▲n" represents an optional TTI for transmitting the uplink HARQ feedback of the downlink HARQ process n.

FIG. 12 is a schematic diagram of an HARQ feedback timing, which is obtained according to the second constraint condition, of the TTI whose length is 0.5 ms in the case of TDD uplink-downlink configuration 2. The downlink-to-uplink switch-point periodicity of the TDD uplink-downlink configuration 2 is 5 ms, and each downlink-to-uplink switch-point periodicity includes ten TTIs. In FIG. 12, the HARQ process 0 is in the first TTI of the first downlinkto-uplink switch-point periodicity, and the HARQ process 7 is in the first TTI of the second downlink-to-uplink switch-point periodicity, that is, a transmission TTI in the HARQ process 0 and a transmission TTI in the HARQ process 7 are at the same position in the different downlink-to-uplink switch-point periodicities, then their feedback TTIs should also be at another same position in the different downlink-to-uplink switch-point periodicities. For example, the position of the feedback TTI of the first TTI of the HARQ process 0 in the first downlink-to-uplink switch-point periodicity is the fifth TTI of the first downlink-to-uplink switch-point periodicity, and the position of the feedback TTI of the first TTI of the HARQ process 7 in the second downlink-to-uplink switch-point periodicity is the fifth TTI of the second downlink-to-uplink switch-point periodicity. Similarly, the HARQ process 1 and the HARQ process 8 also satisfy the above constraint condition, and the HARQ process 2 and the HARQ process 9 also satisfy the above constraint condition.

Figure 11:
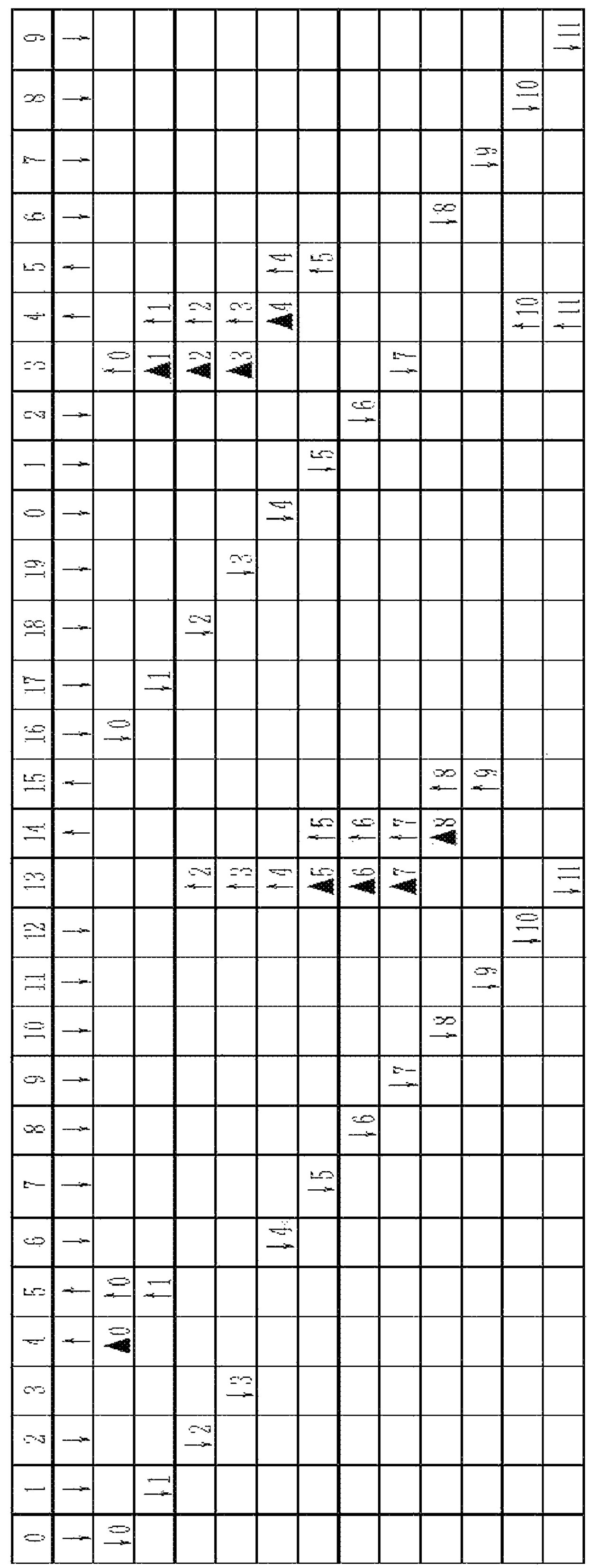
FIG. 11 is a schematic diagram of distributing the HARQ feedbacks evenly on all the feedback TTIs according to an embodiment of the disclosure.

An example of the above even distribution is illustrated as FIG. 11. In FIG. 11, each smallest square represents a TTI, and each radio frame includes 20 TTIs numbered from 0-19. "↓n" represents the downlink HARQ process n, and the square where "↓n" is represents the TTI for the initial transmission or the data retransmission of the downlink HARQ process n. "↑n" represents the uplink HARQ feedback of the downlink HARQ process n, and the square where "↑n" is represents the TTI for transmitting the uplink HARQ feedback of the downlink HARQ process 11. "▲n" represents the optional TTI for transmitting the uplink HARQ feedback of the downlink HARQ process 11.

Apparently, in FIG. 11, the HARQ feedback of eight downlink HARQ processes numbered from 2 to 9 needs to be performed on three uplink TTIs numbered from 13 to 15; on the premise of satisfying the preset feedback retransmission time association, distribution is performed according to the principle of even distribution. That is, each of two TTIs needs to carry three feedbacks, and another one TTI carries two feedbacks, so a distribution way is obtained. As illustrated in FIG. 11, the average delay of HARQ feedback may be the shortest by allocating HARQ feedbacks of the processes 2 to 4 on the TTI 13, distributing HARQ feedbacks of the processes 5 to 7 on the TTI 14, and distributing HARQ feedbacks of the processes 8 and 9 on the TTI 15 under the condition of distributing the HARQ feedbacks on the continuous uplink TTIs as evenly as possible. Here, it is assumed that both the first threshold and the second threshold in the preset feedback retransmission time association are four TTIs.

The embodiments of the disclosure may be applied to a variety of LTE TDD frame structures defined by existing standards. For example, a radio frame structure of the LTE TDD uplink-downlink configurations 0-6 defined in the 3GPP TS 36.211 Table 4.2-2: uplink-downlink configurations. For the uplink-downlink configurations 0-2 and 6, the downlink-to-uplink switch-point periodicity is 5 ms, that is, each radio frame of 10 ms includes two downlink-to-uplink switch-point periodicities; for the uplink-downlink configurations 3-5, the downlink-to-uplink switch-point periodicity is 10 ms, that is, each radio frame of 10 ms includes one downlink-to-uplink switch-point periodicity. The 3GPP TS 36.211 also defines special subframe configurations 0-9. Based on the special subframe configurations 0-9, the embodiments of the disclosure add a special subframe configuration in which the ratio of a downlink pilot time slot (DwPTS) to a guard period (GP) to an uplink pilot time slot (UpPTS) is 6:2:6. For facilitating description, the new special subframe configuration is called the special subframe configuration 10, that is, the ratio of DwPTS to GP to UpPTS of the special subframe configuration 10 is 6:2:6.

Moreover, the embodiments of the disclosure may be applied to a variety of newly-defined TDD frame structures. For example, the embodiments of the disclosure provide three TDD frame structures not defined in the existing standards, and for facilitating description, they are called the new uplink-downlink configurations 1-3, as illustrated in Table 1. Table 1 illustrates a radio frame structure of 10 ms of each configuration. Apparently, compared with the related art, the radio frames of these configurations are also 10 ms, and include ten subframes of 1 ms. For the new uplink-downlink configurations 1 and 3, their downlink-to-uplink switch-point periodicities are 5 ms, that is, each radio frame of 10 ms includes two downlink-to-uplink switch-point periodicities. For the uplink-downlink configuration 2, its downlink-to-uplink switch-point periodicity is 10 ms, that is, each radio frame of 10 ms includes one downlink-to-uplink switch-point periodicity.

TABLE 1

| New uplink-downlink configuration | The number of subframes | | | | | | | | | |
|---|---|---|---|---|---|---|---|---|---|---|
| 0 | D | S | U | First bidirectional subframe | First bidirectional subframe | D | S | U | First bidirectional subframe | First bidirectional subframe |
| 1 | D | S | U | Second bidirectional subframe | Second bidirectional subframe | D | S | Second bidirectional subframe | First bidirectional subframe | First bidirectional subframe |
| 2 | D | S | U | Third bidirectional subframe | Third bidirectional subframe | D | S | U | Third bidirectional subframe | Third bidirectional subframe |

The radio frame structure of the new uplink-downlink configuration 1 replaces subframes 3, 4, 8 and 9 in the LTE TDD uplink-downlink configuration 2 with the first bidirectional subframe in which a ratio of downlink to GP to uplink is 7:1:6, and the ratio of DwPTS to GP to UpPTS is 9:1:4. The radio frame structure of the new uplink-downlink configuration 2 replaces subframes 3, 4, 7, 8 and 9 in the LTE TDD uplink-downlink configuration 2 with the second bidirectional subframe in which a ratio of downlink to GP to uplink is 11:1:2, and the ratio of DwPTS to GP to UpPTS is 9:1:4. The radio frame structure of the new uplink-downlink configuration 3 replaces downlink subframes 3, 4, 8 and 9 in the LTE TDD uplink-downlink configuration 2 with the third bidirectional subframe in which ratio of downlink to GP to uplink is 6:2:6, and the ratio of DwPTS to GP to UpPTS is 6:2:6.

In order to design the HARQ feedback aiming at the TDD frame structure, before block 131, the embodiments of the disclosure may also include the following operation.

Operation 130, according to a predetermined length of the TTI, each subframe of the TDD frame structure is divided into multiple TTIs, and the transmission TTI and the feedback TTI in each TTI are determined, the transmission directions of the feedback TTI and the transmission TTI are opposite, and the transmission TTI is the uplink transmission TTI or the downlink transmission TTL Here, all the transmission TTIs are the Ms which have the same transmission direction and may be used for data transmission. For a bidirectional TTI including the uplink transmission and the downlink transmission, its transmission direction may be determined according to the length of time of the uplink transmission or the downlink transmission and a preset system condition (for example, the system may define, aiming at each bidirectional TTI, whether it may be used for the uplink or downlink transmission).

Aiming at the existing TDD frame structures or the TDD frame structures newly defined by the embodiments of the disclosure, the specific implementation of operation 130 is described below.

1) Aiming at the LTE TDD Uplink-Downlink Configurations 0-6

Any frame structure in the LTE TDD uplink-downlink configurations 0-6 may adopt any special subframe ratio in the special subframe configurations 0-10.

Aiming at the TTIs with different lengths adopted by the embodiments of the disclosure, descriptions are given below.

A) the TTI Whose Length is 0.5 ms is Adopted

When the TTI whose length is 0.5 ms is adopted, in operation 130, each subframe of the TDD frame structure is divided into multiple TTIs.

Specifically, in the TDD frame structure, each normal subframe is divided into two TTIs, and the transmission direction of the TTI in each normal subframe is as same as the transmission direction of the normal subframe.

In the TDD frame structure, a special subframe is divided into two TTIs. As an implementation, corresponding to the special subframe configurations 0-10, the ratios of DwPTS to GP to UpPTS in the two TTIs of the special subframe are respectively:

3:4:0 and 0:6:1 in the special subframe configuration 0;
7:0:0 and 2:4:1 in the special subframe configuration 1;
7:0:0 and 3:3:1 in the special subframe configuration 2;
7:0:0 and 4:2:1 in the special subframe configuration 3;
7:0:0 and 5:1:1 in the special subframe configuration 4;
3:4:0 and 0:5:2 in the special subframe configuration 5;
7:0:0 and 2:3:2 in the special subframe configuration 6;
7:0:0 and 3:2:2 in the special subframe configuration 7;
7:0:0 and 4:1:2 in the special subframe configuration 8;
6:1:0 and 0:5:2 in the special subframe configuration 9;
6:1:0 and 0:1:6 in the special subframe configuration 10.

When the UpPTS of the special subframe is not allowed to transmit an uplink feedback, in the special subframe configurations 0, 5, 9 and 10, the first TTI in the two TTIs of the special subframe is used for the downlink transmission, and the second TTI is not used for data transmission; and in the special subframe configurations 1, 2, 3, 4, 6, 7 and 8, both the two TTIs of the special subframe are used for the downlink transmission.

When the UpPTS of the special subframe is allowed to transmit the uplink feedback, in the special subframe configurations 0, 5, 9 and 10, the first TTI in the two TTIs of the special subframe is used for the downlink transmission, and the second TTI is used for the uplink transmission; and in the special subframe configurations 1, 2, 3, 4, 6, 7 and 8, the first TTI in the two TTIs of the special subframe is used for the downlink transmission, and the second TTI is used for at least one of the uplink transmission or the downlink transmission.

B) The TTI Whose Length is Four/Three OFDM Symbols is Adopted

When the TTI whose length is four/three OFDM symbols is adopted, in operation 130, each subframe of the TDD frame structure is divided into multiple TTIs.

Specifically, in the TDD frame structure, each time slot of each normal subframe is divided into two TTIs whose lengths are respectively four OFDM symbols and three OFDM symbols; the transmission direction of the TTIs in each normal subframe is as same as the transmission direction of the normal subframe.

In the TDD frame structure, the special subframe is divided into four TTIs whose lengths are respectively four OFDM symbols, three OFDM symbols, four OFDM symbols and three OFDM symbols. As an implementation, corresponding to the special subframe configurations 0-10, the ratios of DwPTS to GP to UpPTS in the four TTIs of the special subframe are respectively:

3:1:0, 0:3:0, 0:4:0 and 0:2:1 in the special subframe configurations 0 and 5;

4:0:0, 3:0:0, 2:2:0 and 0:2:1 in the special subframe configurations 1, 2, 6 and 7;

4:0:0, 3:0:0, 0:4:0 and 0:2:1 in the special subframe configuration 3;

4:0:0, 3:0:0, 4:0:0 and 1:1:1 in the special subframe configuration 4;

4:0:0, 3:0:0, 4:0:0 and 0:1:2 in the special subframe configuration 8;

4:0:0, 2:1:0, 0:4:0 and 0:1:2 in the special subframe configuration 9;

4:0:0, 2:1:0, 0:1:3 and 0:0:3 in the special subframe configuration 10.

When the UpPTS of the special subframe is not allowed to transmit the uplink feedback, in the special subframe configurations 0 and 5, only the first TTI in the four TTIs of the special subframe is used for the downlink transmission, and the TTIs numbered from 2 to 4 are not used for data transmission;

in the special subframe configurations 1, 2, 3, 6, 7 and 8, the TTIs numbered from 1 to 3 in the four TTIs of the special subframe are used for the downlink transmission, and the fourth TTI is not used for data transmission;

in the special subframe configuration 4, the TTIs numbered from 1 to 4 in the four TTIs of the special subframe are used for the downlink transmission;

in the special subframe configuration 9, the TTIs numbered from 1 to 2 in the four TTIs of the special subframe are used for the downlink transmission, and the TTIs numbered from 3 to 4 are not used for data transmission;

in the special subframe configuration 10, the TTIs numbered from 1 to 2 in the four TTIs of the special subframe are used for the downlink transmission, and the fourth TTI is used for the uplink transmission.

When the UpPTS of the special subframe is allowed to transmit the uplink feedback, in the special subframe configurations 0 and 5, only the first TTI in the four TTIs of the special subframe is used for the downlink transmission, the Ms numbered from 2 to 3 are not used for data transmission, and the fourth TTI is used for the uplink transmission;

in the special subframe configurations 1, 2, 3, 6, 7 and 8, the TTIs numbered from 1 to 3 in the four TTIs of the special subframe are used for the downlink transmission, and the fourth TTI is used for the uplink transmission;

in the special subframe configuration 4, the TTIs numbered from 1 to 3 in the four TTIs of the special subframe are used for the downlink transmission, and the fourth TTI is used for at least one of the uplink transmission or the downlink transmission;

in the special subframe configuration 9, the TTIs numbered from 1 to 2 in the four TTIs of the special subframe are used for the downlink transmission, the third TTI is not used for data transmission, and the fourth TTI is used for the uplink transmission;

in the special subframe configuration 10, the TTIs numbered from 1 to 2 in the four TTIs of the special subframe are used for the downlink transmission, and the TTIs numbered from 3 to 4 are used for the uplink transmission.

C) The TTI Whose Length is Two OFDM Symbols is Adopted

When the TTI whose length is two OFDM symbols is adopted, in operation 130, each subframe of the TDD frame structure is divided into multiple TTIs.

Specifically, in the TDD frame structure, each normal subframe is divided into seven TTIs; the transmission direction of the TTIs in each normal subframe is as same as the transmission direction of the normal subframe.

In the TDD frame structure, the special subframe is divided into seven TTIs. As an implementation, corresponding to the special subframe configurations 0-10, the ratios of DwPTS to GP to UpPTS in the seven TTIs of the special subframe are respectively:

2:0:0, 1:1:0, 0:2:0, 0:2:0, 0:2:0, 0:2:0 and 0:1:1 in the special subframe configuration 0;

2:0:0, 2:0:0, 2:0:0, 2:0:0, 1:1:0, 0:2:0 and 0:1:1 in the special subframe configuration 1;

2:0:0, 2:0:0, 2:0:0, 2:0:0, 2:0:0, 0:2:0 and 0:1:1 in the special subframe configuration 2;

2:0:0, 2:0:0, 2:0:0, 2:0:0, 2:0:0, 1:1:0 and 0:1:1 in the special subframe configuration 3;

2:0:0, 2:0:0, 2:0:0, 2:0:0, 2:0:0, 2:0:0 and 0:1:1 in the special subframe configuration 4;

2:0:0, 1:1:0, 0:2:0, 0:2:0, 0:2:0, 0:2:0 and 0:0:2 in the special subframe configuration 5;

2:0:0, 2:0:0, 2:0:0, 2:0:0, 1:1:0, 0:2:0 and 0:0:2 in the special subframe configuration 6;

2:0:0, 2:0:0, 2:0:0, 2:0:0, 2:0:0, 0:2:0 and 0:0:2 in the special subframe configuration 7;

2:0:0, 2:0:0, 2:0:0, 2:0:0, 2:0:0, 1:1:0 and 0:0:2 in the special subframe configuration 8;

2:0:0, 2:0:0, 2:0:0, 0:2:0, 0:2:0, 0:2:0 and 0:0:2 in the special subframe configuration 9;

2:0:0, 2:0:0, 2:0:0, 0:2:0, 0:0:2, 0:0:2 and 0:0:2 in the special subframe configuration 10.

In the special subframe configurations 0 and 5, the TTIs numbered from 1 to 2 in the seven TTIs of the special subframe are used for the downlink transmission, and the TTIs numbered from 3 to 6 are not used for data transmission, and the seventh TTI is used for the uplink transmission.

In the special subframe configurations 1, 2, 6 and 7, the TTIs numbered from 1 to 5 in the seven TTIs of the special subframe are used for the downlink transmission, the sixth TTI is not used for data transmission, and the seventh TTI is used for the uplink transmission.

In the special subframe configurations 3, 4 and 8, the TTIs numbered from 1 to 6 in the seven TTIs of the special subframe are used for the downlink transmission, and the seventh TTI is used for the uplink transmission.

In the special subframe configuration 9, the TTIs numbered from 1 to 3 in the seven TTIs of the special subframe are used for the downlink transmission, the TTIs numbered from 4 to 6 are not used for data transmission, and the seventh TTI is used for the uplink transmission.

In the special subframe configuration 10, the TTIs numbered from 1 to 3 in the seven TTIs of the special subframe are used for the downlink transmission, the fourth TTI is not used for data transmission, and the TTIs numbered from 5 to 7 are used for the uplink transmission.

Aiming at the TDD frame structure of the new uplink-downlink configurations 1-3, and the situation where the length of the TTI is two OFDM symbols, the specific implementation of operation 130 is described below. Of course, the TDD frame structure of the new uplink-downlink configurations 1-3 may also adopt the TTIs with other lengths, which will not be covered for saving space.

2) Aiming at the New Uplink-Downlink Configurations 1-3

2A) the New Uplink-Downlink Configuration 1

As described above, the radio frame structure of the new uplink-downlink configuration 1 includes ten subframes of 1 ms, which are respectively downlink subframe, special subframe, uplink subframe, first bidirectional subframe, first bidirectional subframe, downlink subframe, special subframe, uplink subframe, first bidirectional subframe and first bidirectional subframe. The ratio of downlink to GP to uplink in the first bidirectional subframe is 7:1:6, and the ratio of DwPTS to GP to UpPTS in the special subframe is 9:1:4.

When the TTI whose length is two OFDM symbols is adopted, in operation 130, each subframe of the TDD frame structure is divided into multiple TTIs.

Specifically, each subframe is divided into seven TTIs, the transmission direction of the TTI in the uplink subframe or the downlink subframe is as same as the transmission direction of the subframe the TTI belongs to.

The ratios of DwPTS to GP to UpPTS in the seven TTIs of the first bidirectional subframe are respectively 2:0:0, 2:0:0, 2:0:0, 1:1:0, 0:0:2, 0:0:2 and 0:0:2; the TTIs numbered from 1 to 4 in the first bidirectional subframe are used for the downlink transmission, and the TTIs numbered from 5 to 7 in the first bidirectional subframe are used for the uplink transmission.

The ratios of DwPTS to GP to UpPTS in the seven TTIs of the special subframe are respectively 2:0:0, 2:0:0, 2:0:0, 2:0:0, 1:1:0, 0:0:2 and 0:0:2; the TTIs numbered from 1 to 5 in the special subframe are used for the downlink transmission, and the TTIs numbered from 6 to 7 in the special subframe are used for the uplink transmission.

2B) the New Uplink-Downlink Configuration 2

As described above, the radio frame structure of the new uplink-downlink configuration 2 includes ten subframes of 1 ms, which are respectively downlink subframe, special subframe, uplink subframe, second bidirectional subframe, second bidirectional subframe, downlink subframe, special subframe, second bidirectional subframe, second bidirectional subframe and second bidirectional subframe. The ratio of downlink to GP to uplink in the second bidirectional subframe is 11:1:2, and the ratio of DwPTS to GP to UpPTS in the special subframe is 9:1:4.

When the TTI whose length is two OFDM symbols is adopted, in operation 130, each subframe of the TDD frame structure is divided into multiple TTIs.

Specifically, each subframe is divided into seven TTIs, the transmission direction of the TTI in the uplink subframe or the downlink subframe is as same as the transmission direction of the subframe the TTI belongs to.

The ratios of DwPTS to GP to UpPTS in the seven TTIs of the second bidirectional subframe are respectively 2:0:0, 2:0:0, 2:0:0, 2:0:0, 2:0:0, 1:1:0 and 0:0:2; the TTIs numbered from 1 to 6 in the second bidirectional subframe are used for the downlink transmission, and the seventh TTI is used for the uplink transmission.

The ratios of DwPTS to GP to UpPTS in the seven TTIs of the special subframe are respectively 2:0:0, 2:0:0, 2:0:0, 2:0:0, 1:1:0, 0:0:2 and 0:0:2. The TTIs numbered from 1 to 5 in the special subframe are used for the downlink transmission, and the TTIs numbered from 6 to 7 are used for the uplink transmission.

2C) the New Uplink-Downlink Configuration 3

As described above, the radio frame structure of the new uplink-downlink configuration 3 includes ten subframes of 1 ms, which are respectively downlink subframe, special subframe, uplink subframe, third bidirectional subframe, third bidirectional subframe, downlink subframe, special subframe, uplink subframe, third bidirectional subframe and third bidirectional subframe. The ratio of downlink to GP to uplink in the third bidirectional subframe is 6:2:6, and the ratio of DwPTS to GP to UpPTS in the special subframe is 6:2:6.

When the TTI whose length is two OFDM symbols is adopted, in operation 130, each subframe of the TDD frame structure is divided into multiple TTIs.

Specifically, each subframe is divided into seven TTIs, the transmission direction of the TTI in the uplink subframe or the downlink subframe is as same as the transmission direction of the subframe the TTI belongs to.

The ratios of DwPTS to GP to UpPTS in the seven TTIs of the third bidirectional subframe are respectively 2:0:0, 2:0:0, 2:0:0, 0:2:0, 0:0:2, 0:0:2 and 0:0:2; the TTIs numbered from 1 to 3 in the third bidirectional subframe are used for the downlink transmission, the fourth TTI is not used for data transmission, and the TTIs numbered from 5 to 7 are used for the uplink transmission.

The ratios of DwPTS to GP to UpPTS in the seven TTIs of the special subframe are respectively 2:0:0, 2:0:0, 2:0:0, 0:2:0, 0:0:2, 0:0:2 and 0:0:2; the TTIs numbered from 1 to 3 in the special subframe are used for the downlink transmission, the fourth TTI is not used for data transmission, and the TTIs numbered from 5 to 7 are used for the uplink transmission.

Figure 3:
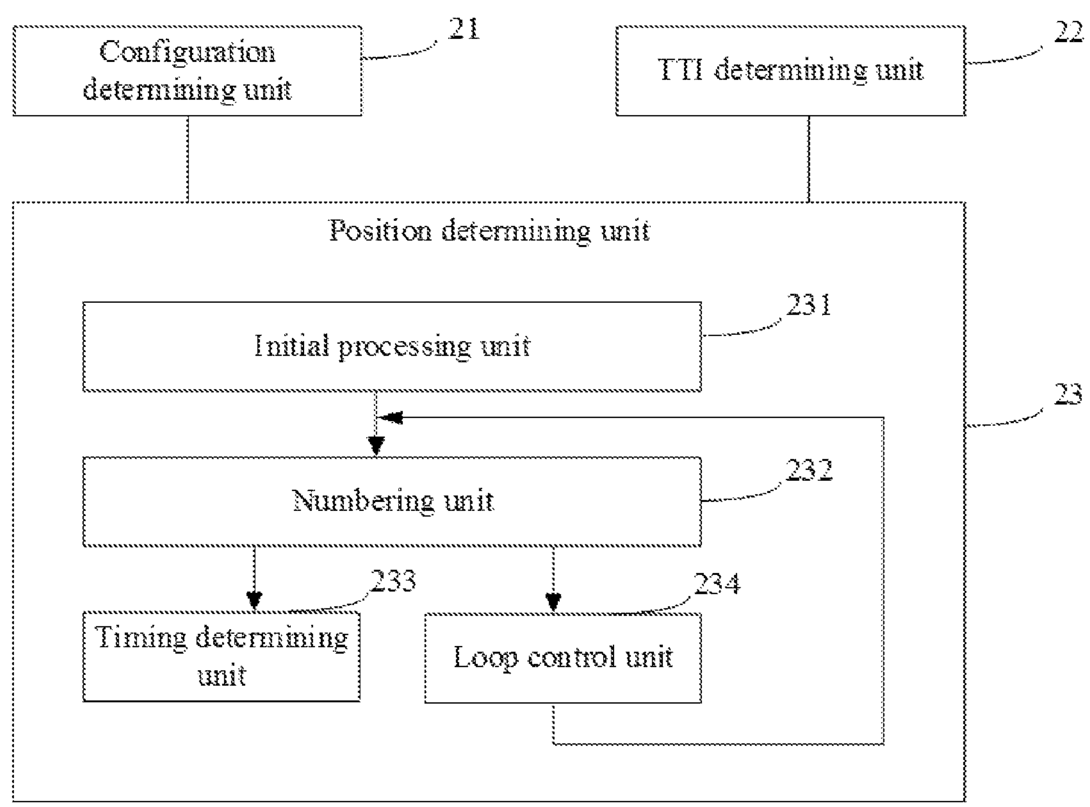
FIG. 3 is a structure diagram of a device for determining an HARQ feedback timing according to an embodiment of the disclosure.

Refer to FIG. 3, a device for determining an HARQ feedback timing provided by the embodiments of the disclosure includes a configuration determining unit 21, a TTI determining unit 22 and a position determining unit 23.

The configuration determining unit 21 is configured to determine a configuration of the currently-used TDD frame structure, and the configuration of the TDD frame structure includes the uplink-downlink configurations and a special subframe configuration.

The TTI determining unit 22 is configured to determine a length of the currently-used TTI.

The position determining unit 23 is configured to determine, according to the configuration of the TDD frame structure and the length of the TTI, a relative position association between the data transmission TTI and the feedback TTI of the data transmission TTI in the HARQ process, or a relative position association between an initial transmission TTI, a feedback TTI and a retransmission TTI.

Here, the position determining unit 23 is configured to determine the position of the initial transmission TTI in each HARQ process, and according to the preset feedback retransmission time association, select the feedback TTI and the retransmission TTI in the HARQ process from the TDD frame structure, and obtain the relative position association between the data transmission TTI and the feedback TTI thereof in the HARQ process, or the relative position association between the initial transmission TTI, the feedback TTI and the retransmission TTI. Data of no more than one HARQ process is transmitted in one TTI. The preset feedback retransmission time association is that the interval between the feedback TTI and the initial transmission TTI is greater than the first threshold, and the interval between the feedback TTI and the retransmission TTI is greater than the second threshold.

In some embodiments, the position determining unit 23 includes an initial processing unit 231, a numbering unit 232, a timing determining unit 233, and a loop control unit 234.

The initial processing unit 231 is configured to, in the TDD frame structure, take the first transmission TTI as the initial transmission TTI in an HARQ process, determine the positions of the first feedback TTI and the first retransmission TTI which satisfy the preset feedback retransmission time association and minimize the interval between the initial transmission TTI and the retransmission TTI, and determine the number n of the transmission TTIs from the first transmission TTI to the previous transmission TTI of the first retransmission TTI. The preset feedback retransmission time association is that the interval between the feedback TTI and the initial transmission TTI is greater than the first threshold, and the interval between the feedback TTI and the retransmission TTI is greater than the second threshold. The transmission TTI is the uplink transmission TTI or the downlink transmission TTI.

The numbering unit 232 is configured to number sequentially the n TTIs starting from the first transmission TTI in the same transmission direction, and number sequentially the n TTIs starting from the first retransmission TTI in the same transmission direction; the two transmission TTIs with the same number are the initial transmission TTI and the retransmission TTI respectively in the HARQ process corresponding to the number; judge whether there is a feedback TTI satisfying the preset feedback retransmission time association between the initial transmission TTI and the retransmission TTI in each HARQ process.

The timing determining unit 233 is configured to, when the judging unit determines that there is a feedback TTI satisfying the preset feedback retransmission time association between the initial transmission TTI and the retransmission TTI in each HARQ process, determine the number of the HARQ processes of the TDD frame structure to be n, and obtain the relative position association between the data transmission TTI and the feedback TTI of the data transmission TTI in the HARQ process, or the relative position association between the initial transmission TTI, the feedback TTI and the retransmission TTI.

The loop control unit 234 is configured to, when the judging unit determines that there is not a feedback TTI satisfying the preset feedback retransmission time association between the initial transmission TTI and the retransmission TTI in any one HARQ process, add 1 to the current value of the n, move the first retransmission TTI to the next transmission TTI of the current position in the same transmission direction, and trigger the judging unit.

In the embodiments of the disclosure, the timing determining unit includes an optional position obtaining unit and an obtaining unit.

The optional position obtaining unit is configured to determine the optional position of the feedback TTI, which is between the initial transmission TTI and the retransmission TTI in the HARQ process and satisfies the preset feedback retransmission time association, in the HARQ process according to the positions of the initial transmission TTI and the retransmission TTI in the same HARQ process.

The obtaining unit is configured to obtain the relative position association between the data transmission TTI and the feedback TTI thereof in each HARQ process, or the relative position association between the initial transmission TTI, the feedback TTI and the retransmission TTI according to the positions of the initial transmission TTI and the retransmission TTI in each HARQ process, and the optional position of the feedback TTI.

In some embodiments, the obtaining unit includes a first determining unit, a distributing unit, and an outputting unit.

The first determining unit is configured to determine the optional position of the feedback TTI in each HARQ process.

The distributing unit is configured to, when it is needed to perform the HARQ feedbacks of y HARQ processes on the x optional positions, distribute the HARQ feedbacks of the y HARQ processes evenly on the x optional positions, the number of the HARQ processes fed back on each optional position is z or z+1, and obtain the position of the feedback TTI in each HARQ process; the z is equal to $$\left\lfloor \frac{y}{x} \right\rfloor.$$

The outputting unit is configured to output the relative position association between the data transmission TTI and the feedback TTI thereof in each HARQ process, or the relative position association between the initial transmission TTI, the feedback TTI and the retransmission TTI according to the positions of the initial transmission TTI, the feedback TTI and the retransmission TTI in each HARQ process.

Here, the distributing unit is configured to, distribute the HARQ feedbacks of the y HARQ processes evenly on the x optional positions based on at least one of the first constraint condition or the second constraint condition.

The first constraint condition is that: when the time of initial transmission of a first HARQ process is earlier than the time of initial transmission of a second HARQ process, the HARQ feedback of the initial transmission of the first HARQ process is not later than the HARQ feedback of the initial transmission of the second HARQ process; the second HARQ process and the first HARQ process are different processes.

The second constraint condition is that: when a transmission TTI in the first HARQ process and a transmission TTI in the third HARQ process are at the same position in different downlink-to-uplink switch-point periodicities, the HARQ feedback of a transmission TTI in the first HARQ process and the HARQ feedback of a transmission TTI in the third HARQ process are at another same position in the different downlink-to-uplink switch-point periodicities. The third HARQ process and the first HARQ process are the same processes or different processes.

As an implementation, the timing determining unit is specifically configured to determines any one of feedback TTIs, which is between the initial transmission TTI and the retransmission TTI in each HARQ process and satisfies the preset feedback retransmission time association to be the feedback TTI of the HARQ process, obtain the position of the feedback TTI in the HARQ process, and output the relative position association between the feedback TTI and the initial transmission TTI.

In the embodiments of the disclosure, in each radio frame, all the TTIs included in the radio frame are numbered sequentially; the relative position association between the feedback TTI and the initial transmission TTI is the TTI interval between the feedback TTI and the initial transmission TTI. Or, in each subframe, all the TTIs included in the subframe are numbered sequentially; the relative position association between the feedback TTI and the initial transmission TTI is the subframe interval between the feedback TTI and the initial transmission TTI, and the numbers of the feedback TTI and the initial transmission TTI in the subframes they belong to.

Alternatively, the above device further includes a dividing unit (not illustrasted in FIG. 3).

The dividing unit is configured to determine the type of the TDD frame structure and the special subframe configuration adopted by the special subframe in the TDD frame structure, divide each subframe of the TDD frame structure into multiple TTIs according to the predetermined length of the TTI, and determine the transmission TTI and the feedback TTI in each TTI. The transmission directions of the feedback TTI and the transmission TTI are opposite, and the transmission TTI is the uplink transmission TTI or the downlink transmission TTI.

Here, the TDD frame structure is one of the following frame structures: the LTE TDD uplink-downlink configurations 0-6 defined in the 3GPP TS 36.211, or the new uplink-downlink configurations 1-3.

The special subframe configurations include the special subframe configurations 0-9 defined in the 3GPP TS 36.211 and the new special subframe configuration 10. The ratio of DwPTS to GP to UpPTS in the special subframe configuration 10 is 6:2:6.

The length of the TTI may be 0.5 ms, four or three OFDM symbols, or two OFDM symbols.

The method and device of the embodiments of the disclosure are described above. In order to help understanding the disclosure better, the embodiments of the disclosure are further described below in combination with the schematic diagrams of the HARQ feedback time associations of several optional frame structures after the method provided by the embodiments of the disclosure is applied. It is to be noted that each time association below is an example of the embodiments of the disclosure, and does not form a limit to the disclosure.

In the feedback timing diagrams, to which the following examples refer, in the accompanying drawings, each smallest square represents a TTI, "↓n" represents the downlink HARQ process n, the TTI where "↓n" is represents the TTI for the initial transmission or the data retransmission of the downlink HARQ process n, "↑n" represents the uplink HARQ feedback of the downlink HARQ process n, the TTI where "↑n" is represents the TTI for transmitting the uplink HARQ feedback of the downlink HARQ process n, "▲n" represents an optional feedback position for transmitting the uplink HARQ feedback of the downlink HARQ process n, "◆" represents the special subframe, "i" represents the uplink direction, "↓" represents the downlink direction; a:b:c in the TTI represents the ratio of DwPTS to GP to UpPTS.

Example 1: The TDD Uplink-Downlink Configuration 0

The feedback timing determined according to the method of the embodiments of the disclosure when the TDD uplink-downlink configuration is 0 (corresponding to a TDD ratio DSUUUDSUUU) and the lengths of the TTIs are different is introduced below.

A) the m Whose Length is 0.5 ms

In consideration of the TTI whose length is 0.5 ms, that is, the number of (SC-) OFDM symbols included in one TTI is as same as that of one existing time slot, namely 7 in the case of normal CP (6 in the case of extended CP). In consideration of being compatible with the existing LTE system, the TTIs in one radio frame are as illustrated in FIG. 4. FIG. 4 illustrates the situation of normal CP, and the TTIs in the radio frame are numbered sequentially to be 0-19. For the situation where the number of the subframe stays constant, and the TTIs are numbered only in the subframe, the numbers of the TTIs in each subframe are 0-1. FIG. 4 illustrates the direction of each TTI in the special subframe configurations 0-9 and the ratio of DwPTS to GP to UpPTS in the special subframe.

Two situations are considered. In situation 1, it is set that the UpPTS in the special subframe may not transmit HARQ feedback information of the PDSCH; in situation 2, it is set that the UpPTS in the special subframe may transmit the HARQ feedback information of the PDSCH.

are numbered sequentially in the radio frame; in FIG. 5B, the TTIs are numbered sequentially in the subframe.

For the special subframe configurations 1, 2, 3, 4, 6, 7 and 8 in situation 1, for saving space, no illustration is given through the accompanying drawings. For situation 2, whether the second time slot of the special subframe may transmit an ACK feedback without influencing the HARQ timing and the HARQ feedback timing of the downlink process are as same as that in situation 1.

Correspondingly, in the case of the TDD uplink-downlink configuration 0 and the length of the TTI being 0.5 ms, when UE detects, in the TTI n−k, k∈K', the PDSCH transmission or the PDCCH/EPDCCH indicating the downlink SPS release, and a corresponding HARQ-ACK response for the PDSCH transmission or the PDCCH/EPDCCH shall be provided, the UE transmits the HARQ-ACK response in the uplink TTI n. The values of the K' corresponding to the different uplink TTIs are as illustrated in Table 2. Here, k∈K', K': $\{k_0, k_1, \ldots, K_{M'-1}\}$, M' represents the number of the downlink transmission TTIs fed back in a certain uplink feedback TTI according to the determined HARQ time association. The descriptions of all the following tables corresponding to the second numbering manner of the other configurations are as same as this; in order to describe simply and conveniently, the descriptions of some tables may be simplified, but the meanings of the parameters in the tables are unchanged. Here, because the downlink-to-uplink switch-point periodicity is 5 ms, the numbers of the TTIs may also only correspond to 5 ms of the existing LTE, that is, the numbers are 0-9.

TABLE 2

| Different special subframe configurations of the TDD | TTI n | | | | | | | | | |
|---|---|---|---|---|---|---|---|---|---|---|
| uplink-downlink configuration 0 | 0 | 1 | 2 | 3 | 4 | 5 | 6 | 7 | 8 | 9 |
| Special subframe configurations 0, 5, 9 and 10 | — | — | — | — | 4 | 4 | 4 | — | — | — |
| Special subframe configurations 1, 2, 3, 4, 6, 7 and 8 | | | | | 4 | 4 | 4 | 4 | | |
| | TTI n | | | | | | | | | |
| TDD uplink-downlink configuration 0 | 10 | 11 | 12 | 13 | 14 | 15 | 16 | 17 | 18 | 19 |
| Special subframe configurations 0, 5, 9 and 10 | — | — | | — | 4 | 4 | 4 | — | — | — |
| Special subframe configurations 1, 2, 3, 4, 6, 7 and 8 | | | | | 4 | 4 | 4 | 4 | | |

The special subframe configurations may also divided into two categories. One category is the special subframe configurations 0, 5, 9 and 10, which are set to not perform the downlink transmission in the TTI 3; another is the special subframe configurations 1, 2, 3, 4, 6, 7 and 8, which are set to perform the downlink transmission in the TTI 3.

For the special subframe configurations 0, 5, 9 and 10 in situation 1, the HARQ feedback timing of a PDSCH transmission or a PDCCH/EPDCCH indicating an SPS release is as illustrated in FIG. 5A and FIG. 5B. There are three downlink HARQ processes, an RTT is ten TTIs, namely 5 ms. For example, for the first process in the figures, the HARQ feedback of the PDSCH or the PDCCH/EPDCCH indicating the SPS release transmitted in the downlink TTI 0 is in the TTI 4; FIG. 5A and FIG. 5B respectively correspond to different TTI numbering manners.

FIG. 5A and FIG. 5B are the downlink HARQ process and the feedback timing of the corresponding TTI of 0.5 ms in the TDD uplink-downlink configuration 0 and the special subframe configurations 0, 5, 9 and 10. In FIG. 5A, the TTIs It can be seen from Table 2 that when the length of the TTI is 0.5 ms, the configuration of the TDD frame structure is the LTE TDD uplink-downlink configuration 0, and it is preset that the UpPTS of the special subframe may not transmit the HARQ feedback information of the PDSCH, if the special subframe configurations are 0, 5, 9 and 10, and the numbering manner of numbering sequentially the TTIs from 0 in the radio frame is adopted, the HARQ feedback of the PDSCH or the PDCCH/EPDCCH indicating the SPS release which is transmitted in the downlink TTI n−k, k∈K', is performed in the uplink TTI n; all the values of the feedback timing K' are the values of K' corresponding to TTI 4, TTI 5, TTI 6, TTI 14, TTI 15 and TTI 16, namely 4.

If the special subframe configurations are 1, 2, 3, 4, 6, 7 and 8, and the numbering manner of numbering sequentially the TTIs from 0 in the radio frame is adopted, the HARQ feedback of the PDSCH or the PDCCH/EPDCCH indicating the SPS release which is transmitted in the downlink TTI n−k, k∈K', is performed in the uplink TTI n; all the values of the feedback timing K' are the values of K' corresponding to TTI 4, TTI 5, TTI 6, TTI 7, TTI 14, TTI 15, TTI 16 and TTI 17, namely 4.

For the second numbering manner, namely the TTIs are numbered sequentially only in a subframe starting from 0, when the UE detects, in the TTI j of the subframe n−k, wherein k∈K', and the values of j are from 0 to J−1, and the J is the number of TTIs in a subframe of 1 ms, the PDSCH transmission or the PDCCH/EPDCCH indicating the downlink SPS release, and the corresponding HARQ-ACK response for the PDSCH transmission or the PDCCH/EPDCCH indicating the downlink SPS release shall be provided, the UE transmits the corresponding HARQ-ACK response in the TTI m of the uplink subframe n. Corresponding to a feedback subframe n, the values of (k, j) corresponding to the in-subframe TTI m are as illustrated in Table 3. Here, k∈K', K': $\{k_0, k_1, \ldots, K_{M'-1}\}$, M' represents the number of the downlink subframes fed back in a certain uplink feedback TTI according to the determined HARQ time association. In the row headings of the table, the second row represents the number n of the subframe, and the third row represents the number m of the TTI in the subframe. The descriptions of all the following tables corresponding to the second numbering manner of the other configurations are as same as this; in order to describe simply and conveniently, the descriptions of some tables may be simplified, but the meanings of the parameters in the tables are unchanged.

TABLE 3

| Different special subframe configurations of TDD | Subframe n, TTI m | | | | | | | | | |
|---|---|---|---|---|---|---|---|---|---|---|
| uplink-downlink | 0 | | 1 | | 2 | | 3 | | 4 | |
| configuration 0 | 0 | 1 | 0 | 1 | 0 | 1 | 0 | 1 | 0 | 1 |
| Special subframe configurations 0, 5, 9 and 10 | — | — | — | — | (2, 0) | (2, 1) | (2, 0) | | | |
| Special subframe configurations 1, 2 3, 4, 6, 7 and 8 | | | | | (2, 0) | (2, 1) | (2, 0) | (2, 1) | | |
| TDD uplink-downlink | 5 | | 6 | | 7 | | 8 | | 9 | |
| configuration 0 | 0 | 1 | 0 | 1 | 0 | 1 | 0 | 1 | 0 | 1 |
| Special subframe configurations 0, 5, 9 and 10 | | | | | (2, 0) | (2, 1) | (2, 0) | | | |
| Special subframe configurations 1, 2, 3, 4, 6, 7 and 8 | | | | | (2, 0) | (2, 1) | (2, 0) | (2, 1) | | |

It can be seen from Table 3 that when the length of the TTI is 0.5 ms, the configuration of the TDD frame structure is the LTE TDD uplink-downlink configuration 0, and it is preset that the UpPTS of the special subframe may not transmit the HARQ feedback information of the PDSCH, if the special subframe configurations are 0, 5, 9 and 10, and the TTIs are numbered sequentially in the radio frame starting from 0, when the HARQ feedback of the PDSCH or the PDCCH/EPDCCH indicating the SPS release corresponding to the TTI j in the subframe n−k is detected in the in-subframe TTI m of the uplink subframe n, a downlink association set (k, j) of the feedback timing is that: the (k, j) corresponding to the TTI 0 of the subframe 2 is (2, 0), the (k, j) corresponding to the TTI 1 of the subframe 2 is (2, 1), the (k, j) corresponding to the TTI 0 of the subframe 3 is (2, 0), the (k, j) corresponding to the TTI 0 of the subframe 7 is (2, 0), the (k, j) corresponding to the TTI 1 of the subframe 7 is (2, 1), and the (k, j) corresponding to the TTI 0 of the subframe 8 is (2, 0).

If the special subframe configurations are 1, 2, 3, 4, 6, 7 and 8, and the TTIs are numbered sequentially in the radio frame starting from 0, when the HARQ feedback of the PDSCH or the PDCCH/EPDCCH indicating the SPS release corresponding to the TTI j in the subframe n−k is detected in the in-subframe TTI m of the uplink subframe n, the downlink association set (k, j) of the feedback timing is that: the (k, j) corresponding to the TTI 0 of the subframe 2 is (2, 0), the (k, j) corresponding to the TTI 1 of the subframe 2 is (2, 1), the (k, j) corresponding to the TTI 0 of the subframe 3 is (2, 0), the (k, j) corresponding to the TTI 1 of the subframe 3 is (2, 1), the (k, j) corresponding to the TTI 0 of the subframe 7 is (2, 0), the (k, j) corresponding to the TTI 1 of the subframe 7 is (2, 1), the (k, j) corresponding to the TTI 0 of the subframe 8 is (2, 0), and the (k, j) corresponding to the TTI 1 of the subframe 8 is (2, 1).

The following tables have the similar meanings, which will be described mainly in form of table instead of literal interpretation. Moreover, for saving space, maybe only the related contents including the HARQ process information in the tables are described hereinafter, and the rows and columns not including the HARQ process information will be omitted.

B) The TTI Whose Length is Four/Three OSs l) In consideration of the TTI whose length is four/three (SC-) OFDM symbols, that is, seven (SC-) OFDM symbols of one existing time slot are divided into two Ms. The length of one TTI is four (SC-) OFDM symbols, and the length of another TTI is 3 (SC-) OFDM symbols. For facilitating the following description, the uplink/downlink SC-OFDM symbol/OFDM symbol is described as OS. The TTIs in one radio frame are as illustrated in FIG. 6. FIG. 6 illustrates the situation of normal CP, and the length of the first TTI in a time slot is 4 OSs, and the length of the second TTI is 3 OSs. For the situation where the number of the subframe stays constant, and the TTIs are numbered only in the subframe, the numbers of the TTIs in each subframe are 0-3.

Two situations are considered. In situation 1, it is set that the UpPTS in the special subframe may not transmit the HARQ feedback information of the PDSCH; in situation 2, it is set that the UpPTS in the special subframe may transmit the HARQ feedback information of the PDSCH.

Situation 1

In situation 1, it is set that the UpPTS in the special subframe may not transmit the HARQ feedback information of the PDSCH. The HARQ feedback timing of the PDSCH transmission or the PDCCH/EPDCCH indicating the SPS release in situation 1 are slightly different due to the different special subframe ratios.

Figure 7A:
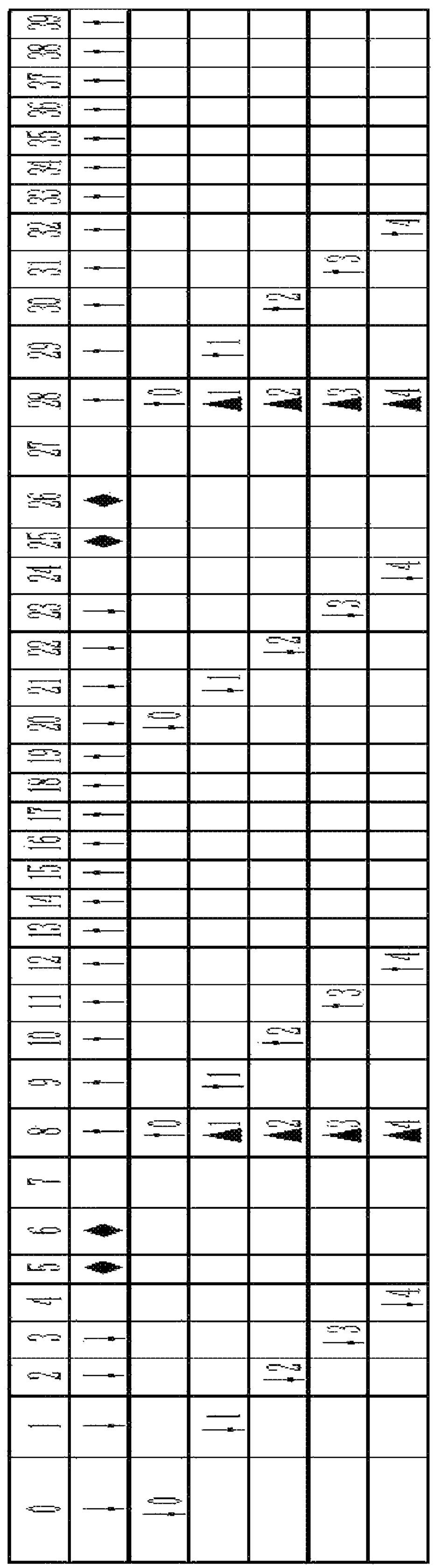
FIG. 7A and FIG. 7B are respectively schematic diagram 1 and schematic diagram 2 of an HARQ feedback timing of the TTI whose length is four/three OSs in situation 1 and in the case of TDD uplink-downlink configuration 0 and special subframe configurations 0 and 5 according to embodiments of the disclosure.
Figure 7B:
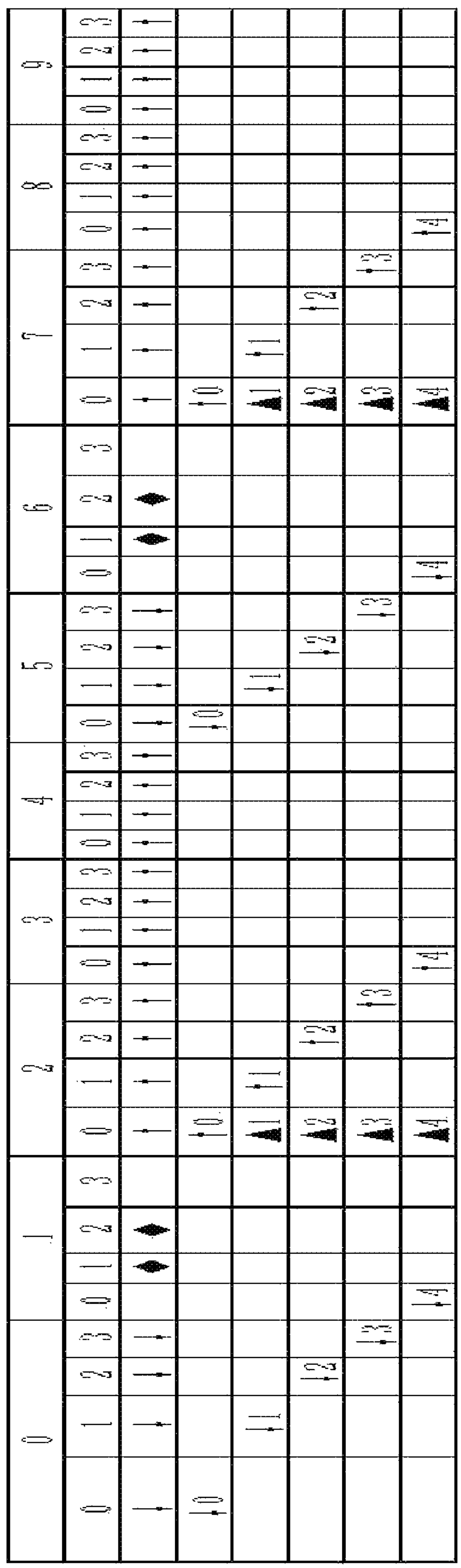

For the special subframe configurations 0 and 5, the downlink HARQ process and the timing are as illustrated in FIG. 7A and FIG. 7B. The downlink process is numbered in the figures. Compared with the feedback position of "↑n", "▲n" may obtain a lower feedback delay, but a feedback load of the same uplink subframe is heavy. FIG. 7A illustrates the situation where the shortened TTIs are numbered sequentially in a frame; and FIG. 7B illustrates the situation where the shortened TTIs are numbered sequentially only in each subframe. The length of the RTT is 5 ms.

For saving space, other special subframe configurations are not illustrated through the accompanying drawings.

Correspondingly, for situation 1, in the case of the TDD uplink-downlink configuration 0 and the length of the TTI being four/three OSs, the values of the K' corresponding to the different uplink TTIs are as illustrated in Table 4. Here, because the downlink-to-uplink switch-point periodicity is 5 ms, the numbers of the TTIs may also only correspond to 5 ms of the existing LTE, that is, the numbers are 0-19. The values in square bracket [ ] in Table 4 represent the HARQ timing defined according to the criterion of the maximum feedback delay, and the values outside of [ ] represent the HARQ timing defined according to the criterion of evenly feeding back on each uplink TTI.

TABLE 4

| Different special subframe configurations of | TTI n | | | | | | | | | |
|---|---|---|---|---|---|---|---|---|---|---|
| the TDD uplink-downlink configuration 0 | 0 | 1 | 2 | 3 | 4 | 5 | 6 | 7 | 8 | 9 |
| Special subframe configurations 0, 5 | — | — | — | — | — | — | — | — | 8[8, 7, 6, 5, 4] | 8 |
| Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | — | 8[8, 7, 6, 5, 4] | 8[4] |
| Special subframe configuration 4 (when the TTI whose ratio of DwPTS to GP to UpPTS is 1:1:1 does not transmit the downlink process) | — | — | — | — | — | — | — | — | 8[8, 7, 6, 5, 4] | 8[4] |
| Special subframe configuration 9 | — | — | — | — | — | — | — | — | 8[8, 7, 6, 5, 4] | 8[4] |
| Special subframe configuration 10 | — | — | — | — | — | — | — | 7[7, 6, 5, 4] | 7[4] | 7[4] |

| Different special subframe configurations of | TTI n | | | | | | | | | |
|---|---|---|---|---|---|---|---|---|---|---|
| the TDD uplink-downlink configuration 0 | 10 | 11 | 12 | 13 | 14 | 15 | 16 | 17 | 18 | 19 |
| Special subframe configurations 0, 5 | 8 | 8 | 8 | — | — | — | — | — | — | — |
| Special subframe configurations 1, 2, 3, 6, 7 and 8 (when the TTI whose ratio of DwPTS to GP to UpPTS is 1:1:1 does not transmit the downlink process in the configuration 4) | 8[4] | 8 | 8 | 8 | 8 | | | | | |
| Special subframe configuration 4 (when the TTI whose ratio of DwPTS to GP to UpPTS is 1:1:1 does not transmit the downlink process) | 8[4] | 8[4] | 8 | 8 | 8 | 8 | | | | |
| Special subframe configuration 9 | 8 | 8 | 8 | 8 | | | | | | |
| Special subframe configuration 10 | 7 | 7 | 7 | | | | | | | |

| Different special subframe configurations of | TTI n | | | | | | | | | |
|---|---|---|---|---|---|---|---|---|---|---|
| the TDD uplink-downlink configuration 0 | 20 | 21 | 22 | 23 | 24 | 25 | 26 | 27 | 28 | 29 |
| Special subframe configurations 0, 5 | — | — | — | — | — | — | — | — | 8[8, 7, 6, 5, 4] | 8 |
| Special subframe configurations 1, 2, 3, 6, 7 and 8 (when the TTI whose ratio of DwPTS to GP to UpPTS is 1:1:1 does not transmit the downlink process in the configuration 4) | | | | | | | | | 8[8, 7, 6, 5, 4] | 8[4] |
| Special subframe configuration 4 (when the TTI whose ratio of DwPTS to GP to UpPTS is 1:1:1 does not transmit the downlink process) | | | | | | | | — | 8[8, 7, 6, 5, 4] | 8[4] |
| Special subframe configuration 9 | | | | | | | | — | 8[8, 7, 6, 5, 4] | 8[4] |
| Special subframe configuration 10 | | | | | | | | 7[7, 6, 5, 4] | 7[4] | 7[4] |

| Different special subframe configurations of | TTI n | | | | | | | | | |
|---|---|---|---|---|---|---|---|---|---|---|
| the TDD uplink-downlink configuration 0 | 30 | 31 | 32 | 33 | 34 | 35 | 36 | 37 | 38 | 39 |
| Special subframe configurations 0, 5 | 8 | 8 | 8 | — | — | — | — | — | — | — |
| Special subframe configurations 1, 2, 3, 6, 7 and 8 (when the TTI whose ratio of DwPTS to GP to UpPTS is 1:1:1 does not transmit the downlink process in the configuration 4) | 8[4] | 8 | 8 | 8 | 8 | | | | | |
| Special subframe configuration 4 (when the TTI whose ratio of DwPTS to GP to UpPTS is 1:1:1 does not transmit the downlink process) | 8[4] | 8[4] | 8 | 8 | 8 | | | | | |
| Special subframe configuration 9 | 8 | 8 | 8 | 8 | | | | | | |
| Special subframe configuration 10 | 7 | 7 | 7 | | | | | | | |

For the second numbering manner, namely the manner of numbering the TTIs only in the subframe, corresponding to the feedback subframe n and the in-subframe TTI, the corresponding values of (k, j) are as illustrated in Table 5.

TABLE 5

| Different special subframe configurations of the TDD uplink- | Subframe n | | | | | | | | | |
|---|---|---|---|---|---|---|---|---|---|---|
| downlink | 0 | | | | 1 | | | | 2 | |
| configuration 0 | 0 | 1 | 3 | 4 | 0 | 1 | 2 | 3 | 0 | 1 |
| Special subframe configurations 0, 5 | — | — | — | — | — | — | — | — | (2, 0)<br>[(2, 0), (2, 1), (2, 2), (2, 3), (1, 0)] | (2, 1) |
| Special subframe configurations 1, 2, 3, 6, 7 and 8 (when the TTI whose ratio of DwPTS to GP to UpPTS is 1:1:1 does not transmit the downlink process in the configuration 4) | | | | | | | | | (2, 0)<br>[(2, 0), (2, 1), (2, 2), (2, 3), (1, 0)] | (2, 1)<br>[(1, 1)] |
| Special subframe configuration 4 (when the TTI whose ratio of DwPTS to GP to UpPTS is 1:1:1 does not transmit the downlink process) | | | | | | | | | (2, 0)<br>[(2, 0), (2, 1), (2, 2), (2, 3), (1, 0)] | (2, 1)<br>[(1, 1)] |
| Special subframe configuration 9 | | | | | | | | | (2, 0)<br>[(2, 0), (2, 1), (2, 2), (2, 3), (1, 0)] | (2, 1)<br>[(1, 1)] |
| Special subframe configuration 10 | | | | | | | | (1, 0)<br>[(1, 0), (1, 1), (1, 2), (1, 3)] | (2, 1)<br>[(1, 0)] | (2, 2)<br>[(1, 1)] |

| Different special subframe configurations of the TDD uplink-downlink | 2 | | 3 | | | | 4 | | | |
|---|---|---|---|---|---|---|---|---|---|---|
| configuration 0 | 2 | 3 | 0 | 1 | 2 | 3 | 0 | 1 | 2 | 3 |
| Special subframe configurations 0, 5 | (2, 2) | (2, 3) | (2, 0) | — | — | — | — | — | — | — |
| Special subframe configurations 1, 2, 3, 6, 7 and 8 (when the TTI whose ratio of DwPTS to GP to UpPTS is 1:1:1 does not transmit the downlink process in the configuration 4) | (2, 2)<br>[1, 2] | (2, 3) | (2, 0) | (2, 1) | (2, 2) | | | | | |
| Special subframe configuration 4 (when the TTI whose ratio of DwPTS to GP to UpPTS is 1:1:1 does not transmit the downlink process) | (2, 2)<br>[(1, 2)] | (2, 3)<br>[(1, 3)] | (2, 0) | (2, 1) | (2, 2) | (2, 3) | | | | |
| Special subframe configuration 9 | (2, 2) | (2, 3) | (2, 0) | (2, 1) | | | | | | |
| Special subframe configuration 10 | (2, 3) | (1, 0) | (2, 1) | | | | | | | |

TABLE 5-continued

| Different special subframe configurations of the TDD uplink-downlink configuration 0 | Subframe n | | | | | | | | | |
|---|---|---|---|---|---|---|---|---|---|---|
| | 5 | | | | 6 | | | | 7 | |
| | 0 | 1 | 3 | 4 | 0 | 1 | 2 | 3 | 0 | 1 |
| Special subframe configurations 0, 5 | — | — | — | — | | | | — | (2, 0) [(2, 0), (2, 1), (2, 2), (2, 3), (1, 0)] | (2, 1) |
| Special subframe configurations 1, 2, 3, 6, 7 and 8 (when the TTI whose ratio of DwPTS to GP to UpPTS is 1:1:1 does not transmit the downlink process in the configuration 4) | | | | | | | | | (2, 0) [(2, 0), (2, 1), (2, 2), (2, 3), (1, 0)] | (2, 1) [(1, 1)] |
| Special subframe configuration 4 (when the TTI whose ratio of DwPTS to GP to UpPTS is 1:1:1 does not transmit the downlink process) | | | | | | | | | (2, 0) [(2, 0), (2, 1), (2, 2), (2, 3), (1, 0)] | (2, 1) [(1, 1)] |
| Special subframe configuration 9 | | | | | | | | | (2, 0) [(2, 0), (2, 1), (2, 2), (2, 3), (1, 0)] | (2, 1) [(1, 1)] |
| Special subframe configuration 10 | | | | | | | | (1, 0) [(1, 0), (1, 1), (1, 2), (1, 3)] | (2, 1) [(1, 0)] | (2, 2) [(1, 1)] |

| Different special subframe configurations of the TDD uplink-downlink configuration 0 | 7 | | 8 | | | | 9 | | | |
|---|---|---|---|---|---|---|---|---|---|---|
| | 2 | 3 | 0 | 1 | 2 | 3 | 0 | 1 | 2 | 3 |
| Special subframe configurations 0, 5 | (2, 2) | (2, 3) | (2, 0) | — | — | — | | | | |
| Special subframe configurations 1, 2, 3, 6, 7 and 8 | (2, 2) [(1, 2)] | (2, 3) | (2, 0) | (2, 1) | (2, 2) | | | | | |
| Special subframe configuration 4 | (2, 2) [(1, 2)] | (2, 3) [(1, 3)] | (2, 0) | (2, 1) | (2, 2) | (2, 3) | | | | |
| Special subframe configuration 9 | (2, 2) | (2, 3) | (2, 0) | (2, 1) | | | | | | |
| Special subframe configuration 10 | (2, 3) | (1, 0) | (2, 1) | | | | | | | |

Situation 2

Figure 8B:
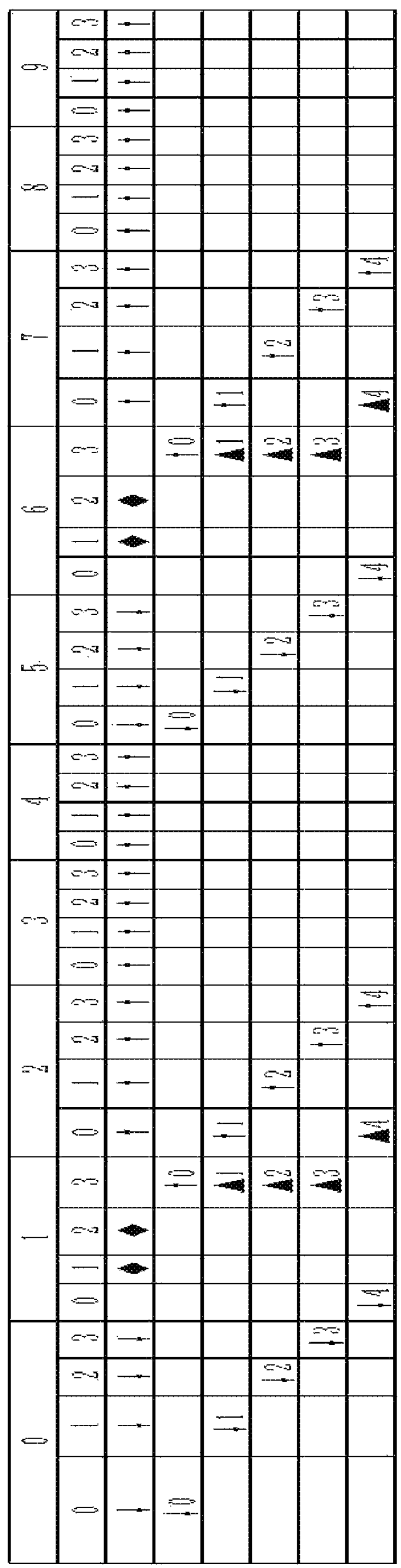

In situation 2, it is set that the UpPTS in the special subframe may transmit the HARQ feedback information of the PDSCH. For the TTI whose length is four/three OSs, if the UpPTS may transmit the HARQ feedback information of the corresponding downlink transmission, for some downlink processes, the HARQ feedback may be faster. For example, for the special subframe configuration s 0 and 5, it is assumed that the downlink process is transmitted by the TTI composed of the DwPTS OS and the GP, the TTI composed of the GP and the UpPTS OS may perform the uplink feedback; the downlink process and the feedback are as illustrated in FIG. 8A and FIG. 8B. The TTIs of FIG. 8A are numbered sequentially in one radio frame, and the TTIs of FIG. 8B are numbered sequentially in each subframe. For saving space, other special subframe configurations are not illustrated through the accompanying drawings. Correspondingly, in the case of the TDD uplink-downlink configuration 0 and the length of the TTI being four/three OSs, the values of the K' corresponding to the different uplink TTIs are as illustrated in Table 6. Here, because the downlink-to-uplink switch-point periodicity is 5 ms, the numbers of the TTIs may also only correspond to 5 ms of the existing LTE, that is, the numbers are 0-19.

TABLE 6

| Different special subframe configurations of the TDD uplink-downlink | TTI n | | | | | | | | | |
|---|---|---|---|---|---|---|---|---|---|---|
| configuration 0 | 0 | 1 | 2 | 3 | 4 | 5 | 6 | 7 | 8 | 9 |
| Special subframe configurations 0, 5 | — | — | — | — | — | — | — | 7 [7, 6, 5, 4] | 7 [4] | 7 |
| Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | 7 [7, 6, 5, 4] | 7 [4] | 7 [4] |
| Special subframe configuration 4 (when the TTI whose ratio of DwPTS to GP to UpPTS is 1:1:1 does not transmit the downlink process) | — | — | — | — | — | — | — | 7 [7, 6, 5, 4] | 7 [4] | 7 [4] |
| Special subframe configuration 9 | — | — | — | — | — | — | — | 7 [7, 6, 5, 4] | 7 [4] | 7 [4] |
| Special subframe configuration 10 | — | — | — | — | — | — | 6 [6, 5, 4] | 6 [4] | 6 [4] | 6 [4] |

| Different special subframe configurations of the TDD uplink-downlink | TTI n | | | | | | | | | |
|---|---|---|---|---|---|---|---|---|---|---|
| configuration 0 | 10 | 11 | 12 | 13 | 14 | 15 | 16 | 17 | 18 | 19 |
| Special subframe configurations 0, 5 | 7 | 7 | — | — | — | — | — | — | — | — |
| Special subframe configurations 1, 2, 3, 6, 7 and 8 (when the TTI whose ratio of DwPTS to GP to UpPTS is 1:1:1 does not transmit the downlink process in the configuration 4) | 7 [4] | 7 | 7 | 7 | | | | | | |
| Special subframe configuration 4 (when the TTI whose ratio of DwPTS to GP to UpPTS is 1:1:1 does not transmit the downlink process) | 7 [4] | 7 [4] | 7 | 7 | 7 | — | | | | |
| Special subframe configuration 9 | 7 | 7 | 7 | | | | | | | |
| Special subframe configuration 10 | 6 | 6 | | | | | | | | |

| Different special subframe configurations of the TDD uplink-downlink | TTI n | | | | | | | | | |
|---|---|---|---|---|---|---|---|---|---|---|
| configuration 0 | 20 | 21 | 22 | 23 | 24 | 25 | 26 | 27 | 28 | 29 |
| Special subframe configurations 0, 5 | — | — | — | — | — | — | — | 7 [7, 6, 5, 4] | 7 [4] | 7 |
| Special subframe configurations 1, 2, 3, 6, 7 and 8 (when the TTI whose ratio of DwPTS to GP to UpPTS is 1:1:1 does not transmit the downlink process in the configuration 4) | | | | | | | — | 7 [7, 6, 5, 4] | 7 [4] | 7 [4] |
| Special subframe configuration 4 (when the TTI whose ratio of DwPTS to GP to UpPTS is 1:1:1 does not transmit the downlink process) | | | | | | | — | 7 [7, 6, 5, 4] | 7 [4] | 7 [4] |
| Special subframe configuration 9 | | | | | | | — | 7 [7, 6, 5, 4] | 7 [4] | 7 [4] |

TABLE 6-continued

| Different special subframe configurations of the TDD uplink-downlink configuration 0 | TTI n | | | | | | | | | |
|---|---|---|---|---|---|---|---|---|---|---|
| Special subframe configuration 10 | | | | | | | 6 [6, 5, 4] | 6 [4] | 6 [4] | 6 [4] |
| | 30 | 31 | 32 | 33 | 34 | 35 | 36 | 37 | 38 | 39 |
| Special subframe configurations 0, 5 | 7 | 7 | — | — | — | — | — | — | — | — |
| Special subframe configurations 1, 2, 3, 6, 7 and 8 (when the TTI whose ratio of DwPTS to GP to UpPTS is 1:1:1 does not transmit the downlink process in the configuration 4) | 7 [4] | 7 | 7 | 7 | | | | | | |
| Special subframe configuration 4 (when the TTI whose ratio of DwPTS to GP to UpPTS is 1:1:1 does not transmit the downlink process) | 7 [4] | 7 [4] | 7 | 7 | 7 | — | | | | |
| Special subframe configuration 9 | 7 | 7 | 7 | | | | | | | |
| Special subframe configuration 10 | 6 | 6 | | | | | | | | |

For the second numbering manner, namely the manner of numbering the TTIs only in the subframe, corresponding to the feedback subframe n and the in-subframe TTIs, the corresponding values of (k, j) are as illustrated in Table 7.

TABLE 7

| Different special subframe configurations of the TDD uplink-downlink configuration 0 | Subframe n | | | | | | | | | |
|---|---|---|---|---|---|---|---|---|---|---|
| | 0 | | | | 1 | | | | 2 | |
| | 0 | 1 | 3 | 4 | 0 | 1 | 2 | 3 | 0 | 1 |
| Special subframe configurations 0, 5 | — | — | — | — | — | — | — | (1, 0) [(1, 0), (1, 1), (1, 2), (1, 3)] | (2, 1) [0, 0)] | (2, 2) |
| Special subframe configurations 1, 2, 3, 6, 7 and 8 (when the TTI whose ratio of DwPTS to GP to UpPTS is 1:1:1 does not transmit the downlink process in the configuration 4) | | | | | | | | (1, 0) [(1, 0), (1, 1), (1, 2), (1, 3)] | (2, 1) [(1, 0)] | (2, 2) [(1, 1)] |
| Special subframe configuration 4 (when the TTI whose ratio of DwPTS to GP to UpPTS is 1:1:1 does not transmit the downlink process) | | | | | | | | (1, 0) [(1, 0), (1, 1), (1, 2), (1, 3)] | (2, 1) [(1, 0)] | (2, 2) [(1, 1)] |

TABLE 7-continued

| | | | | | | | | | | |
|---|---|---|---|---|---|---|---|---|---|---|
| Special subframe configuration 9 | | | | | | | | (1, 0) [(1, 0), (1, 1), (1, 2), (1, 3)] | (2, 1) [(1, 0)] | (2, 2) [(1, 1)] |
| Special subframe configuration 10 | | | | | | | (1, 0) [(1, 0), (1, 1), (1, 2)] | (1, 1) [(1, 3)] | (2, 2) [(1, 0)] | (2, 3) [(1, 1)] |

| Different special subframe configurations of the TDD uplink-downlink | 2 | | 3 | | | | 4 | | | |
|---|---|---|---|---|---|---|---|---|---|---|
| configuration 0 | 2 | 3 | 0 | 1 | 2 | 3 | 0 | 1 | 2 | 3 |
| Special subframe configurations 0, 5 | (2, 3) | (1, 0) | | | | | | — | — | — |
| Special subframe configurations 1, 2, 3, 6, 7 and 8 (when the TTI whose ratio of DwPTS to GP to UpPTS is 1:1:1 does not transmit the downlink process in the configuration 4) | (2, 3) [(1, 2)] | (1, 0) | (2, 1) | (2, 2) | | | | | | |
| Special subframe configuration 4 (when the TTI whose ratio of DwPTS to GP to UpPTS is 1:1:1 does not transmit the downlink process) | (2, 3) [(1, 2)] | (1, 0) [(1, 3)] | (2, 1) | (2, 2) | (2, 3) | | | | | |
| Special subframe configuration 9 | (2, 3) | (1, 0) | (2, 1) | | | | | | | |
| Special subframe configuration 10 | (1, 0) | (1, 1) | | | | | | | | |

| Different special subframe configurations of the TDD | Subframe n | | | | | | | | | |
|---|---|---|---|---|---|---|---|---|---|---|
| uplink-downlink | 5 | | | | 6 | | | | 7 | |
| configuration 0 | 0 | 1 | 3 | 4 | 0 | 1 | 2 | 3 | 0 | 1 |
| Special subframe configurations 0, 5 | — | — | — | — | | | — | ( 1, 0 ) [(1, 0), (1, 1), (1, 2), (1, 3)] | (2, 1) [(1, 0)] | (2, 2) |
| Special subframe configurations 1, 2, 3, 6, 7 and 8 (when the TTI whose ratio of DwPTS to GP to UpPTS is 1:1:1 does not transmit the downlink process in the configuration 4) | | | | | | | | (1, 0) [(1, 0), (1, 1), (1, 2), (1, 3)] | (2, 1) [(1, 0)] | (2, 2) [(1, 1)] |

TABLE 7-continued

| | | | | |
|---|---|---|---|---|
| Special subframe configuration 4 (when the TTI whose ratio of DwPTS to GP to UpPTS is 1:1:1 does not transmit the downlink process) | | (1, 0) [(1, 0), (1, 1), (1, 2), (1, 3)] | (2, 1) [(1, 0)] | (2, 2) [0, 1)] |
| Special subframe configuration 9 | | (1, 0) [(1, 0), (1, 1), (1, 2), (1, 3)] | (2, 1) [(1, 0)] | (2, 2) [0, 1)] |
| Special subframe configuration 10 | (1, 0) [(1, 0), (1, 1), (1, 2)] | (1, 1) [(1, 3)] | (2, 2) [0, 0)] | (2, 3) [0, 1)] |

| Different special subframe configurations of the TDD uplink-downlink | 7 | | 8 | | | | 9 | | | |
|---|---|---|---|---|---|---|---|---|---|---|
| configuration 0 | 2 | 3 | 0 | 1 | 2 | 3 | 0 | 1 | 2 | 3 |
| Special subframe configurations 0, 5 | (2, 3) | (1, 0) | | | | | | | | |
| Special subframe configurations 1, 2, 3, 6, 7 and 8 | (2, 3) [(1, 2)] | (1, 0) | (2, 1) | (2, 2) | | | | | | |
| Special subframe configuration 4 | (2, 3) [(1, 2)] | (1, 0) [0, 3)] | (2, 1) | (2, 2) | (2, 3) | | | | | |
| Special subframe configuration 9 | (2, 3) | (1, 0) | (2, 1) | | | | | | | |
| Special subframe configuration 10 | (1, 0) | (1, 1) | | | | | | | | |

C) The TTI Whose Length is Two OSs

In consideration of the TTI whose length is two OSs, that is, 14 OSs of one existing subframe are divided into seven TTIs. The TTIs in one radio frame are as illustrated in FIG. 9. FIG. 9 illustrates the situation of normal CP. In consideration that the downlink-to-uplink switch-point periodicity is 5 ms for the configuration 0, FIG. 9 illustrates the numbering situation of the former 5 ms in the radio frame, that is, the TTIs are numbered to 34. If the TTIs are numbered sequentially in one radio frame, the maximum number of the TTI in one radio frame is 69. For the situation where the number of the subframe stays constant, and the TTIs are numbered only in the subframe, the numbers of the TTIs in each subframe are 0-6.

Here, it is assumed that the TTI composed of the downlink OS and the GP may transmit the downlink process, the TTI composed of the GP and the uplink OS may feed back the ACK/NACK information of the downlink process. Under this assumption, the special subframe configurations 0 and 5 have the same process and feedback timing; the special subframe configurations 1, 2, 6 and 7 have the same downlink process and feedback timing; the special subframe configurations 3, 4 and 8 have the same downlink process and feedback timing. The downlink processes and the feedback timings of other configurations 9 and 10 are different. The HARQ feedback timings of the PDSCH transmission or the PDCCH/EPDCCH indicating the SPS release in the case of different special time slot configurations are described below. Likewise, in consideration that the downlink-to-uplink switch-point periodicity of the TDD uplink-downlink configuration 0 is 5 ms, only the situation of the HARQ timing in the former 5 ms of each radio frame is described here. If the TTIs are numbered by taking the radio frame of 10 ms as a unit, the numbers of the TTIs are 0-69. For the situation of numbering the TTIs in the subframe, the numbers of the subframes are 0-9, and the numbers of the TTIs in each subframe are 0-6. Only the situations of the HARQ timings when the numbers of the TTIs are 0-34 and the numbers of the subframes are 0-4 are illustrated in the figure.

Figure 10A:
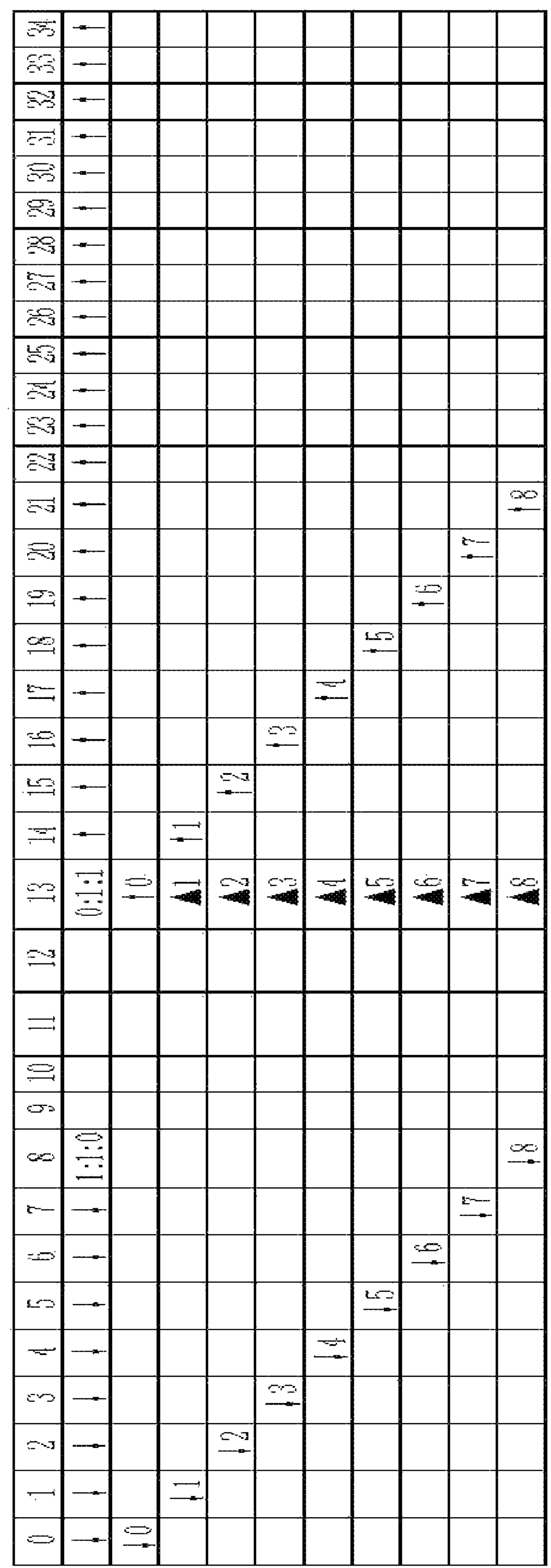
FIG. 10A and FIG. 10B are respectively schematic diagram 1 and schematic diagram 2 of an HARQ feedback timing of the TTI whose length is two OSs in the case of TDD uplink-downlink configuration 0 and special subframe configurations 0 and 5 according to embodiments of the disclosure.
Figure 10B:
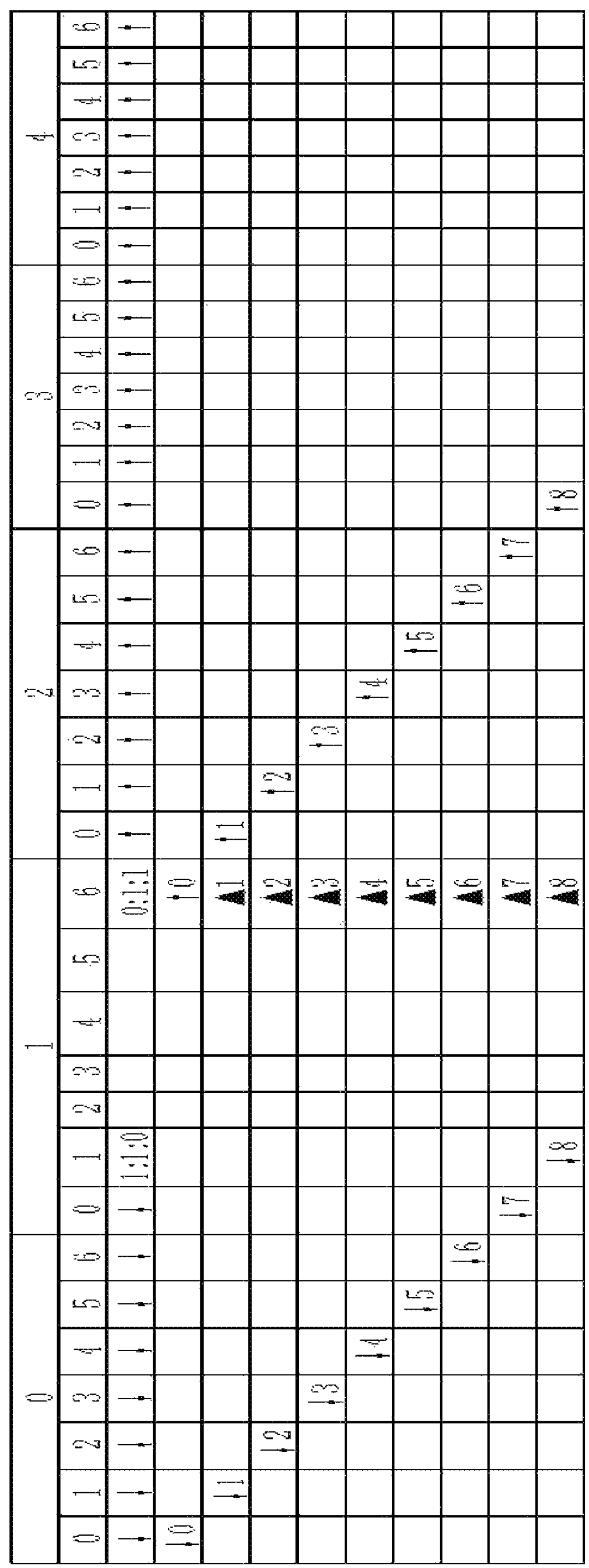

For the special subframe configurations 0 and 5, the downlink HARQ process and the feedback timing are as illustrated in FIG. 10A and FIG. 10B. TTIs in FIG. 10A are numbered sequentially in one radio frame, and Ms in FIG. 10B are numbered sequentially in each subframe. The downlink processes are numbered in the figures. Compared with the feedback position of "↑n", "♦n" may obtain a lower feedback delay, but a feedback load of the same uplink subframe is heavy. The length of the RTT is 5 ms.

For saving space, other special subframe configurations are not illustrated through the accompanying drawings.

Correspondingly, in the case of the TDD uplink-downlink configuration 0 and the length of the TTI being two OSs, the values of the K' corresponding to the different uplink TTIs are as illustrated in Table 8. Here, because the downlink-to-uplink switch-point periodicity is 5 ms, the numbers of the TTIs may also only correspond to 5 ms of the existing LTE, that is, the numbers are 0-34. Here, for saving space, the columns where the TTIs numbered from 0-9, 30-44 and 65-69 do not have a corresponding feedback relationship are omitted, and moreover, the TTI n and TTI n+35 having the same feedback timing are merged. From table completeness, the forms corresponding to the omitted numbers of the TTIs may be restored, and these merged numbers of the TTIs may be expanded. The other configurations later may also be omitted, which does not influence these relative relationships between the feedback Ms and corresponding downlink transmissions thereof.

TABLE 8

| Different special subframe configurations of the TDD uplink-downlink configuration | TTI n | | | | | | | | | |
|---|---|---|---|---|---|---|---|---|---|---|
| 0 | 10/45 | 11/46 | 12/47 | 13/48 | 14/49 | 15/50 | 16/51 | 17/52 | 18/53 | 19/54 |
| Special subframe configurations 0, 5 | | | | 13<br>[13, 12, 11, 10, 9, 8, 7, 6, 5] | 13 | 13 | 13 | 13 | 13 | 13 |
| Special subframe configurations 1, 2, 6 and 7 | | | | 13<br>[13, 12, 11, 10, 9, 8, 7, 6, 5, 4] | 13<br>[4] | 13<br>[4] | 13 | 13 | 13 | 13 |
| Special subframe configurations 3, 4 and 8 | | | | 13<br>[13, 12, 11, 10, 9, 8, 7, 6, 5, 4] | 13<br>[4] | 13<br>[4] | 13<br>[4] | 13 | 13 | 13 |
| Special subframe configuration 9 | | | | 13<br>[13, 12, 11, 10, 9, 8, 7, 6, 5, 4] | 13 | 13 | 13 | 13 | 13 | 13 |
| Special subframe configuration 10 | | 11<br>[11, 10, 9, 8, 7, 6, 5, 4] | 11<br>[4] | 11<br>[4] | 11 | 11 | 11 | 11 | 11 | 11 |

| Different special subframe configurations of the TDD uplink-downlink configuration | TTI n | | | | | | | | | |
|---|---|---|---|---|---|---|---|---|---|---|
| 0 | 20/55 | 21/56 | 22/57 | 23/58 | 24/59 | 25/60 | 26/61 | 27/62 | 28/63 | 29/64 |
| Special subframe configurations 0, 5 | 13 | 13 | — | — | | | | | | |
| Special subframe configurations 1, 2, 6 and 7 | 13 | 13 | 13 | 13 | 13 | | | | | |
| Special subframe configurations 3, 4 and 8 | 13 | 13 | 13 | 13 | 13 | 13 | | | | |
| Special subframe configuration 9 | 13 | 13 | 13 | 13 | | | | | | |
| Special subframe configuration 10 | 11 | 11 | | | | | | | | |

For the second numbering manner, namely the manner of numbering the TTIs only in the subframe, corresponding to the feedback subframe n and the in-subframe TTI m, the corresponding values of (k, j) are as illustrated in Table 9.

TABLE 9

| Different special subframe configurations of the TDD uplink-downlink configuration 0 | Subframe n | | | | | | | | | | | |
|---|---|---|---|---|---|---|---|---|---|---|---|---|
| | 0/5 | | | | | | | 1/6 | | | | |
| | 0 | 1 | 2 | 3 | 4 | 5 | 6 | 0 | 1 | 2 | 3 | 4 |
| Special subframe configurations 0, 5 | | | | | | | | | | | | |
| Special subframe configurations 1, 2, 6 and 7 | | | | | | | | | | | | |
| Special subframe configurations 3, 4 and 8 | | | | | | | | | | | | |
| Special subframe configuration 9 | | | | | | | | | | | | |
| Special subframe configuration 10 | | | | | | | | | | | | (1, 0) [(1, 0), (1, 1), (1, 2), (1, 3), (1, 4), (1, 5), (1, 6), (0, 0)] |

| Different special subframe configurations of the TDD uplink-downlink configuration 0 | Subframe n | | | | | | | | | | | |
|---|---|---|---|---|---|---|---|---|---|---|---|---|
| | 1/6 | | 2/7 | | | | | | | 3/8 | | |
| | 5 | 6 | 0 | 1 | 2 | 3 | 4 | 5 | 6 | 0 | 1 | 2 |
| Special subframe configurations 0, 5 | | (1, 0) [(1, 0), (1, 1), (1, 2), (1, 3), (1, 4), (1, 5), (1, 6), (0, 0), (0, 1)] | (2, 1) | (2, 2) | (2, 3) | (2, 4) | (2, 5) | (2, 6) | (1, 0) | (2, 1) | | |
| Special subframe configurations 1, 2, 6 and 7 | | (1, 0) [(1, 0), (1, 1), (1, 2), (1, 3), (1, 4), (1, 5), (1, 6), (0, 0), (0, 1), (0, 2)] | (2, 1) [(1, 3)] | (2, 2) [(1, 4)] | (2, 3) | (2, 4) | (2, 5) | (2, 6) | (1, 0) | (2, 1) | (2, 2) | (2, 3) |
| Special subframe configurations 3, 4 and 8 | | (1, 0) [(1, 0), (1, 1), (1, 2), (1, 3), (1, 4), (1, 5), (1, 6), (0, 0), (0, 1), (0, 2)] | (2, 1) [(1, 3)] | (2, 2) [(1, 4)] | (2, 3) [(1, 5)] | (2, 4) | (2, 5) | (2, 6) | (1, 0) | (2, 1) | (2, 2) | (2, 3) |
| Special subframe configuration 9 | | (1, 0) [(1, 0), (1, 1), (1, 2), (1, 3), (1, 4), (1, 5), (1, 6), (0, 0), (0, 1), (0, 2)] | (2, 1) | (2, 2) | (2, 3) | (2, 4) | (2, 5) | (2, 6) | (1, 0) | (2, 1) | (2, 2) | |
| Special subframe configuration 10 | (1, 1) [(0, 1)] | (1, 2) [(0, 2)] | (2, 3) | (2, 4) | (2, 5) | (2, 6) | (1, 0) | (1, 1) | (1, 2) | | | |

| Different special subframe configurations of the TDD uplink-downlink configuration 0 | Subframe n | | | | | | | | | | |
|---|---|---|---|---|---|---|---|---|---|---|---|
| | 3/8 | | | | 4/9 | | | | | | |
| | 3 | 4 | 5 | 6 | 0 | 1 | 2 | 3 | 4 | 5 | 6 |
| Special subframe configurations 0, 5 | | | | | | | | | | | |
| Special subframe configurations 1, 2, 6 and 7 | (2, 4) | | | | | | | | | | |
| Special subframe configurations 3, 4 and 8 | (2, 4) | (2, 5) | | | | | | | | | |
| Special subframe configuration 9 | | | | | | | | | | | |
| Special subframe configuration 10 | | | | | | | | | | | |

Example 2: The TDD Uplink-Downlink Configuration 1

The feedback timing determined according to the method of the embodiments of the disclosure when the TDD uplink-downlink configuration is 1 (corresponding to the 11D configuration ratio DSUUDDSUUD) and the lengths of the TTI are 0.5 ms and four/three OFDM symbols is introduced below.

A) the TTI Whose Length is 0.5 ms

In consideration of the TTI whose length is 0.5 ms, that is, the number of (SC-) OFDM symbols included in one TTI is as same as that of one existing time slot, namely 7 (6 in the condition of extended CP).

Two situations are considered. In situation 1, it is set that the UpPTS in the special subframe may not transmit the HARQ feedback information of the PDSCH; in situation 2, it is set that the UpPTS in the special subframe may transmit the HARQ feedback information of the PDSCH.

The special subframe configurations may also divided into two categories. One category is the special subframe configurations 0, 5, 9 and 10, which are set to not perform the downlink transmission in the TTI 3; another is the special subframe configurations 1, 2, 3, 4, 6, 7 and 8, which are set to perform the downlink transmission in the TTI 3. For saving space, no illustration is given through the accompanying drawings.

Correspondingly, in the case of the TDD uplink-downlink configuration 1 and the length of the TTI being 0.5 ms, the values of the K' corresponding to the different uplink TTIs are as illustrated in Table 10. Here, because the downlink-to-uplink switch-point periodicity is 5 ms, the numbers of the TTIs may also only correspond to 5 ms of the existing LTE, that is, the numbers are 0-9.

TABLE 10

| Different special subframe configurations of the TDD uplink-downlink | TTI n | | | | | | | | | |
|---|---|---|---|---|---|---|---|---|---|---|
| configuration 1 | 0 | 1 | 2 | 3 | 4 | 5 | 6 | 7 | 8 | 9 |
| Special subframe configurations 0, 5, 9 and 6:2:6 | — | — | — | — | 6, 5 | 5 | 5 | 5 | — | — |
| Special subframe configurations 1, 2, 3, 4, 6 7, 8 | | | | | 6, 5 | 5, 4 | 4 | 4 | | |
| TDD uplink-downlink | TTI n | | | | | | | | | |
| configuration 0 | 10 | 11 | 12 | 13 | 14 | 15 | 16 | 17 | 18 | 19 |
| Special subframe configurations 0, 5, 9 and 6:2:6 | — | — | | — | 6, 5 | 5 | 5 | 5 | — | — |
| Special subframe configurations 1, 2, 3, 4, 6, 7, 8 | | | | | 6, 5 | 5, 4 | 4 | 4 | | |

For the second numbering manner, namely the manner of numbering the TTIs only in the subframe, corresponding to the feedback subframe n and the in-subframe TTI m, the corresponding values of (k, j) are as illustrated in Table 11.

TABLE 11

| Different special subframe configurations of the TDD uplink-downlink | Subframe n | | | | | | | | | |
|---|---|---|---|---|---|---|---|---|---|---|
| downlink | 0 | | 1 | | 2 | | 3 | | 4 | |
| configuration 1 | 0 | 1 | 0 | 1 | 0 | 1 | 0 | 1 | 0 | 1 |
| Special subframe configurations 0, 5,, 9 and 6:2:6 | — | — | — | — | (3, 0) (3, 1) | (2, 0) | (3, 1) | (2, 0) | | |
| Special subframe configurations 1, 2, 3, 4, 6, 7, 8 | | | | | (3, 0) (3, 1) | (2, 0) (2, 1) | (2, 0) | (2, 1) | | |
| Different special subframe configurations of the TDD uplink-downlink | 5 | | 6 | | 7 | | 8 | | 9 | |
| configuration 1 | 0 | 1 | 0 | 1 | 0 | 1 | 0 | 1 | 0 | 1 |
| Special subframe configurations 0, 5, 9 and 6:2:6 | | | | | (3, 0) (3, 1) | (2, 0) | (3, 1) | (2, 0) | | |
| Special subframe configurations 1, 2, 3, 4, 6, 7, 8 | | | | | (3, 0) (3, 1) | (2, 0) (2, 1) | (2, 0) | (2, 1) | | |

B) The TTI Whose Length is Four/Three OSs

In consideration of the TTI whose length is four/three (SC-) OFDM symbols, that is, seven (SC-) OFDM symbols of one existing time slot are divided into two TTIs. The length of one TTI is four (SC-) OFDM symbols, and the length of another TTI is 3 (SC-) OFDM symbols. Two situations are considered. In situation 1, it is set that the UpPTS in the special subframe may not transmit the HARQ feedback information of the PDSCH; in situation 2, it is set that the UpPTS in the special subframe may transmit the HARQ feedback information of the PDSCH.

Situation 1

In situation 1, it is set that the UpPTS in the special subframe may not transmit the HARQ feedback information of the PDSCH. The HARQ feedback timing of the PDSCH transmission or the PDCCH/EPDCCH indicating the SPS release in situation 1 are slightly different due to the different special subframe configuration ratios.

Correspondingly, for situation 1, in the case of the TDD uplink-downlink configuration 1 and the length of the TTI being four/three OSs, the values of the K' corresponding to the different uplink TTIs are as illustrated in Table 12. Here, because the downlink-to-uplink switch-point periodicity is 5 ms, the numbers of the TTIs may also only correspond to 5 ms of the existing LTE, that is, the numbers are 0-19.

TABLE 12

| Different special subframe configurations of the TDD uplink-downlink configuration 1 | TTI n | | | | | | | | | |
|---|---|---|---|---|---|---|---|---|---|---|
| | 0 | 1 | 2 | 3 | 4 | 5 | 6 | 7 | 8 | 9 |
| Special subframe configurations 0, 5 | — | — | — | — | — | — | — | — | 12, 11 | 11 |
| Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | — | 12, 11 | 11, 10 |
| Special subframe configuration 4 (when the TTI whose ratio of DwPTS to GP to UpPTS is 1:1:1 does not transmit the downlink process) | — | — | — | — | — | — | — | — | 12, 11 | 11, 10 |
| Special subframe configuration 9 | — | — | — | — | — | — | — | — | 12, 11 | 11, 10 |
| Special subframe configuration 10 | — | — | — | — | — | — | — | 11, 10 | 10 | 10 |

| Different special subframe configurations of the TDD uplink-downlink configuration 1 | TTI n | | | | | | | | | |
|---|---|---|---|---|---|---|---|---|---|---|
| | 10 | 11 | 12 | 13 | 14 | 15 | 16 | 17 | 18 | 19 |
| Special subframe configurations 0, 5 | 11 | 11 | 11 | 11 | 11 | 11 | — | — | — | — |
| Special subframe configurations 1, 2, 3, 6, 7 and 8 (when the TTI whose ratio of DwPTS to GP to UpPTS is 1:1:1 does not transmit the downlink process in the configuration 4) | 10, 9 | 9 | 9 | 9 | 9 | 9 | | | | |
| Special subframe configuration 4 (when the TTI whose ratio of DwPTS to GP to UpPTS is 1:1:1 does not transmit the downlink process) | 10, 9 | 9, 8 | 8 | 8 | 8 | 8 | | | | |
| Special subframe configuration 9 | 10 | 10 | 10 | 10 | 10 | 10 | | | | |
| Special subframe configuration 10 | 10 | 10 | 10 | 10 | 10 | 10 | | | | |

| Different special subframe configurations of the TDD uplink-downlink configuration 1 | TTI n | | | | | | | | | |
|---|---|---|---|---|---|---|---|---|---|---|
| | 20 | 21 | 22 | 23 | 24 | 25 | 26 | 27 | 28 | 29 |
| Special subframe configurations 0, 5 | — | — | — | — | — | — | — | — | 12, 11 | 11 |
| Special subframe configurations 1, 2, 3, 6, 7 and 8 (when the TTI whose ratio of DwPTS to GP to UpPTS is 1:1:1 does not transmit the downlink process in the configuration 4) | | | | | | | | — | 12, 11 | 11, 10 |
| Special subframe configuration 4 (when the TTI whose ratio of DwPTS to GP to UpPTS is 1:1:1 does not transmit the downlink process) | | | | | | | | — | 12, 11 | 11, 10 |
| Special subframe configuration 9 | | | | | | | | — | 12, 11 | 11, 10 |
| Special subframe configuration 10 | | | | | | | | 11, 10 | 10 | 10 |

| Different special subframe configurations of the TDD uplink-downlink configuration 1 | TTI n | | | | | | | | | |
|---|---|---|---|---|---|---|---|---|---|---|
| | 30 | 31 | 32 | 33 | 34 | 35 | 36 | 37 | 38 | 39 |
| Special subframe configurations 0, 5 | 11 | 11 | 11 | 11 | 11 | 11 | — | — | — | — |
| Special subframe configurations 1, 2, 3, 6, 7 and 8 (when the TTI whose ratio of DwPTS to GP to UpPTS is 1:1:1 does not transmit the downlink process in the configuration 4) | 10, 9 | 9 | 9 | 9 | 9 | 9 | | | | |

TABLE 12-continued

| | | | | | | |
|---|---|---|---|---|---|---|
| Special subframe configuration 4 (when the TTI whose ratio of DwPTS to GP to UpPTS is 1:1:1 does not transmit the downlink process) | 10, 9 | 9, 8 | 8 | 8 | 8 | 8 |
| Special subframe configuration 9 | 10 | 10 | 10 | 10 | 10 | 10 |
| Special subframe configuration 10 | 10 | 10 | 10 | 10 | 10 | 10 |

For the second numbering manner, namely the manner of numbering the TTIs only in the subframe, corresponding to the feedback subframe n and the in-subframe TTI m, the corresponding values of (k, j) are as illustrated in Table 13.

TABLE 13

| Different special subframe configurations of the TDD uplink- | Subframe n | | | | | | | | | |
|---|---|---|---|---|---|---|---|---|---|---|
| downlink | 0 | | | | 1 | | | | 2 | |
| configuration 1 | 0 | 1 | 3 | 4 | 0 | 1 | 2 | 3 | 0 | 1 |
| Special subframe configurations 0, 5 | — | — | — | — | — | — | — | — | (3, 0)(3, 1) | (3, 2) |
| Special subframe configurations 1, 2, 3, 6, 7 and 8 (when the TTI whose ratio of DwPTS to GP to UpPTS is 1:1:1 does not transmit the downlink process in the configuration 4) | | | | | | | | | (3, 0)(3, 1) | (3, 2)(3, 3) |
| Special subframe configuration 4 (when the TTI whose ratio of DwPTS to GP to UpPTS is 1:1:1 does not transmit the downlink process) | | | | | | | | | (3, 0)(3, 1) | (3, 2)(3, 3) |
| Special subframe configuration 9 | | | | | | | | | (3, 0)(3, 1) | (3, 2)(3, 3) |
| Special subframe configuration 10 | | | | | | | | (2, 0)(2, 1) | (3, 2) | (3, 3) |

| Different special subframe configurations of the TDD uplink-downlink | 2 | | 3 | | | | 4 | | | |
|---|---|---|---|---|---|---|---|---|---|---|
| configuration 1 | 2 | 3 | 0 | 1 | 2 | 3 | 0 | 1 | 2 | 3 |
| Special subframe configurations 0, 5 | (3, 3) | (2, 0) | (3, 1) | (3, 2) | (3, 3) | (2, 0) | — | — | — | — |
| Special subframe configurations 1, 2, 3, 6, 7 and 8 (when the TTI whose ratio of DwPTS to GP to UpPTS is 1:1:1 does not transmit the downlink process in the configuration 4) | (2, 0)(2, 1) | (2, 2) | (3, 3) | (2, 0) | (2, 1) | (2, 2) | | | | |
| Special subframe configuration 4 (when the TTI | (2, 0)(2, 1) | (2, 2)(2, 3) | (2, 0) | (2, 1) | (2, 2) | (2, 3) | | | | |

TABLE 13-continued

| | | | | | | | | | | |
|---|---|---|---|---|---|---|---|---|---|---|
| whose ratio of DwPTS to GP to UpPTS is 1:1:1 does not transmit the downlink process) | | | | | | | | | | |
| Special subframe configuration 9 | (2, 0) | (2, 1) | (3, 2) | (3, 3) | (2, 0) | (2, 1) | | | | |
| Special subframe configuration 10 | (2, 0) | (2, 1) | (3, 2) | (3, 3) | (2, 0) | (2, 1) | | | | |

| Different special subframe configurations of the TDD uplink- | Subframe n | | | | | | | | | |
|---|---|---|---|---|---|---|---|---|---|---|
| downlink | 5 | | | | 6 | | | | 7 | |
| configuration 1 | 0 | 1 | 3 | 4 | 0 | 1 | 2 | 3 | 0 | 1 |
| Special subframe configurations 0, 5 | — | — | — | — | | | | — | (3, 0)(3, 1) | (3, 2) |
| Special subframe configurations 1, 2, 3, 6, 7 and 8 (when the TTI whose ratio of DwPTS to GP to UpPTS is 1:1:1 does not transmit the downlink process in the configuration 4) | | | | | | | | | (3, 0)(3, 1) | (3, 2)(3, 3) |
| Special subframe configuration 4 (when the TTI whose ratio of DwPTS to GP to UpPTS is 1:1:1 does not transmit the downlink process) | | | | | | | | | (3, 0)(3, 1) | (3, 2)(3, 3) |
| Special subframe configuration 9 | | | | | | | | | (3, 0)(3, 1) | (3, 2)(3, 3) |
| Special subframe configuration 10 | | | | | | | | (2, 0)(2, 1) | (3, 2) | (3, 3) |

| Different special subframe configurations of the TDD uplink-downlink | 7 | | 8 | | | | 9 | | | |
|---|---|---|---|---|---|---|---|---|---|---|
| configuration 1 | 2 | 3 | 0 | 1 | 2 | 3 | 0 | 1 | 2 | 3 |
| Special subframe configurations 0, 5 | (3, 3) | (2, 0) | (3, 1) | (3, 2) | (3, 3) | (2, 0) | | | | |
| Special subframe configurations 1, 2, 3, 6, 7 and 8 | (2, 0)(2, 1) | (2, 2) | (3, 3) | (2, 0) | (2, 1) | (2, 2) | | | | |
| Special subframe configuration 4 | (2, 0)(2, 1) | (2, 2)(2, 3) | (2, 0) | (2, 1) | (2, 2) | (2, 3) | | | | |
| Special subframe configuration 9 | (2, 0) | (2, 1) | (3, 2) | (3, 3) | (2, 0) | (2, 1) | | | | |
| Special subframe configuration 10 | (2, 0) | (2, 1) | (3, 2) | (3, 3) | (2, 0) | (2, 1) | | | | |

Situation 2

In situation 2, it is set that the UpPTS in the special subframe may transmit the HARQ feedback information of the PDSCH.

For the TTI whose length is four/three OSs, if the UpPTS may transmit the HARQ feedback information of the corresponding downlink transmission, for some downlink processes, the HARQ feedback may be faster.

Correspondingly, in the case of the TDD uplink-downlink configuration 1 and the length of the TTI being four/three OSs, the values of the K' corresponding to the different uplink TTIs are as illustrated in Table 14. Here, because the downlink-to-uplink switch-point periodicity is 5 ms, the numbers of the TTIs may also only correspond to 5 ms of the existing LTE, that is, the numbers are 0-19.

TABLE 14

| Different special subframe configurations of the TDD uplink-downlink | TTI n | | | | | | | | | |
|---|---|---|---|---|---|---|---|---|---|---|
| configuration 1 | 0 | 1 | 2 | 3 | 4 | 5 | 6 | 7 | 8 | 9 |
| Special subframe configurations 0, 5 | — | — | — | — | — | — | — | 11 | 11 | 11 |
| Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | 11, 10 | 10, 9 | 9 |
| Special subframe configuration 4 (when the TTI whose ratio of DwPTS to GP to UpPTS is 1:1:1 does not transmit the downlink process) | — | — | — | — | — | — | — | 11, 10 | 10, 9 | 9, 8 |
| Special subframe configuration 9 | — | — | — | — | — | — | — | 11, 10 | 10 | 10 |
| Special subframe configuration 10 | — | — | — | — | — | — | 10 | 10 | 10 | 10 |

| Different special subframe configurations of the TDD uplink-downlink | TTI n | | | | | | | | | |
|---|---|---|---|---|---|---|---|---|---|---|
| configuration 1 | 10 | 11 | 12 | 13 | 14 | 15 | 16 | 17 | 18 | 19 |
| Special subframe configurations 0, 5 | 11 | 11 | 11 | 11 | 11 | 11 | — | — | — | — |
| Special subframe configurations 1, 2, 3, 6, 7 and 8 (when the TTI whose ratio of DwPTS to GP to UpPTS is 1:1:1 does not transmit the downlink process in the configuration 4) | 9 | 9 | 9 | 9 | 9 | 9 | | | | |

TABLE 14-continued

| Different special subframe configurations of the TDD uplink-downlink | TTI n | | | | | | | | | |
|---|---|---|---|---|---|---|---|---|---|---|
| configuration 1 | 10 | 11 | 12 | 13 | 14 | 15 | 16 | 17 | 18 | 19 |
| Special subframe configuration 4 (when the TTI whose ratio of DwPTS to GP to UpPTS is 1:1:1 does not transmit the downlink process) | 8 | 8 | 8 | 8 | 8 | 8 | | | | |
| Special subframe configuration 9 | 10 | 10 | 10 | 10 | 10 | 10 | | | | |
| Special subframe configuration 10 | 10 | 10 | 10 | 10 | 10 | 10 | | | | |

| Different special subframe configurations of the TDD uplink-downlink | TTI n | | | | | | | | | |
|---|---|---|---|---|---|---|---|---|---|---|
| configuration 1 | 20 | 21 | 22 | 23 | 24 | 25 | 26 | 27 | 28 | 29 |
| Special subframe configurations 0, 5 | — | — | — | — | — | — | — | 11 | 11 | 11 |
| Special subframe configurations 1, 2, 3, 6, 7 and 8 (when the TTI whose ratio of DwPTS to GP to UpPTS is 1:1:1 does not transmit the downlink process in the configuration 4) | | | | | | | — | 11, 10 | 10, 9 | 9 |
| Special subframe configuration 4 (when the TTI whose ratio of DwPTS to GP to UpPTS is 1:1:1 does not transmit the downlink process) | | | | | | | — | 11, 10 | 10, 9 | 9, 8 |
| Special subframe configuration 9 | | | | | | | — | 11, 10 | 10 | 10 |
| Special subframe configuration 10 | | | | | | | 10 | 10 | 10 | 10 |

| Different special subframe configurations of the TDD uplink-downlink | TTI n | | | | | | | | | |
|---|---|---|---|---|---|---|---|---|---|---|
| configuration 1 | 30 | 31 | 32 | 33 | 34 | 35 | 36 | 37 | 38 | 39 |
| Special subframe configurations 0, 5 | 11 | 11 | 11 | 11 | 11 | 11 | — | — | — | — |
| Special subframe configurations 1, 2, 3, 6, 7 and 8 (when the TTI whose ratio of DwPTS to GP to UpPTS is 1:1:1 does not transmit the downlink process in the configuration 4) | 9 | 9 | 9 | 9 | 9 | 9 | | | | |
| Special subframe configuration 4 (when the TTI whose ratio of | 8 | 8 | 8 | 8 | 8 | 8 | | | | |

TABLE 14-continued

| | | | | | | |
|---|---|---|---|---|---|---|
| DwPTS to GP to UpPTS is 1:1:1 does not transmit the downlink process) | | | | | | |
| Special subframe configuration 9 | 10 | 10 | 10 | 10 | 10 | 10 |
| Special subframe configuration 10 | 10 | 10 | 10 | 10 | 10 | 10 |

For the second numbering manner, namely the manner of numbering the TTIs only in the subframe, corresponding to the feedback subframe n and the in-subframe TTI m, the corresponding values of (k, j) are as illustrated in Table 15.

TABLE 15

| Different special subframe configurations | Subframe n | | | | | | | | | |
|---|---|---|---|---|---|---|---|---|---|---|
| of the TDD uplink | 0 | | | | 1 | | | | 2 | |
| downlink configuration 1 | 0 | 1 | 3 | 4 | 0 | 1 | 2 | 3 | 0 | 1 |
| Special subframe configurations 0, 5 | — | — | — | — | — | — | — | (2, 0) | (3, 1) | (3, 2) |
| Special subframe configurations 1, 2, 3, 6, 7 and 8 (when the TTI whose ratio of DwPTS to GP to UpPTS is 1:1:1 does not transmit the downlink process in the configuration 4) | | | | | | | | (2, 0)(2, 1) | (3, 2)(3, 3) | (2, 0) |
| Special subframe configuration 4 (when the TTI whose ratio of DwPTS to GP to UpPTS is 1:1:1 does not transmit the downlink process) | | | | | | | | (2, 0)(2, 1) | (3, 2)(3, 3) | (2, 0)(2, 1) |
| Special subframe configuration 9 | | | | | | | | (2, 0)(2, 1) | (3, 2) | (3, 3) |
| Special subframe configuration 10 | | | | | | | (2, 0) | (2, 1) | (3, 2) | (3, 3) |

| Different special subframe configurations of the TDD uplink- | 2 | | 3 | | | | 4 | | | |
|---|---|---|---|---|---|---|---|---|---|---|
| downlink configuration 1 | 2 | 3 | 0 | 1 | 2 | 3 | 0 | 1 | 2 | 3 |
| Special subframe configurations 0, 5 | (3, 3) | (2, 0) | (3, 1) | (3, 2) | (3, 3) | (2, 0) | | — | — | — |
| Special subframe configurations 1, 2, 3, 6, 7 and 8 (when the TTI whose ratio of DwPTS to GP to UpPTS is 1:1:1 does not transmit the downlink process in the configuration 4) | (2, 1) | (2, 2) | (3, 3) | (2, 0) | (2, 1) | (2, 2) | | | | |
| Special subframe configuration 4 (when the TTI whose ratio of DwPTS to GP to UpPTS is 1:1:1 does not transmit the downlink process) | (2, 2) | (2, 3) | (2, 0) | (2, 1) | (2, 2) | (2, 3) | | | | |
| Special subframe configuration 9 | (2, 0) | (2, 1) | (3, 2) | (3, 3) | (2, 0) | (2, 1) | | | | |
| Special subframe configuration 10 | (2, 0) | (2, 1) | (3, 2) | (3, 3) | (2, 0) | (2, 1) | | | | |

TABLE 15-continued

| Different special subframe configurations of the TDD uplink-downlink configuration 1 | Subframe n | | | | | | | | | |
|---|---|---|---|---|---|---|---|---|---|---|
| | 5 | | | | 6 | | | | 7 | |
| | 0 | 1 | 3 | 4 | 0 | 1 | 2 | 3 | 0 | 1 |
| Special subframe configurations 0, 5 | — | — | — | — | | | — | (2, 0) | (3, 1) | (3, 2) |
| Special subframe configurations 1, 2, 3, 6, 7 and 8 (when the TTI whose ratio of DwPTS to GP to UpPTS is 1:1:1 does not transmit the downlink process in the configuration 4) | | | | | | | | (2, 0)(2, 1) | (3, 2)(3, 3) | (2, 0) |
| Special subframe configuration 4 (when the TTI whose ratio of DwPTS to GP to UpPTS is 1:1:1 does not transmit the downlink process) | | | | | | | | (2, 0)(2, 1) | (3, 2)(3, 3) | (2, 0)(2, 1) |
| Special subframe configuration 9 | | | | | | | | (2, 0)(2, 1) | (3, 2) | (3, 3) |
| Special subframe configuration 10 | | | | | | | (2, 0) | (2, 1) | (3, 2) | (3, 3) |

| Different special subframe configurations of the TDD uplink-downlink configuration 1 | 7 | | 8 | | | | 9 | | | |
|---|---|---|---|---|---|---|---|---|---|---|
| | 2 | 3 | 0 | 1 | 2 | 3 | 0 | 1 | 2 | 3 |
| Special subframe configurations 0, 5 | (3, 3) | (2, 0) | (3, 1) | (3, 2) | (3, 3) | (2, 0) | | | | |
| Special subframe configurations 1, 2, 3, 6, 7 and 8 | (2, 1) | (2, 2) | (3, 3) | (2, 0) | (2, 1) | (2, 2) | | | | |
| Special subframe configuration 4 | (2, 2) | (2, 3) | (2, 0) | (2, 1) | (2, 2) | (2, 3) | | | | |
| Special subframe configuration 9 | (2, 0) | (2, 1) | (3, 2) | (3, 3) | (2, 0) | (2, 1) | | | | |
| Special subframe configuration 10 | (2, 0) | (2, 1) | (3, 2) | (3, 3) | (2, 0) | (2, 1) | | | | |

C) The TTI Whose Length is Two OSs

In consideration of the TTI whose length is two OSs, that is, 14 OSs of one existing subframe are divided into seven TTIs. The situation of normal CP is described here for example. In consideration that the downlink-to-uplink switch-point periodicity is 5 ms for the uplink-downlink configuration 1, if the Ms are numbered sequentially in one radio frame, the numbers of the Ms in the former 5 ms in the radio frame are 0-34, and the maximum number of the TTI in one radio frame is 69. For the situation where the number of the subframe stays constant, and the TTIs are numbered only in the subframe, the numbers of the TTIs in each subframe are 0-6.

It is assumed that the TTI composed of the downlink OS and the GP may transmit the downlink process, the TTI composed of the GP and the uplink OS may feed back the ACK/NACK information of the downlink process. Under this assumption, the special subframe configurations 0 and 5 have the same process and feedback timing; the special subframe configurations 1, 2, 6 and 7 have the same downlink process and feedback timing; the special subframe configurations 3, 4 and 8 have the same downlink process and feedback timing. The downlink processes and the feedback timings of configuration 9 and configuration with the ratio of 6:2:6 are different. The HARQ feedback timings of the PDSCH transmission or the PDCCH/EPDCCH indicating the SPS release in the case of different special time slot configurations are described below. Likewise, in consideration that the downlink-to-uplink switch-point periodicity of the TDD uplink-downlink configuration 0 is 5 ms, only the situation of the HARQ timing in the former 5 ms of each radio frame is described here. If the TTIs are numbered by taking the radio frame of 10 ms as a unit, the numbers of the TTIs are 0-69. For the situation of numbering the TTIs in the subframe, the numbers of the subframes are 0-9, and the numbers of the TTIs in each subframe are 0-6.

Correspondingly, in the case of the TDD uplink-downlink configuration 1 and the length of the TTI being two OSs, the values of the K' corresponding to the different uplink TTIs are as illustrated in Table 16. Here, because the downlink-to-uplink switch-point periodicity is 5 ms, the numbers of the TTIs may also only correspond to 5 ms of the existing LTE, that is, the numbers are 0-34. In Table 16, "0/35" represents TTI 0 or TTI 35, "1/36" represents TTI 1 or TTI 36, . . . . Because the downlink-to-uplink switch-point periodicity is 5 ms, and each period includes 35 TTIs, the TTIs with intervals of 35 TTIs among them have the similar feedback timing, and there are also similar representations in the following tables.

TABLE 16

| Different special subframe configurations of the TDD uplink-downlink configuration 1 | TTI n 10/45 | 11/46 | 12/47 | 13/48 | 14/49 | 15/50 | 16/51 | 17/52 | 18/53 | 19/54 |
|---|---|---|---|---|---|---|---|---|---|---|
| Special subframe configurations 0, 5 | | | | 20, 19 | 19 | 19 | 19 | 19 | 19 | 19 |
| Special subframe configurations 1, 2, 6 and 7 | | | | 20, 19 | 19, 18 | 18, 17 | 17, 16 | 16 | 16 | 16 |
| Special subframe configurations 3, 4 and 8 | | | | 20, 19 | 19, 18 | 18, 17 | 17, 16 | 16, 15 | 15 | 15 |
| Special subframe configuration 9 | | | | 20, 19 | 19, 18 | 18 | 18 | 18 | 18 | 18 |
| Special subframe configuration 10 | | 18 | 18 | 18 | 18 | 18 | 18 | 18 | 18 | 18 |

| UL-DLConfiguration | TTI n 20/55 | 21/56 | 22/57 | 23/58 | 24/59 | 25/60 | 26/61 | 27/62 | 28/63 | 29/64 |
|---|---|---|---|---|---|---|---|---|---|---|
| Special subframe configurations 0, 5 | 19 | 19 | 19 | 19 | 19 | 19 | 19 | 19 | | |
| Special subframe configurations 1, 2, 6 and 7 | 16 | 16 | 16 | 16 | 16 | 16 | 16 | 16 | | |
| Special subframe configurations 3, 4 and 8 | 15 | 15 | 15 | 15 | 15 | 15 | 15 | 15 | | |
| Special subframe configuration 9 | 18 | 18 | 18 | 18 | 18 | 18 | 18 | 18 | | |
| Special subframe configuration 10 | 18 | 18 | 18 | 18 | 18 | 18 | 18 | 18 | | |

For the second numbering manner, namely the manner of numbering the TTIs only in the subframe, corresponding to the feedback subframe n and the in-subframe TTI m, the corresponding values of (k, j) are as illustrated in Table 17.

TABLE 17

| Different special subframe configurations of the TDD uplink-downlink configuration 1 | Subframe n 0/5 | | | | | | | 1/6 | | | | |
|---|---|---|---|---|---|---|---|---|---|---|---|---|
| | 0 | 1 | 2 | 3 | 4 | 5 | 6 | 0 | 1 | 2 | 3 | 4 |
| Special subframe configurations 0, 5 | | | | | | | | | | | | |
| Special subframe configurations 1, 2, 6 and 7 | | | | | | | | | | | | |
| Special subframe configurations 3, 4 and 8 | | | | | | | | | | | | |
| Special subframe configuration 9 | | | | | | | | | | | | |
| Special subframe configuration 10 | | | | | | | | | | | | (2, 0) |

TABLE 17-continued

| Different special subframe configurations of the TDD uplink-downlink configuration | Subframe n | | | | | | | | | | | |
|---|---|---|---|---|---|---|---|---|---|---|---|---|
| | 1/6 | | 2/7 | | | | | | | 3/8 | | |
| 1 | 5 | 6 | 0 | 1 | 2 | 3 | 4 | 5 | 6 | 0 | 1 | 2 |
| Special subframe configurations 0, 5 | | (2, 0)(2, 1) | (3, 2) | (3, 3) | (3, 4) | (3, 5) | (3, 6) | (2, 0) | (2, 1) | (3, 2) | (3, 3) | (3, 4) |
| Special subframe configurations 1, 2, 6 and 7 | | (2, 0)(2, 1) | (3, 2) (3, 3) | (3, 4) (3, 5) | (3, 6) (2, 0) | (2, 1) | (2, 2) | (2, 3) | (2, 4) | (3, 5) | (3, 6) | (2, 0) |
| Special subframe configurations 3, 4 and 8 | | (2, 0)(2, 1) | (3, 2) (3, 3) | (3, 4) (3, 5) | (3, 6) (2, 0) | (2, 1) (2, 2) | (2, 3) | (2, 4) | (2, 5) | (3, 6) | (2, 0) | (2, 1) |
| Special subframe configuration 9 | | (2, 0)(2, 1) | (3, 2) (3, 3) | (3, 4) | (3, 5 | (3, 6) | (2, 0) | (2, 1) | (2, 2) | (3, 3) | (3, 4) | (3, 5) |
| Special subframe configuration 10 | (2, 1) | (2, 2) | (3, 3) | (3, 4) | (3, 5) | (3, 6) | (2, 0) | (2, 1) | (2, 2) | (3, 3) | (3, 4) | (3, 5) |

| Different special subframe configurations of the TDD uplink-downlink configuration | Subframe n | | | | | | | | | | |
|---|---|---|---|---|---|---|---|---|---|---|---|
| | 3/8 | | | | 4/9 | | | | | | |
| 1 | 3 | 4 | 5 | 6 | 0 | 1 | 2 | 3 | 4 | 5 | 6 |
| Special subframe configurations 0, 5 | (3, 5) | (3, 6) | (2, 0) | (2, 1) | | | | | | | |
| Special subframe configurations 1, 2, 6 and 7 | (2, 1) | (2, 2) | (2, 3) | (2, 4) | | | | | | | |
| Special subframe configurations 3, 4 and 8 | (2, 2) | (2, 3) | (2, 4) | (2, 5) | | | | | | | |
| Special subframe configuration 9 | (3, 6) | (2, 0) | (2, 1) | (2, 2) | | | | | | | |
| Special subframe configuration 10 | (3, 6) | (2, 0) | (2, 1) | (2, 2) | | | | | | | |

Example 3: The TDD Uplink-Downlink Configuration 2

A) the TTI Whose Length is 0.5 ms

In consideration of the TTI whose length is 0.5 ms, that is, the number of (SC-) OFDM symbols included in one TTI is as same as that of one existing time slot, namely 7 (6 in the condition of extended CP). What is described here is the situation of normal CP. For the situation where the number of the subframe stays constant, and the TTIs are numbered only in the subframe, the numbers of the TTIs in each subframe are 0-1.

Two situations are considered. In situation 1, it is set that the UpPTS in the special subframe may not transmit HARQ feedback information of the PDSCH; in situation 2, it is set that the UpPTS in the special subframe may transmit the HARQ feedback information of the PDSCH.

The special subframe configurations may also divided into two categories. One category is the special subframe configurations 0, 5, 9 and 10, which are set to not perform the downlink transmission in the second TTI; another is the special subframe configurations 1, 2, 3, 4, 6, 7 and 8, which are set to perform the downlink transmission in the second TTI.

For situation 1, when the special subframe configurations are 0, 5, 9 and 10, there are five downlink processes in the HARQ feedback timing of the PDSCH transmission or the PDCCH/EPDCCH indicating the SPS release, the RTT is 100 Ms in which seven processes are transmitted, and the length of the RTT is about 7.143 ms.

For situation 1, when the special subframe configurations are 1, 2, 3, 4, 6, 7 and 8, there are 12 downlink processes in the HARQ feedback timing of the PDSCH transmission or the PDCCH/EPDCCH indicating the SPS release, the RTT is 15 Ms, and the length of the RTT is about 7.5 ms.

Correspondingly, in the case of the TDD uplink-downlink configuration 2 and the length of the TTI being 0.5 ms, for situation 1, the values of the K' corresponding to the different uplink TTIs are as illustrated in Table 18. Here, because the downlink-to-uplink switch-point periodicity is 5 ms, the numbers of the TTIs may also only correspond to 5 ms of the existing LTE, that is, the numbers of the TTIs are 0-9.

TABLE 18

| Different special subframe configurations of the TDD | TTI n | | | | | | | | | |
|---|---|---|---|---|---|---|---|---|---|---|
| uplink-downlink configuration 2 | 0 | 1 | 2 | 3 | 4 | 5 | 6 | 7 | 8 | 9 |
| Special subframe configuration s 0, 5, 9 and 6:2:6 | — | — | — | — | 12, 8, 7, 6 | 6, 5, 4 | | | — | — |
| Special subframe configurations 1, 2, 3, 4, 6, 7, 8 | | | | | 12, 11, 8, 7 | 7, 6, 5, 4 | | | | |
| Different special subframe configurations of the TDD | TTI n | | | | | | | | | |
| uplink-downlink configuration 2 | 10 | 11 | 12 | 13 | 14 | 15 | 16 | 17 | 18 | 19 |
| Special subframe configurations 0, 5, 9 and 6:2:6 | — | — | | — | 12, 8, 7, 6 | 6, 5, 4 | | | — | — |
| Special subframe configurations 1, 2, 3, 4, 6, 7, 8 | | | | | 12, 11, 8, 7 | 7, 6, 5, 4 | | | | |

For the second numbering manner, namely the manner of numbering the TTIs only in the subframe, corresponding to the feedback subframe n and the in-subframe TTI m, the corresponding values of (k, j) are as illustrated in Table 19.

TABLE 19

| Different special subframe configurations of the TDD | Subframe n | | | | | | | | | |
|---|---|---|---|---|---|---|---|---|---|---|
| uplink-downlink | 0 | | 1 | | 2 | | 3 | | 4 | |
| configuration 2 | 0 | 1 | 0 | 1 | 0 | 1 | 0 | 1 | 0 | 1 |
| Special subframe configurations 0, 5, 9 and 6:2:6 | — | — | — | — | (6, 0)(4, 0)(4, 1)(3, 0) | (3, 1)(2, 0)(2, 1) | | | | |
| Special subframe configurations 1, 2, 3, 4, 6, 7, 8 | | | | | (6, 0)(6, 1)(4, 0)(4, 1) | (3, 0)(3, 1)(2, 0)(2, 1) | | | | |
| UL/ | 5 | | 6 | | 7 | | 8 | | 9 | |
| DLConfiguration | 0 | 1 | 0 | 1 | 0 | 1 | 0 | 1 | 0 | 1 |
| Special subframe configurations 0, 5, 9 and 6:2:6 | | | | | (6, 0)(4, 0)(4, 1)(3, 0) | (3, 1)(2, 0)(2, 1) | | | | |
| Special subframe configurations 1, 2, 3, 4, 6, 7, 8 | | | | | (6, 0)(6, 1(4, 0)(4, 1)) | (3, 0)(3, 1)(2,0)(2, 1) | | | | |

For situation 2, compared with situation 1, there will be one more subframe which may perform the uplink feedback, which is beneficial to reducing an RTT delay. When the special subframe configurations are 0, 5, 9 and 10, there are nine downlink processes in the HARQ feedback timing of the PDSCH transmission or the PDCCH/EPDCCH indicating the SPS release, and the length of the RTT is about 6.43 ms.

For situation 2, when the special subframe configurations are 1, 2, 3, 4, 6, 7 and 8, there are 12 downlink processes in the HARQ feedback timing of the PDSCH transmission or the PDCCH/EPDCCH indicating the SPS release, the RTT is 15 Ms, and the length of the RTT is about 7.5 ms.

Correspondingly, in the case of the TDD uplink-downlink configuration 2 and the length of the TTI being 0.5 ms, for situation 2, the values of the K' corresponding to the different uplink TTIs are as illustrated in Table 20. Here, because the downlink-to-uplink switch-point periodicity is 5 ms, the numbers of the TTIs may also only correspond to 5 ms of the existing LTE, that is, the numbers are 0-9.

TABLE 20

| Different special subframe configurations of the TDD uplink-downlink configuration 2 | TTI n | | | | | | | | | |
|---|---|---|---|---|---|---|---|---|---|---|
| | 0 | 1 | 2 | 3 | 4 | 5 | 6 | 7 | 8 | 9 |
| Special subframe configurations 0, 5, 9 and 6:2:6 | — | — | — | 11, 7, 6 | 6, 5 | 5, 4 | | | — | — |
| Special subframe configurations 1, 2 3, 4, 6, 7, 8 | | | | 11, 10, 7 | 7, 6, 5 | 5, 4 | | | | |
| **Different special subframe configurations of the TDD uplink-clownlink configuration 2** | **TTI n** | | | | | | | | | |
| | 10 | 11 | 12 | 13 | 14 | 15 | 16 | 17 | 18 | 19 |
| Special subframe configurations 0, 5, 9 and 6:2:6 | — | — | | 11, 7, 6 | 6, 5 | 5, 4 | | | — | — |
| Special subframe configurations 1, 2, 3, 4, 6, 7, 8 | | | | 11, 10, 7 | 7, 6, 5 | 5, 4 | | | | |

For the second numbering manner, namely the manner of numbering the TTIs only in the subframe, corresponding to the feedback subframe n and the in-subframe TTI m, the corresponding values of (k, j) are as illustrated in Table 21. Here, k∈K', K': $\{k_0, k_1, \ldots, K_{M'-1}\}$, M' represents the number of the downlink subframes fed back in a certain uplink feedback TTI according to the determined HARQ time association.

TABLE 21

| Different special subframe configurations of the TDD uplink-downlink configuration 2 | Subframe n | | | | | | | | | |
|---|---|---|---|---|---|---|---|---|---|---|
| | 0 | | 1 | | 2 | | 3 | | 4 | |
| | 0 | 1 | 0 | 1 | 0 | 1 | 0 | 1 | 0 | 1 |
| Special subframe configurations 0, 5, 9 and 6:2:6 | — | — | — | (5, 0)(3, 0)(3, 1) | (3, 0)(3, 1) | (2, 0)(2, 1) | | | | |
| Special subframe configurations 1, 2, 3, 4, 6, 7, 8 | | | | (5, 0)(5, 1)(3, 0) | (4, 1)(3, 0)(3, 1) | (2, 0)(2, 1) | | | | |
| **Different special subframe configurations of the TDD uplink-downlink configuration 2** | **5** | | **6** | | **7** | | **8** | | **9** | |
| | 0 | 1 | 0 | 1 | 0 | 1 | 0 | 1 | 0 | 1 |
| Special subframe configurations 0, 5, 9 and 6:2:6 | | | | (5, 0)(3, 0)(3, 1) | (3, 0)(3, 1) | (2, 0)(2, 1) | | | | |
| Special subframe configurations 1, 2, 3, 4, 6, 7, 8 | | | | (5, 0)(5, 1)(3, 0) | (4, 1)(3, 0)(3, 1) | (2, 0)(2, 1) | | | | |

B) The TTI Whose Length is Four/Three OSs

In consideration of the TTI whose length is four/three OS symbols, seven OS symbols of one existing time slot are divided into two TTIs. The length of one TTI is four OS symbols, and the length of another TTI is three OS symbols. The situation of normal CP is given here for example. The first TTI in a time slot may be four OSs, and the second TTI may be three OSs; or, the first TTI may be three OSs, and the second TTI may be four OSs. For the situation where the number of the subframe stays constant, and the TTIs are numbered only in the subframe, the numbers of the TTIs in each subframe are 0-3.

Two situations are considered. In situation 1, it is set that the UpPTS in the special subframe may not transmit HARQ feedback information of the PDSCH; in situation 2, it is set that the UpPTS in the special subframe may transmit the HARQ feedback information of the PDSCH.

Situation 1

The HARQ feedback timing of the PDSCH transmission or the PDCCH/EPDCCH indicating the SPS release in situation 1 are slightly different due to the different special subframe configuration ratios.

For the special subframe configurations 0 and 5, there are 13 downlink HARQ processes in the downlink HARQ processes and timings, and the length of the RTT is 5 ms.

For the special subframe configurations 1, 2, 3, 6, 7 and 8, if the TTI composed of the DwPTS OS and the GP transmits the downlink process, there are 15 downlink HARQ processes in the downlink processes and feedbacks, and the length of the RTT is 5 ms.

For the special subframe configuration 4, if it is assumed that the TTI whose ratio of DwPTS to GP to UpPTS is 1:1:1 in the special subframe configuration 4 may not transmit the downlink process, HARQ timings in this configuration are as same as that of the special subframe configurations 1, 2, 3, 6, 7 and 8. However, if it is assumed that the TTI whose ratio of DwPTS to GP to UpPTS is 1:1:1 in the special subframe configuration 4 may transmit the downlink process, there are 16 downlink HARQ processes in the downlink processes and HARQ timings, and the length of the RTT is 5 ms.

For the special subframe configuration 9, if TTI composed of the DwPTS OS and the GP transmits the downlink process, there are 14 downlink HARQ processes in the downlink processes and feedbacks, and the length of the RTT is 5 ms.

For the special subframe configuration 10, if TTI composed of the DwPTS OS and the GP transmits the downlink process, there are 14 processes in the downlink processes and feedbacks, and the length of the RTT is 5 ms.

Correspondingly, for situation 1, in the case of the TDD uplink-downlink configuration 2 and the length of the TTI being four/three OSs, the values of the K' corresponding to the different uplink TTIs are as illustrated in Table 22. Here, because the downlink-to-uplink switch-point periodicity is 5 ms, the numbers of the TTIs may also only correspond to 5 ms of the existing LTE, that is, the numbers are 0-19.

TABLE 22

| Different special subframe configurations of the TDD uplink-downlink | TTI n | | | | | | | | | |
|---|---|---|---|---|---|---|---|---|---|---|
| configuration 2 | 0 | 1 | 2 | 3 | 4 | 5 | 6 | 7 | 8 | 9 |
| Special subframe configurations 0, 5 | — | — | — | — | — | — | — | — | 16, 15, 14, 13 | 13, 12, 11 |
| Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | — | 16, 15, 14, 13 | 13, 12, 11, 10 |
| Special subframe configuration 4 (when the TTI whose ratio of DwPTS to GP to UpPTS is 1:1:1 does not transmit the downlink process) | — | — | — | — | — | — | — | — | 16, 15, 14, 13 | 13, 12, 11, 10 |
| Special subframe configuration 9 | — | — | — | — | — | — | — | — | 16, 15, 14, 13 | 13, 12, 11, 10 |
| Special subframe configuration 10 | — | — | — | — | — | — | — | 15, 14, 13 | 13, 12, 11 | 11, 10, 9 |

| Different special subframe configurations of the TDD uplink-downlink | TTI n | | | | | | | | | |
|---|---|---|---|---|---|---|---|---|---|---|
| configuration 2 | 10 | 11 | 12 | 13 | 14 | 15 | 16 | 17 | 18 | 19 |
| Special subframe configurations 0, 5 | 11, 10, 9 | 9, 8, 7 | — | — | — | — | — | — | — | — |

TABLE 22-continued

| | | | | | | | | | | |
|---|---|---|---|---|---|---|---|---|---|---|
| Special subframe configurations 1, 2, 3, 6, 7 and 8 (when the TTI whose ratio of DwPTS to GP to UpPTS is 1:1:1 does not transmit the downlink process in the configuration 4) | 10, 9, 8, 7 | 7, 6, 5 | — | — | — | | | | | |
| Special subframe configuration 4 (when the TTI whose ratio of DwPTS to GP to UpPTS is 1:1:1 does not transmit the downlink process) | 10, 9, 8, 7 | 7, 6, 5, 4 | — | — | — | — | | | | |
| Special subframe configuration 9 | 10, 9, 8 | 8, 7, 6 | | | | | | | | |
| Special subframe configuration 10 | 9, 8, 7 | 7, 6 | | | | | | | | |

| Different special subframe configurations of the TDD uplink-downlink configuration 2 | TTI n | | | | | | | | | |
|---|---|---|---|---|---|---|---|---|---|---|
| | 20 | 21 | 22 | 23 | 24 | 25 | 26 | 27 | 28 | 29 |
| Special subframe configurations 0, 5 | — | — | — | — | — | — | — | — | 16, 15, 14, 13 | 13, 12, 11 |
| Special subframe configurations 1, 2, 3, 6, 7 and 8 (when the TTI whose ratio of DwPTS to GP to UpPTS is 1:1:1 does not transmit the downlink process in the configuration 4) | | | | | | | | — | 16, 15, 14, 13 | 13, 12, 11, 10 |
| Special subframe configuration 4 (when the TTI whose ratio of DwPTS to GP to UpPTS is 1:1:1 does not transmit the downlink process) | | | | | | | | — | 16, 15, 14, 13 | 13, 12, 11, 10 |
| Special subframe configuration 9 | | | | | | | | — | 16, 15, 14, 13 | 13, 12, 11, 10 |
| Special subframe configuration 10 | | | | | | | | 15, 14, 13 | 13, 12, 11 | 11, 10, 9 |

| Different special subframe configurations of the TDD uplink-downlink configuration 2 | TTI n | | | | | | | | | |
|---|---|---|---|---|---|---|---|---|---|---|
| | 30 | 31 | 32 | 33 | 34 | 35 | 36 | 37 | 38 | 39 |
| Special subframe configurations 0, 5 | 11, 10, 9 | 9, 8, 7 | — | — | — | — | — | — | — | — |
| Special subframe configurations 1, 2, 3, 6, 7 and 8 (when the TTI whose ratio of DwPTS to GP to UpPTS is 1:1:1 does not transmit the downlink process in the configuration 4) | 10, 9, 8, 7 | 7, 6, 5 | — | — | — | | | | | |
| Special subframe configuration 4 | 10, 9, 8, 7 | 7, 6, 5, 4 | — | — | — | — | | | | |

TABLE 22-continued

| | | |
|---|---|---|
| (when the TTI whose ratio of DwPTS to GP to UpPTS is 1:1:1 does not transmit the downlink process) | | |
| Special subframe configuration 9 | 10, 9, 8 | 8, 7, 6 |
| Special subframe configuration 10 | 9, 8, 7 | 7, 6 |

For the second numbering manner, namely the manner of numbering the TTIs only in the subframe, corresponding to the feedback subframe n and the in-subframe TTI m, the corresponding values of (k, j) are as illustrated in Table 23.

TABLE 23

| Different special subframe configurations of the TDD uplink-downlink | Subframe n | | | | | | | | | |
|---|---|---|---|---|---|---|---|---|---|---|
| configuration | 0 | | | | 1 | | | | 2 | |
| 2 | 0 | 1 | 3 | 4 | 0 | 1 | 2 | 3 | 0 | 1 |
| Special subframe configurations 0, 5 | — | — | — | — | — | — | — | — | (4, 0)(4, 1)(4, 2)(4, 3) | (3, 0)(3, 1)(3, 2) |
| Special subframe configurations 1, 2, 3, 6, 7 and 8 (when the TTI whose ratio of DwPTS to GP to UpPTS is 1:1:1 does not transmit the downlink process in the configuration 4) | | | | | | | | | (4, 0)(4, 1)(4, 2)(4, 3) | (3, 0)(3, 1)(3, 2)(3, 3) |
| Special subframe configuration 4 (when the TTI whose ratio of DwPTS to GP to UpPTS is 1:1:1 does not transmit the downlink process) | | | | | | | | | (4, 0)(4, 1)(4, 2)(4, 3) | (3, 0)(3, 1)(3, 2)(3, 3) |
| Special subframe configuration 9 | | | | | | | | | (4, 0)(4, 1)(4, 2)(4, 3) | (3, 0)(3, 1)(3, 2)(3, 3) |
| Special subframe configuration 10 | | | | | | | | (3, 0)(3, 1)(3, 2) | (4, 3)(3, 0)(3, 1) | (3, 2)(3, 3)(2, 0) |

TABLE 23-continued

| UL/ | 2 | | 3 | | | | 4 | | | |
|---|---|---|---|---|---|---|---|---|---|---|
| DLConfiguration | 2 | 3 | 0 | 1 | 2 | 3 | 0 | 1 | 2 | 3 |
| Special subframe configurations 0, 5 | (3, 3)(2, 0)(2, 1) | (2, 2)(2, 3)(1, 0) | — | — | — | — | — | — | — | — |
| Special subframe configurations 1, 2, 3, 6, 7 and 8 (when the TTI whose ratio of DwPTS to GP to UpPTS is 1:1:1 does not transmit the downlink process in the configuration 4) | (2, 0)(2, 1)(2, 2)(2, 3) | (1, 0)(1, 1)(1, 2) | — | — | — | — | — | — | — | — |
| Special subframe configuration 4 (when the TTI whose ratio of DwPTS to GP to UpPTS is 1:1:1 does not transmit the downlink process) | (2, 0)(2, 1)(2, 2)(2, 3) | (1, 0)(1, 1)(1, 2)(1, 3) | — | — | — | — | — | — | — | — |
| Special subframe. configuration 9 | (2, 0)(2, 1)(2, 2) | (2, 3)(1, 0)(1, 2) | | | | | | | | |
| Special subframe configuration 10 | (2, 1)(2, 2)(2, 3) | (1, 0)(1, 2) | — | | | | | | | |

| | Subframe n | | | | | | | | | |
|---|---|---|---|---|---|---|---|---|---|---|
| UL/ | 5 | | | | 6 | | | | 7 | |
| DLConfiguration | 0 | 1 | 3 | 4 | 0 | 1 | 2 | 3 | 0 | 1 |
| Special subframe configurations 0, 5 | — | — | — | — | | | | — | (4, 0)(4, 1)(4, 2)(4, 3) | (3, 0)(3, 1)(3, 2) |
| Special subframe configurations 1, 2, 3, 6, 7 and 8 (when the TTI whose ratio of DwPTS to GP to UpPTS is 1:1:1 does not transmit the downlink process in the configuration 4) | | | | | | | | | (4, 0)(4, 1)(4, 2)(4, 3) | (3, 0)(3, 1)(3, 2)(3, 3) |
| Special subframe configuration 4 (when | | | | | | | | | (4, 0)(4, 1)(4, 2)(4, 3) | (3, 0)(3, 1)(3, 2)(3, 3) |

TABLE 23-continued

| | | | | | | | | | |
|---|---|---|---|---|---|---|---|---|---|
| the TTI whose ratio of DwPTS to GP to UpPTS is 1:1:1 does not transmit the downlink process) | | | | | | | | | |
| Special subframe configuration 9 | | | | | | | | (4, 0)(4, 1)(4, 2)(4, 3) | (3, 0)(3, 1)(3, 2)(3, 3) |
| Special subframe configuration 10 | | | | | | | (3, 0)(3, 1)(3, 2) | (4, 3)(3, 0)(3, 1) | (3, 2)(3, 3)(2, 0) |

| UL- | 7 | | 8 | | | | 9 | | | |
|---|---|---|---|---|---|---|---|---|---|---|
| DLConfiguration | 2 | 3 | 0 | 1 | 2 | 3 | 0 | 1 | 2 | 3 |
| Special subframe configurations 0, 5 | (3, 3)(2, 0)(2, 1) | (2, 2)(2, 3)(1, 0) | — | — | — | — | — | | | |
| Special subframe configurations 1, 2, 3, 6, 7 and 8 | (2, 0)(2, 1)(2, 2)(2, 3) | (1, 0)(1, 1)(1, 2) | — | — | — | — | — | | | |
| Special subframe configuration 4 | (2, 0)(2, 1)(2, 2)(2, 3) | (1, 0)(1, 1)(1, 2)(1, 3) | — | — | — | — | — | | | |
| Special subframe configuration 9 | (2, 0)(2, 1)(2, 2) | (2, 3)(1, 0)(1, 2) | | | | | | | | |
| Special subframe configuration 10 | (2, 1)(2, 2)(2, 3) | (1, 0)(1, 2) | — | | | | | | | |

Situation 2

For the TTI whose length is four/three OSs, if the UpPTS may transmit the HARQ feedback information corresponding to downlink transmission, for some downlink processes, the HARQ feedback may be faster. The special subframe configurations are analyzed below.

For the special subframe configurations 0 and 5, if the TTI composed of the DwPTS OS and the GP transmits the downlink process, and the TTI composed of the GP and the UpPTS OS may perform the uplink feedback, there are 13 downlink HARQ processes in the downlink processes and feedbacks, and the length of the RTT is 5 ms.

For the special subframe configurations 1, 2, 3, 6, 7 and 8, if the TTI composed of the DwPTS OS and the GP transmits the downlink process, and the TTI composed of the GP and the UpPTS OS may perform the uplink feedback, there are 15 downlink HARQ processes in the downlink processes and feedbacks, and the length of the RTT is 5 ms.

For the special subframe configuration 4, if it is assumed that the TTI whose ratio of DwPTS to GP to UpPTS is 1:1:1 corresponding to the special subframe configuration 4 may not transmit the downlink process, the HARQ timings in the configuration are as same as that of the special subframe configurations 1, 2, 3, 6, 7 and 8. However, if it is assumed that the TTI whose ratio of DwPTS to GP to UpPTS is 1:1:1 may transmit the downlink process, at the same time, one uplink SC-OFDM symbols of the TTI may perform the HARQ feedback of the downlink process, there are 16 downlink HARQ processes in the downlink processes and HARQ timings, and the length of the RTT is still 5 ms.

For the special subframe configuration 9, if the TTI composed of the DwPTS OS and the GP transmits the downlink process, and the TTI composed of the GP and the UpPTS OS may perform the uplink feedback, there are 14 downlink HARQ processes in the downlink processes and HARQ feedbacks, and the length of the RTT is 5 ms.

For the special subframe configuration 10, if the TTI composed of the DwPTS OS and the GP transmits the downlink process, and the TTI composed of the GP and the UpPTS OS may perform the uplink feedback, there are 14 downlink HARQ processes in the downlink processes and HARQ feedbacks, and the length of the RTT is 5 ms.

Correspondingly, in the case of the TDD uplink-downlink configuration 2 and the length of the TTI being four/three OSs, the values of the K' corresponding to the different uplink TTIs are as illustrated in Table 24. Here, because the downlink-to-uplink switch-point periodicity is 5 ms, the numbers of the TTIs may also only correspond to 5 ms of the existing LTE, that is, the numbers are 0-19.

TABLE 24

| Different special subframe configurations of the TDD uplink-downlink configuration 2 | TTI n | | | | | | | | | |
|---|---|---|---|---|---|---|---|---|---|---|
| | 0 | 1 | 2 | 3 | 4 | 5 | 6 | 7 | 8 | 9 |
| Special subframe configurations 0, 5 | — | — | — | — | — | — | — | 15, 14, 13 | 13, 12, 11 | 11, 10, 9 |
| Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | 15, 14, 13 | 13, 12, 11 | 11, 10, 9 |
| Special subframe configuration 4 (when the TTI whose ratio of DwPTS to GP to UpPTS is 1:1:1 does not transmit the downlink process) | — | — | — | — | — | — | — | 15, 14, 13, 12 | 12, 11, 10 | 10, 9, 8 |
| Special subframe configuration 9 | — | — | — | — | — | — | — | 15, 14, 13 | 13, 12, 11 | 11, 10, 9 |
| Special subframe configuration 10 | — | — | — | — | — | — | 14, 13, 12 | 12, 11, 10 | 10, 9 | 9, 8 |

| Different special subframe configurations of the TDD uplink-downlink configuration 2 | TTI n | | | | | | | | | |
|---|---|---|---|---|---|---|---|---|---|---|
| | 10 | 11 | 12 | 13 | 14 | 15 | 16 | 17 | 18 | 19 |
| Special subframe configurations 0, 5 | 9, 8 | 8, 7 | — | — | — | — | — | — | — | — |
| Special subframe configurations 1, 2, 3, 6, 7 and 8 (when the TTI whose ratio of DwPTS to GP to UpPTS is 1:1:1 does not transmit the downlink process in the configuration 4) | 9, 8, 7 | 7, 6, 5 | — | — | — | — | — | — | — | — |
| Special subframe configuration 4 (when the TTI whose ratio of DwPTS to GP to UpPTS is 1:1:1 does not transmit the downlink process) | 8, 7, 6 | 6, 5, 4 | — | — | — | — | — | — | — | — |
| Special subframe configuration 9 | 9, 8, 7 | 7, 6 | — | — | — | — | — | — | — | — |
| Special subframe configuration 10 | 8, 7 | 7, 6 | — | — | — | — | — | — | — | — |

| Different special subframe configurations of the TDD uplink-downlink configuration 2 | TTI n | | | | | | | | | |
|---|---|---|---|---|---|---|---|---|---|---|
| | 20 | 21 | 22 | 23 | 24 | 25 | 26 | 27 | 28 | 29 |
| Special subframe configurations 0, 5 | — | — | — | — | — | — | — | 15, 14, 13 | 13, 12, 11 | 11, 10, 9 |
| Special subframe configurations 1, 2, 3, 6, 7 and 8 (when the TTI whose ratio of DwPTS to GP to | | | | | | | — | 15, 14, 13 | 13, 12, 11 | 11, 10, 9 |

TABLE 24-continued

| | | | | | | | | | | |
|---|---|---|---|---|---|---|---|---|---|---|
| UpPTS is 1:1:1 does not transmit the downlink process in the configuration 4) | | | | | | | | | | |
| Special subframe configuration 4 (when the TTI whose ratio of DwPTS to GP to UpPTS is 1:1:1 does not transmit the downlink process) | | | | | | | — | 15, 14, 13, 12 | 12, 11, 10 | 10, 9, 8 |
| Special subframe configuration 9 | | | | | | | — | 15, 14, 13 | 13, 12, 11 | 11, 10, 9 |
| Special subframe configuration 10 | | | | | | | 14, 13, 12 | 12, 11, 10 | 10, 9 | 9, 8 |

| Different special subframe configurations of the TDD uplink-downlink | TTI n | | | | | | | | | |
|---|---|---|---|---|---|---|---|---|---|---|
| configuration 2 | 30 | 31 | 32 | 33 | 34 | 35 | 36 | 37 | 38 | 39 |
| Special subframe configurations 0, 5 | 9, 8 | 8, 7 | — | — | — | — | — | — | — | — |
| Special subframe configurations 1, 2, 3, 6, 7 and 8 (when the TTI whose ratio of DwPTS to GP to UpPTS is 1:1:1 does not transmit the downlink process in the configuration 4) | 9, 8, 7 | 7, 6, 5 | — | — | — | — | — | — | — | — |
| Special subframe configuration 4 (when the TTI whose ratio of DwPTS to GP to UpPTS is 1:1:1 does not transmit the downlink process) | 8, 7, 6 | 6, 5, 4 | — | — | — | — | — | — | — | — |
| Special subframe configuration 9 | 9, 8, 7 | 7, 6 | — | — | — | — | — | — | — | — |
| Special subframe configuration 10 | 8, 7 | 7, 6 | — | — | — | — | — | — | — | — |

For the second numbering manner, namely the manner of numbering the TTIs only in the subframe, corresponding to the feedback subframe n and the in-subframe TTI m, the corresponding values of (k, j) are as illustrated in Table 25.

TABLE 25

| Different special subframe configurations of the TDD uplink-downlink | Subframe n | | | | | | | | | |
|---|---|---|---|---|---|---|---|---|---|---|
| configuration | 0 | | | | 1 | | | | 2 | |
| 2 | 0 | 1 | 3 | 4 | 0 | 1 | 2 | 3 | 0 | 1 |
| Special subframe configurations 0, 5 | — | — | — | — | — | — | — | (3, 0)(3, 1)(3, 2) | (4, 3)(3, 0)(3, 1) | (3, 2)(3, 3)(2, 0) |
| Special subframe configurations 1, 2, 3, 6, 7 and 8 (when | | | | | | | | (3, 0)(3, 1)(3, 2) | (4, 3)(3, 0)(3, 1) | (3, 2)(3, 3)(2, 0) |

TABLE 25-continued

| | | | | |
|---|---|---|---|---|
| the TTI whose ratio of DwPTS to GP to UpPTS is 1:1:1 does not transmit the downlink process in the configuration 4) | | | | |
| Special subframe configuration 4 (when the TTI whose ratio of DwPTS to GP to UpPTS is 1:1:1 does not transmit the downlink process) | | (3, 0)(3, 1)(3, 2)(3, 3) | (3, 0)(3, 1)(3, 2) | (3, 3)(2, 0)(2, 1) |
| Special subframe configuration 9 | | (3, 0)(3, 1)(3, 2) | (4, 3)(3, 0)(3, 1) | (3, 2)(3, 3)(2, 0) |
| Special subframe configuration 10 | (3, 0)(3, 1)(3, 2) | (3, 3)(2, 0)(2, 1) | (3, 2)(3, 3) | (2, 0)(2, 1) |

| Different special subframe configurations of the TDD uplink-downlink configuration | 2 | | 3 | | | | 4 | | | |
|---|---|---|---|---|---|---|---|---|---|---|
| 2 | 2 | 3 | 0 | 1 | 2 | 3 | 0 | 1 | 2 | 3 |
| Special subframe configurations 0, 5 | (2, 1)(2, 2) | (2, 3)(1, 0) | — | — | — | — | — | — | — | — |
| Special subframe configurations 1, 2, 3, 6, 7 and 8 (when the TTI whose ratio of DwPTS to GP to UpPTS is 1:1:1 does not transmit the downlink process in the configuration 4) | (2, 1)(2, 2)(2, 3) | (1, 0)(1, 1)(1, 2) | — | — | — | — | — | — | — | — |

TABLE 25-continued

| | | | | | | | | | | |
|---|---|---|---|---|---|---|---|---|---|---|
| Special subframe configuration 4 (when the TTI whose ratio of DwPTS to GP to UpPTS is 1:1:1 does not transmit the downlink process) | (2, 2)(2, 3)(1, 0) | (1, 1)(1, 2)(1, 3) | — | — | — | — | — | — | — | — |
| Special subframe configuration 9 | (2, 1)(2, 2)(2, 3) | (1, 0)(1, 1) | — | — | — | — | — | — | — | — |
| Special subframe configuration 10 | (2, 2)(2, 3) | (1, 0)(1, 1) | — | — | — | — | — | — | — | — |

| Different special subframe configurations of the TDD uplink-downlink | Subframe n | | | | | | | | | |
|---|---|---|---|---|---|---|---|---|---|---|
| configuration | 5 | | | | 6 | | | | 7 | |
| 2 | 0 | 1 | 3 | 4 | 0 | 1 | 2 | 3 | 0 | 1 |
| Special subframe configurations 0, 5 | — | — | — | — | | | — | (3, 0)(3, 1)(3, 2) | (4, 3)(3, 0)(3, 1) | (3, 2)(3, 3)(2, 0) |
| Special subframe configurations 1, 2, 3, 6, 7 and 8 (when the TTI whose ratio of DwPTS to GP to UpPTS is 1:1:1 does not transmit the downlink process in the configuration 4) | | | | | | | | (3, 0)(3, 1)(3, 2) | (4, 3)(3, 0)(3, 1) | (3, 2)(3, 3)(2, 0) |
| Special subframe configuration 4 (when the TTI whose ratio of DwPTS to GP to UpPTS is 1:1:1 does not transmit the downlink process) | | | | | | | | (3, 0)(3, 1)(3, 2) (3, 3) | (3, 0)(3, 1)(3, 2) | (3, 3)(2, 0)(2, 1) |

TABLE 25-continued

| | | | | | | | | | | |
|---|---|---|---|---|---|---|---|---|---|---|
| Special subframe configuration 9 | | | | | | | | (3, 0)(3, 1)(3, 2) | (4, 3)(3, 0)(3, 1) | (3, 2)(3, 3)(2, 0) |
| Special subframe configuration 10 | | | | | | | (3, 0)(3, 1)(3, 2) | (3, 3)(2, 0)(2, 1) | (3, 2)(3, 3) | (2, 0)(2, 1) |

| Different special subframe configurations of the TDD uplink-downlink configuration | 7 | | 8 | | | | 9 | | | |
|---|---|---|---|---|---|---|---|---|---|---|
| 2 | 2 | 3 | 0 | 1 | 2 | 3 | 0 | 1 | 2 | 3 |
| Special subframe configurat ions 0, 5 | (2, 1)(2, 2) | (2, 3)(1, 0) | — | — | — | — | — | — | — | — |
| Special subframe configurations 1, 2, 3, 6, 7 and 8 | (2, 1)(2, 2)(2, 3) | (1, 0)(1, 1)(1, 2) | — | — | — | — | — | — | — | — |
| Special subframe configuration 4 | (2, 2)(2, 3)(1, 0) | (1, 1)(1, 2)(1, 3) | — | — | — | — | — | — | — | — |
| Special subframe configuration 9 | (2, 1)(2, 2)(2, 3) | (1, 0)(1, 1) | — | — | — | — | — | — | — | — |
| Special subframe configuration 10 | (2, 2)(2, 3) | (1, 0)(1, 1) | — | — | — | — | — | — | — | — |

C) The TTI Whose Length is Two OSs

In consideration of the TTI whose length is two OSs, that is, 14 OSs of one existing subframe are divided into seven TTIs. The situation of normal CP is described here for example. In consideration that the downlink-to-uplink switch-point periodicity is 5 ms for the uplink-downlink configuration 2, the TTIs in the former 5 ms in the radio frame are numbered to 34. If the TTIs are numbered sequentially in one radio frame, the maximum number of the TTI in one radio frame is 69. For the situation where the number of the subframe stays constant, and the TTIs are numbered only in the subframe, the numbers of the TTIs in each subframe are 0-6.

It is assumed that the TTI composed of the downlink OS and the GP may transmit the downlink process, the TTI composed of the GP and the uplink OS may feed back the ACK/NACK information of the downlink process. Under this assumption, the special subframe configurations 0 and 5 have the same process and feedback timing; the special subframe configurations 1, 2, 6 and 7 have the same downlink process and feedback timing; the special subframe configurations 3, 4 and 8 have the same downlink process and feedback timing. The downlink processes and the feedback timings of configuration 9 and confirmation with the ratio of 6:2:6 are different.

The HARQ feedback timing of the PDSCH transmission or the PDCCH/EPDCCH indicating the SPS release in the case of different special time slot configurations are described below. Likewise, in consideration that the downlink-to-uplink switch-point periodicity of the TDD uplink-downlink configuration 2 is 5 ms, only the situation of the HARQ timing in the former 5 ms of each radio frame is described here. If the Ills are numbered by taking the radio frame of 10 ms as a unit, the numbers of the TTIs are 0-69. For the situation of numbering the Ills in the subframe, the numbers of the subframes are 0-9, and the numbers of the TTIs in each subframe are 0-6.

For the special subframe configurations 0 and 5, there are 23 downlink HARQ processes in the downlink HARQ processes and timings, and the length of the RTT is 5 ms.

For the special subframe configurations 1, 2, 6 and 7, there are 26 downlink HARQ processes in the downlink HARQ processes and timings, and the length of the RTT is 5 ms.

For the special subframe configurations 3, 4 and 8, there are 27 downlink HARQ processes in the downlink HARQ processes and timings, and the length of the RTT is 5 ms.

For the special subframe configuration 9, there are 24 downlink HARQ processes in the downlink HARQ processes and timings, and the length of the RTT is 5 ms.

For the special subframe configuration 10, there are 24 downlink HARQ processes in the downlink HARQ processes and timings, and the length of the RTT is 5 ms.

Correspondingly, in the case of the TDD uplink-downlink configuration 2 and the length of the TTI being two OSs, the values of the K' corresponding to the different uplink TTIs are as illustrated in Table 26. Here, because the downlink-to-uplink switch-point periodicity is 5 ms, the numbers of the TTIs may also only correspond to 5 ms of the existing LTE, that is, the numbers are 0-34.

TABLE 26

| Different special subframe configurations of the TDD uplink-downlink configuration | TTI n | | | | | | | | | |
|---|---|---|---|---|---|---|---|---|---|---|
| 2 | 10/45 | 11/46 | 12/47 | 13/48 | 14/49 | 15/50 | 16/51 | 17/52 | 18/53 | 19/54 |
| Special subframe configurations 0, 5 | | | | 27, 26, 25 | 25, 24, 23 | 23, 22, 21 | 21, 20, 19 | 19, 18, 17 | 17, 16, 15 | 15, 14, 13 |
| Special subframe configurations 1, 2, 6 and 7 | | | | 27, 26, 25, 24 | 24, 23, 22, 21 | 21, 20, 19 | 19, 18, 17 | 17, 16, 15 | 15, 14, 13 | 13, 12, 11 |
| Special subframe configurations 3, 4 and 8 | | | | 27, 26, 25, 24 | 24, 23, 22, 21 | 21, 20, 19, 18 | 18, 17, 16 | 16, 15, 14 | 14, 13, 12 | 12, 11, 10 |
| Special subframe configuration 9 | | | | 27, 26, 25 | 25, 24, 23 | 23, 22, 21 | 21, 20, 19 | 19, 18, 17 | 17, 16, 15 | 15, 14, 13 |
| Special subframe ratio configuration 10 | | 25, 24, 23 | 23, 22, 21 | 21, 20, 19 | 19, 18, 17 | 17, 16 | 16, 15 | 15, 14 | 14, 13 | 13, 12 |

| Different special subframe configurations of the TDD uplink-downlink configuration | TTI n | | | | | | | | | |
|---|---|---|---|---|---|---|---|---|---|---|
| 2 | 20/55 | 21/56 | 22/57 | 23/58 | 24/59 | 25/60 | 26/61 | 27/62 | 28/63 | 29/64 |
| Special subframe configurations 0, 5 | 13, 12 | — | — | — | — | — | — | — | — | — |
| Special subframe configurations 1, 2, 6 and 7 | 11, 10, 9 | — | — | — | — | — | — | — | — | — |
| Special subframe configurations 3, 4 and 8 | 10, 9, 8 | — | — | — | — | — | — | — | — | — |
| Special subframe configuration 9 | 13, 12, 11 | — | — | — | — | — | — | — | — | — |
| Special subframe configuration 10 | 12, 11 | — | — | — | — | — | — | — | — | — |

For the second numbering manner, namely the manner of numbering the TTIs only in the subframe, corresponding to the feedback subframe n and the in-subframe TTI m, the corresponding values of (k, j) are as illustrated in Table 27.

TABLE 27

| Different special subframe configurations of the TDD uplink-downlink configuration 2 | Subframe n | | | | | | | | | | | |
|---|---|---|---|---|---|---|---|---|---|---|---|---|
| | 0/5 | | | | | | | 1/6 | | | | |
| | 0 | 1 | 2 | 3 | 4 | 5 | 6 | 0 | 1 | 2 | 3 | 4 |
| Special subframe configurations 0, 5 | | | | | | | | | | | | |
| Special subframe configurations 1, 2, 6 and 7 | | | | | | | | | | | | |
| Special subframe configurations 3, 4 and 8 | | | | | | | | | | | | |
| Special subframe configuration 9 | | | | | | | | | | | | |
| Special subframe configuration 10 | | | | | | | | | | | | (3, 0)(3, 1) (3, 2) |

| Different special subframe configurations of the TDD uplink-downlink configuration 2 | Subframe n | | | | | | | | | | | |
|---|---|---|---|---|---|---|---|---|---|---|---|---|
| | 1/6 | | 2/7 | | | | | | | 3/8 | | |
| | 5 | 6 | 0 | 1 | 2 | 3 | 4 | 5 | 6 | 0 | 1 | 2 |
| Special subframe configurations 0, 5 | | (3, 0)(3, 1) (3, 2) | (4, 3)(4, 4) (4, 5) | (4, 6)(3, 0)(3, 1) | (3, 2)(3, 3) (3, 4) | (3, 5)(3, 6) (2, 0) | (2, 1) (2, 2) (2, 3) | (2, 4)(2, 5)(2, 6) | (1, 0)(1, 1) | — | — | — |
| Special subframe configurations 1, 2, 6 and 7 | | (3, 0)(3, 1) (3, 2)(3, 3) | (4, 4)(4, 5)(4, 6)(3, 0) | (3, 1)(3, 2)(3, 3) | (3, 4)(3, 5) (3, 6) | (2, 0)(2, 1) (2, 2) | (2, 3) (2, 4) (2, 5) | (2, 6)(1, 0)(1, 1) | (1, 2)(1, 3)(1, 4) | — | — | — |
| Special subframe configurations 3, 4 and 8 | | (3, 0)(3, 1) (3, 2)(3, 3) | (4, 4)(4, 5)(4, 6)(3, 0) | (3, 1)(3, 2)(3, 3) (3, 4) | (3, 5)(3, 6) (2, 0) | (2, 1)(2, 2) (2, 3) | (2, 4) (2, 5) (2, 6) | (1, 0)(1, 1)(1, 2) | (1, 3)(1, 4)(1, 5) | — | — | — |
| Special subframe configuration 9 | | (3, 0)(3, 1) (3, 2) | (4, 3)(4, 4)(4, 5) | (4, 6)(3, 0)(3, 1) | (3, 2)(3, 3) (3, 4) | (3, 5)(3, 6) (2, 0) | (2, 1) (2, 2) (2, 3) | (2, 4)(2, 5)(2, 6) | (1, 0)(1, 1)(1, 2) | — | — | — |
| Special subframe configuration 10 | (3, 3) (3, 4) (3, 5) | (3, 6)(2, 0) (2, 1) | (3, 2)(3, 3)(3, 4) | (3, 5)(3, 6) | (2, 0)(2, 1) | (2, 2)(2, 3) | (2, 4) (2, 5) | (2, 6)(1, 0) | (1, 1)(1, 2) | — | — | — |

Similarly, for the TDD uplink-downlink configurations 3, 4, 5 and 6, it may be obtained by designing the downlink HARQ process correspondingly that in the case of the length of the TTI being 0.5 ms, four/three OSs and two OSs, when the UE detects, in the TTI n−k, wherein k E K', the PDSCH transmission or the PDCCH/EPDCCH indicating the downlink SPS release and the corresponding HARQ-ACK response for the PDSCH transmission or the PDCCH/EPDCCH indicating the downlink SPS release shall be provided, the UE transmits the HARQ-ACK response in the uplink TTI n. The different uplink TTIs correspond to the different values of the K'. Here, only the situation where the TTIs are numbered sequentially in the radio frame is described; the situation where the TTIs are numbered in the subframe may be obtained according to the correspondences between the subframe and the number of the TTI.

A) the TTI Whose Length is 0.5 ms

If the OS in the UpPTS does not transmit the ACK, the values of the K' in the different TTIs are as illustrated in Table 28.

TABLE 28

| TDD uplink-downlink configuration | Special subframe configuration | TTI n | | | | | | | | | |
|---|---|---|---|---|---|---|---|---|---|---|---|
| | | 0 | 1 | 2 | 3 | 4 | 5 | 6 | 7 | 8 | 9 |
| 3 | Special subframe configurations 0, 5, 9 and 6:2:6 | — | — | — | — | 14, 13, 12 | 12, 11 | 11, 10 | 10, 9 | 9, 8 | 8, 7 |

TABLE 28-continued

| | | | | | | | | | | | |
|---|---|---|---|---|---|---|---|---|---|---|---|
| | Special subframe configurations 1, 2, 3, 4, 6, 7, 8 | | | | | 14, 13, 12 | 12, 11, 10 | 10, 9 | 9, 8 | 8, 7 | 7, 6 |
| 4 | Special subframe configurations 0, 5, 9 and 6:2:6 | | | | | 16, 15, 14, 13 | 13, 12, 11, 10 | 10, 9, 8, 7 | 7, 6, 5 | | |
| | Special subframe configurations 1, 2, 3, 4, 6, 7, 8 | | | | | 16, 15, 14, 13 | 13, 12, 11, 10 | 10, 9, 8, 7 | 7, 6, 5, 4 | | |
| 5 | Special subframe configurations 0, 5, 9 and 6:2:6 | | | | | 22, 18, 17, 16, 15, 14, 13, 12, 11 | 11, 10, 9, 8, 7, 6, 5, 4 | | | | |
| | Special subframe configuration 7, 8 | | | | | 22, 21, 18, 17, 16, 15, 14, 13, 12 | 12, 11, 10, 9, 8, 7, 6, 5, 4 | | | | |
| 6 | Special subframe configurations 0, 5, 9 and 6:2:6 | | | | | 6 | 6 | 6 | 6 | 6 | |
| | Special subframes configuration 1, 2, 3, 4, 6, 7, 8 | | | | | 6 | 6 | 6 | 6 | 6 | 6 |

| TDD uplink-downlink | Special subframe | TTI n | | | | | | | | | |
|---|---|---|---|---|---|---|---|---|---|---|---|
| configuration | configuration | 10 | 11 | 12 | 13 | 14 | 15 | 16 | 17 | 18 | 19 |
| 3 | Special subframe configurations 0, 5, 9 and 6:2:6 | — | — | — | — | | | | | — | — |
| | Special subframe configurations 1, 2, 3, 4, 6, 7, 8 | | | | | | | | | | |
| 4 | Special subframe configurations 0, 5, 9 and 6:2:6 | | | | | | | | | | |
| | Special subframe configurations 1, 2, 3, 4, 6, 7, 8 | | | | | | | | | | |
| 5 | Special subframe configurations 0, 5, 9 and 6:2:6 | | | | | | | | | | |
| | Special subframe configurations 1, 2, 3, 4, 6, 7, 8 | | | | | | | | | | |
| 6 | Special subframe configurations 0, 5, 9 and 6:2:6 | | | | | 4 | 4 | 4 | | | |

TABLE 28-continued

| | | | | |
|---|---|---|---|---|
| Special subframe configurations 1, 2, 3, 4, 6, 7, 8 | 4 | 4 | 4 | 4 |

If the OS in the UpPTS transmits the ACK, the values of the K' in the different TTIs are as illustrated in Table 29.

TABLE 29

| TDD uplink-downlink configuration | Special subframe configuration | TTI n 0 | 1 | 2 | 3 | 4 | 5 | 6 | 7 | 8 | 9 |
|---|---|---|---|---|---|---|---|---|---|---|---|
| 3 | Special subframe configurations 0, 5, 9 and 6:2:6 | — | — | — | 13, 12 | 12, 11 | 11, 10 | 10, 9 | 9, 8 | 8, 7 | 7 |
| | Special subframe configurations 1, 2, 3, 4, 6, 7, 8 | | | | 13, 12 | 12, 11 | 11, 10 | 10, 9 | 9, 8 | 8, 7 | 7, 6 |
| 4 | Special subframe configurations 0, 5, 9 and 6:2:6 | | | | 15, 14, 13 | 13, 12, 11 | 11, 10, 9 | 9, 8, 7 | 7, 6, 5 | | |
| | Special subframe configurations 1, 2, 3, 4, 6, 7, 8 | | | | 15, 14, 13, 12 | 12, 11, 10 | 10, 9, 8 | 8, 7, 6 | 6, 5, 4 | | |
| 5 | Special subframe configurations 0, 5, 9 and 6:2:6 | | | | 21, 17, 16, 15, 14, 13 | 13, 12, 10, 9, 8 | 8, 7, 6, 5, 4 | | | | |
| | Special subframe configurations 1, 2, 3, 4, 6, 7, 8 | | | | 21, 20, 17, 16, 15, 14 | 14, 13, 12, 11, 10, 9 | 9, 8, 7, 6, 5, 4 | | | | |
| 6 | Special subframe configurations 0, 5, 9 and 6:2:6 | | | | 5 | 5 | 5 | 5 | 5 | | |
| | Special subframe configurations 1, 2, 3, 4, 6, 7, 8 | | | | 5 | 5 | 5 | 5 | 5 | | |

| TDD uplink-downlink configuration | Special subframe configuration | TTI n 10 | 11 | 12 | 13 | 14 | 15 | 16 | 17 | 18 | 19 |
|---|---|---|---|---|---|---|---|---|---|---|---|
| 3 | Special subframe configurations 0, 5, 9 and 6:2:6 | — | — | — | — | | | | | — | — |
| | Special subframe configurations 1, 2, 3, 4, 6, 7, 8 | | | | | | | | | | |
| 4 | Special subframe configurations 0, 5, 9 and 6:2:6 | | | | | | | | | | |
| | Special subframe configurations 1, 2, 3, 4, 6, 7, 8 | | | | | | | | | | |
| 5 | Special subframe configurations 0, 5, 9 and 6:2:6 | | | | | | | | | | |
| | Special subframe configurations 1, 2, 3, 4, 6, 7, 8 | | | | | | | | | | |
| 6 | Special subframe configurations 0, 5, 9 and 6:2:6 | | | | | 4 | 4 | 4 | | | |
| | Special subframe configurations 1, 2, 3, 4, 6, 7, 8 | | | | | 4 | 4 | 4 | 4 | | |

B) The TTI Whose Length is Four/Three OSs

If the OS in the UpPTS does not transmit the ACK, the values of the K' in the different TTIs are as illustrated in Table 30.

TABLE 30

| TDD uplink-downlink configuration | Special subframe configuration | TTI n | | | | | | | | | |
|---|---|---|---|---|---|---|---|---|---|---|---|
| | | 0 | 1 | 2 | 3 | 4 | 5 | 6 | 7 | 8 | 9 |
| 3 | Special subframe configurations 0, 5 | — | — | — | — | — | — | — | | 28, 27, 26 | 26, 25 |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | | 28, 27, 26 | 26, 25, 24 |
| | Special subframe configuration 4 (when the TTI whose ratio of DwPTS to GP to UpPTS is 1:1:1 does not transmit the downlink process) | — | — | — | — | — | — | — | | 28, 27, 26 | 26, 25, 24 |
| | | — | — | | | | | | | | |
| | Special subframe configuration 9 | — | — | — | — | — | — | — | | 28, 27, 26 | 26, 25, 24 |
| | Special subframe configuration 10 | — | — | — | — | — | — | — | 27, 26 | 26, 25 | 25, 24 |
| 4 | Special subframe configurations 0, 5 | — | — | — | — | — | — | — | | 32, 31, 30, 29 | 29, 28, 27, 26 |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | | 32, 31, 30, 29 | 29, 28, 27, 26 |
| | Special subframe configuration 4 (when the TTI whose ratio of DwPTS to GP to UpPTS is 1:1:1 does not transmit the downlink process) | — | — | — | — | — | — | — | | 32, 31, 30, 29 | 29, 28, 27, 26 |
| | Special subframe configuration 9 | — | — | — | — | — | — | — | | 32, 31, 30, 29 | 29, 28, 27, 26 |
| | Special subframe configuration 10 | — | — | — | — | — | — | — | 31, 30, 29, 28 | 28, 27, 26, 25 | 25, 24, 23, 22 |
| 5 | Special subframe configurations 0, 5 | | | | | | | | | 36, 35, 34, 33, 32, 31, 30, 29, 28 | 28, 27, 26, 25, 24, 23, 22, 21 |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | | 36, 35, 34, 33, 32, 31, 30, 29, 28 | 28, 27, 26, 25, 24, 23, 22, 21, 20 |
| | Special subframe configuration 4 (when the TTI whose ratio of DwPTS to GP to UpPTS is 1:1:1 does not transmit the downlink process) | — | — | — | — | — | — | — | | 36, 35, 34, 33, 32, 31, 30, 29, 28 | 28, 27, 26, 25, 24, 23, 22, 21, 20 |
| | Special subframe configuration 9 | — | — | — | — | — | — | — | | 36, 35, 34, 33, 32, 31, 30, 29, 28 | 28, 27, 26, 25, 24, 23, 22, 21, 20 |
| | Special subframe configuration 10 | — | — | — | — | — | — | — | 35, 34, 33, 32, 31, 30, 29 | 29, 28, 27, 26, 25, 24, 23 | 23, 22, 21, 20, 19, 18, 17 |
| 6 | Special subframe configurations 0, 5 | — | — | — | — | — | — | — | | 12 | 12 |

TABLE 30-continued

| TDD uplink-downlink configuration | Special subframe configuration | TTI n 10 | 11 | 12 | 13 | 14 | 15 | 16 | 17 | 18 | 19 |
|---|---|---|---|---|---|---|---|---|---|---|---|
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | | 12 | 12 |
| | Special subframe configuration 4 (when the TTI whose ratio of DwPTS to GP to UpPTS is 1:1:1 does not transmit the downlink process) | — | — | — | — | — | — | — | | 12 | 12 |
| | Special subframe configuration 9 | — | — | — | — | — | — | — | | 12 | 12 |
| | Special subframe configuration 10 | — | — | — | — | — | — | — | 11 | 11 | 11 |
| 3 | Special subframe configurations 0, 5 | 25, 24 | 24, 23 | 23, 22 | 22, 21 | 21, 20 | 20, 19 | 19, 18 | 18, 17 | 17, 16 | 16, 15 |
| | Special subframe configurations 1, 2, 3, 6, 7 and 8 (when the TTI whose ratio of DwPTS to GP to UpPTS is 1:1:1 does not transmit the downlink process in the configuration 4) | 24, 23, 22 | 22, 21 | 21, 20 | 20, 19 | 19, 18 | 18, 17 | 17, 16 | 16, 15 | 15, 14 | 14, 13 |
| | Special subframe configuration 4 (when the TTI whose ratio of DwPTS to GP to UpPTS is 1:1:1 does not transmit the downlink process) | 24, 23, 22 | 22, 21, 20 | 20, 19 | 19, 18 | 18, 17 | 17, 16 | 16, 15 | 15, 14 | 14, 13 | 13, 12 |
| | Special subframe configuration 9 | 24, 23 | 23, 22 | 22, 21 | 21, 20 | 20, 19 | 19, 18 | 18, 17 | 17, 16 | 16, 15 | 15, 14 |
| | Special subframe configuration 10 | 24, 23 | 23, 22 | 22, 21 | 21, 20 | 20, 19 | 19, 18 | 18, 17 | 17, 16 | 16, 15 | 15, 14 |
| 4 | Special subframe configurations 0, 5 | 26, 25, 24, 23 | 23, 22, 21, 20 | 20, 19, 18, 17 | 17, 16, 15 | 15, 14, 13 | 13, 12, 11 | — | | | |
| | Special subframe configurations 1, 2, 3, 6, 7 and 8 (when the TTI whose ratio of DwPTS to GP to UpPTS is 1:1:1 does not transmit the downlink process in the configuration 4) | 26, 25, 24, 23 | 23, 22, 21, 20 | 20, 19, 18, 17 | 17, 16, 15, 14 | 14, 13, 12, 11 | 11, 10, 9 | — | | | |
| | Special subframe configuration 4 (when the TTI whose ratio of DwPTS to GP to UpPTS is 1:1:1 does not transmit the downlink process) | 26, 25, 24, 23 | 23, 22, 21, 20 | 20, 19, 18, 17 | 17, 16, 15, 14 | 14, 13, 12, 11 | 11, 10, 9, 8 | — | | | |
| | Special subframe configuration 9 | 26, 25, 24, 23 | 23, 22, 21, 20 | 20, 19, 18, 17 | 17, 16, 15, 14 | 14, 13, 12 | 12, 11, 10 | — | | | |
| | Special subframe configuration 10 | 22, 21, 20 | 20, 19, 18 | 18, 17, 16 | 16, 15, 14 | 14, 13, 12 | 12, 11, 10 | — | | | |
| 5 | Special subframe configurations 0, 5 | 21, 20, 19, 18, 17, 16, 15, 14 | 14, 13, 12, 11, 10, 9, 8, 7 | — | — | — | — | — | | | |
| | Special subframe configurations 1, 2, 3, 6, 7 and 8 (when the TTI whose ratio of DwPTS to GP to UpPTS is 1:1:1 does not transmit the downlink process in the configuration 4) | 20, 19, 18, 17, 16, 15, 14, 13, 12 | 12, 11, 10, 9, 8, 7, 6, 5 | — | — | — | — | — | | | |

TABLE 30-continued

| | | | | | | | | | | | |
|---|---|---|---|---|---|---|---|---|---|---|---|
| | Special subframe configuration 4 (when the TTI whose ratio of DwPTS to GP to UpPTS is 1:1:1 does not transmit the downlink process) | 20, 19, 18, 17, 16, 15, 14, 13, 12 | 12, 11, 10, 9, 8, 7, 6, 5, 4 | — | — | — | — | — | | | |
| | Special subframe configuration 9 | 20, 19, 18, 17, 16, 15, 14, 13 | 13, 12, 11, 10, 9, 8, 7, 6 | — | — | — | — | — | | | |
| | Special subframe configuration 10 | 17, 16, 15, 14, 13, 12, 11 | 11, 10, 9, 8, 7, 6 | — | — | — | — | — | | | |
| 6 | Special subframe configurations 0, 5 | 12 | 12 | 12 | 12 | 12 | 12 | 12 | | | |
| | Special subframe configurations 1, 2, 3, 6, 7 and 8 (when the TTI whose ratio of DwPTS to GP to UpPTS is 1:1:1 does not transmit the downlink process in the configuration 4) | 12 | 12 | 12 | 12 | 12 | 12 | 12 | 12 | 12 | |
| | Special subframe configuration 4 (when the TTI whose ratio of DwPTS to GP to UpPTS is 1:1:1 does not transmit the downlink process) | 12 | 12 | 12 | 12 | 12 | 12 | 12 | 12 | 12 | 12 |
| | Special subframe configuration 9 | 12 | 12 | 12 | 12 | 12 | 12 | 12 | 12 | | |
| | Special subframe configuration 10 | 11 | 11 | 11 | 11 | 11 | 11 | 11 | | | |

| TDD uplink-downlink configuration | Special subframe configuration | TTI n | | | | | | | | | |
|---|---|---|---|---|---|---|---|---|---|---|---|
| | | 20 | 21 | 22 | 23 | 24 | 25 | 26 | 27 | 28 | 29 |
| 3 | Special subframe configurations 0, 5 | — | — | — | — | — | — | — | | — | — |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | | | |
| | Special subframe configuration 4 (when the TTI whose ratio of DwPTS to GP to UpPTS is 1:1:1 does not transmit the downlink process) | — | — | — | — | — | — | — | | | |
| | Special subframe configuration 9 | — | — | — | — | — | — | — | | | |
| | Special subframe configuration 10 | — | — | — | — | — | — | — | | | |
| 4 | Special subframe configurations 0, 5 | — | — | — | — | — | — | — | | | |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | | | |
| | Special subframe configuration 4 (when the TTI whose ratio of DwPTS to GP to UpPTS is 1:1:1 does not transmit the downlink process) | — | — | — | — | — | — | — | | | |
| | Special subframe configuration 9 | — | — | — | — | — | — | — | | | |
| | Special subframe configuration 10 | — | — | — | — | — | — | — | | | |

TABLE 30-continued

| | | | | | | | | | | | |
|---|---|---|---|---|---|---|---|---|---|---|---|
| 5 | Special subframe configurations 0, 5 | — | — | — | — | — | — | — | | | |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | | | |
| | Special subframe configuration 4 (when the TTI whose ratio of DwPTS to GP to UpPTS is 1:1:1 does not transmit the downlink process) | — | — | — | — | — | — | — | | | |
| | Special subframe configuration 9 | — | — | — | — | — | — | — | | | |
| | Special subframe configuration 10 | — | — | — | — | — | — | — | | | |
| 6 | Special subframe configurations 0, 5 | — | — | — | — | — | — | — | | 8 | 8 |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | | 8 | 8 |
| | Special subframe configuration 4 (when the TTI whose ratio of DwPTS to GP to UpPTS is 1:1:1 does not transmit the downlink process) | — | — | — | — | — | — | — | | 8 | 8 |
| | Special subframe configuration 9 | — | — | — | — | — | — | — | | 8 | 8 |
| | Special subframe configuration 10 | — | — | — | — | — | — | — | 7 | 7 | 7 |

| TDD uplink-down-link config-uration | Special subframe configuration | TTI n | | | | | | | | | |
|---|---|---|---|---|---|---|---|---|---|---|---|
| | | 30 | 31 | 32 | 33 | 34 | 35 | 36 | 37 | 38 | 39 |
| 3 | Special subframe configurations 0, 5 | — | — | — | — | — | — | — | | | |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | | | |
| | Special subframe configuration 4 (when the TTI whose ratio of DwPTS to GP to UpPTS is 1:1:1 does not transmit the downlink process) | — | — | — | — | — | — | — | | | |
| | Special subframe configuration 9 | | | | | | | | | | |
| | Special subframe configuration 10 | — | — | — | — | — | — | — | | | |
| 4 | Special subframe configurations 0, 5 | — | — | — | — | — | — | — | | | |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | | | |

TABLE 30-continued

| | | | | | | | | |
|---|---|---|---|---|---|---|---|---|
| | Special subframe configuration 4 (when the TTI whose ratio of DwPTS to GP to UpPTS is 1:1:1 does not transmit the downlink process) | — | — | — | — | — | — | — |
| | Special subframe configuration 9 | — | — | — | — | — | — | — |
| | Special subframe configuration 10 | — | — | — | — | — | — | — |
| 5 | Special subframe configurations 0, 5 | — | — | — | — | — | — | — |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — |
| | Special subframe configuration 4 (when the TTI whose ratio of DwPTS to GP to UpPTS is 1:1:1 does not transmit the downlink process) | — | — | — | — | — | — | — |
| | Special subframe configuration 9 | — | — | — | — | — | — | — |
| | Special subframe configuration 10 | — | — | — | — | — | — | — |
| 6 | Special subframe configurations 0, 5 | 8 | 8 | 8 | — | — | — | — |
| | Special subframe configurations 1, 2, 3, 6, 7 and 8 (when the TTI whose ratio of DwPTS to GP to UpPTS is 1:1:1 does not transmit the downlink process in the configuration 4) | 8 | 8 | 8 | 8 | 8 | — | — |
| | Special subframe configuration 4 (when the TTI whose ratio of DwPTS to GP to UpPTS is 1:1:1 does not transmit the downlink process) | 8 | 8 | 8 | 8 | 8 | 8 | — |
| | Special subframe configuration 9 | 8 | 8 | 8 | 8 | — | — | — |
| | Special subframe configuration 10 | 7 | 7 | 7 | — | — | — | — |

If the OS in the UpPTS transmits the ACK, the values of the K' in the different TTIs are as illustrated in Table 31.

TABLE 31

| TDD uplink-down-link config-uration | Special subframe configuration | TTI n | | | | | | | | | |
|---|---|---|---|---|---|---|---|---|---|---|---|
| | | 0 | 1 | 2 | 3 | 4 | 5 | 6 | 7 | 8 | 9 |
| 3 | Special subframe configurations 0, 5 | — | — | — | — | — | — | — | 27, 26 | 26, 25 | 25, 24 |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | 27, 26, 25 | 25, 24 | 24, 23 |
| | Special subframe configuration 4 (when the TTI whose ratio of DwPTS to GP to | — | — | — | — | — | — | — | 27, 26, 25 | 25, 24, 23 | 23, 22 |

TABLE 31-continued

| | | | | | | | | | | | |
|---|---|---|---|---|---|---|---|---|---|---|---|
| | UpPTS is 1:1:1 does not transmit the downlink process) | | | | | | | | | | |
| | Special subframe configuration 9 | — | — | — | — | — | — | — | 27, 26 | 26, 25 | 25, 24 |
| | Special subframe configuration 10 | — | — | — | — | — | — | 26, 25 | 25, 24 | 24, 23 | 23, 22 |
| 4 | Special subframe configurations 0, 5 | — | — | — | — | — | — | — | 31, 30, 29, 28 | 28, 27, 26, 25 | 25, 24, 23 |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | 31, 30, 29, 28 | 28, 27, 26, 25 | 25, 24, 23, 22 |
| | Special subframe configuration 4 (when the TTI whose ratio of DwPTS to GP to UpPTS is 1:1:1 does not transmit the downlink process) | — | — | — | — | — | — | — | 31, 30, 29, 28 | 28, 27, 26, 25 | 25, 24, 23, 22 |
| | Special subframe configuration 9 | — | — | — | — | — | — | — | 31, 30, 29, 28 | 28, 27, 26, 25 | 25, 24, 23, 22 |
| | Special subframe configuration 10 | — | — | — | — | — | — | 30, 29, 28 | 28, 27, 26 | 26, 25, 24 | 24, 23, 22 |
| 5 | Special subframe configurations 0, 5 | — | — | — | — | — | — | — | 35, 34, 33, 32, 31, 30, 29 | 29, 28, 27, 26, 25, 24, 23 | 23, 22, 21, 20, 19, 18, 17 |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | 35, 34, 33, 32, 31, 30, 29 | 29, 28, 27, 26, 25, 24, 23 | 23, 22, 21, 20, 19, 18, 17 |
| | Special subframe configuration 4 (when the TTI whose ratio of DwPTS to GP to UpPTS is 1:1:1 does not transmit the downlink process) | — | — | — | — | — | — | — | 35, 34, 33, 32, 31, 30, 29, 28 | 28, 27, 26, 25, 24, 23, 22 | 22, 21, 20, 19, 18, 17, 16 |
| | Special subframe configuration 9 | — | — | — | — | — | — | — | 35, 34, 33, 32, 31, 30, 29 | 29, 28, 27, 26, 25, 24, 23 | 23, 22, 21, 20, 19, 18, 17 |
| | Special subframe configuration 10 | — | — | — | — | — | — | 34, 33, 32, 31, 30, 29 | 29, 28, 27, 26, 25, 24 | 24, 23, 22, 21, 20, 19 | 19, 18, 17, 16, 15, 14 |
| 6 | Special subframe configurations 0, 5 | — | — | — | — | — | — | — | 11 | 11 | 11 |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | 11 | 11 | 11 |
| | Special subframe configuration 4 (when the TTI whose ratio of DwPTS to GP to UpPTS is 1:1:1 does not transmit the downlink process) | — | — | — | — | — | — | — | 11 | 11 | 11 |
| | Special subframe configuration 9 | — | — | — | — | — | — | — | 11 | 11 | 11 |
| | Special subframe configuration 10 | — | — | — | — | — | — | 10 | 10 | 10 | 10 |

TABLE 31-continued

| TDD uplink-downlink configuration | Special subframe configuration | TTI n | | | | | | | | | |
|---|---|---|---|---|---|---|---|---|---|---|---|
| | | 10 | 11 | 12 | 13 | 14 | 15 | 16 | 17 | 18 | 19 |
| 3 | Special subframe configurations 0, 5 | 24, 23 | 23, 22 | 22, 21 | 21, 20 | 20, 19 | 19, 18 | 18, 17 | 17, 16 | 16, 15 | 15 |
| | Special subframe configurations 1, 2, 3, 6, 7 and 8 (when the TTI whose ratio of DwPTS to GP to UpPTS is 1:1:1 does not transmit the downlink process in the configuration 4) | 23, 22 | 22, 21 | 21, 20 | 20, 19 | 19, 18 | 18, 17 | 17, 16 | 16, 15 | 15, 14 | 14, 13 |
| | Special subframe configuration 4 (when the TTI whose ratio of DwPTS to GP to UpPTS is 1:1:1 does not transmit the downlink process) | 22, 21 | 21, 20 | 20, 19 | 19, 18 | 18, 17 | 17, 16 | 16, 15 | 15, 14 | 14, 13 | 13, 12 |
| | Special subframe configuration 9 | 24, 23 | 23, 22 | 22, 21 | 21, 20 | 20, 19 | 19, 18 | 18, 17 | 17, 16 | 16, 15 | 15, 14 |
| | Special subframe configuration 10 | 22, 21 | 21, 20 | 20, 19 | 19, 18 | 18, 17 | 17, 16 | 16, 15 | 15, 14 | 14 | 14 |
| 4 | Special subframe configurations 0, 5 | 23, 22, 21 | 21, 20, 19 | 19, 18, 17 | 17, 16, 15 | 15, 14, 13 | 13, 12, 11 | — | | | |
| | Special subframe configurations 1, 2, 3, 6, 7 and 8 (when the TTI whose ratio of DwPTS to GP to UpPTS is 1:1:1 does not transmit the downlink process in the configuration 4) | 22, 21, 20, 19 | 19, 18, 17 | 17, 16, 15 | 15, 14, 13 | 13, 12, 11 | 11, 10, 9 | — | | | |
| | Special subframe configuration 4 (when the TTI whose ratio of DwPTS to GP to UpPTS is 1:1:1 does not transmit the downlink process) | 22, 21, 20, 19 | 19, 18, 17, 16 | 16, 15, 14 | 14, 13, 12 | 12, 11, 10 | 10, 9, 8 | | | | |
| | Special subframe configuration 9 | 22, 21, 20 | 20, 19, 18 | 18, 17, 16 | 16, 15, 14 | 14, 13, 12 | 12, 11, 10 | — | | | |
| | Special subframe configuration 10 | 22, 21, 20 | 20, 19, 18 | 18, 17, 16 | 16, 15, 14 | 14, 13, 12 | 12, 11, 10 | — | | | |
| 5 | Special subframe configurations 0, 5 | 17, 16, 15, 14, 13, 12 | 12, 11, 10, 9, 8, 7 | — | — | — | — | — | | | |
| | Special subframe configurations 1, 2, 3, 6, 7 and 8 (when the TTI whose ratio of DwPTS to GP to UpPTS is 1:1:1 does not transmit the downlink process in the configuration 4) | 17, 16, 15, 14, 13, 12, 11 | 11, 10, 9, 8, 7, 6, 5 | — | — | — | — | — | | | |
| | Special subframe configuration 4 (when the TTI whose ratio of DwPTS to GP to UpPTS is 1:1:1 does not transmit the downlink process) | 16, 15, 14, 13, 12, 11, 10 | 10, 9, 8, 7, 6, 5, 4 | — | — | — | — | — | | | |
| | Special subframe configuration 9 | 17, 16, 15, 14, 13, 12, 11 | 11, 10, 9, 8, 7, 6 | — | — | — | — | — | | | |
| | Special subframe configuration 10 | 14, 13, 12, 11, 10 | 10, 9, 8, 7, 6 | — | — | — | — | — | | | |

TABLE 31-continued

| | | | | | | | | | | | |
|---|---|---|---|---|---|---|---|---|---|---|---|
| 6 | Special subframe configurations 0, 5 | 11 | 11 | 11 | 11 | 11 | 11 | — | | | |
| | Special subframe configurations 1, 2, 3, 6, 7 and 8 (when the TTI whose ratio of DwPTS to GP to UpPTS is 1:1:1 does not transmit the downlink process in the configuration 4) | 11 | 11 | 11 | 11 | 11 | 11 | 11 | 11 | | |
| | Special subframe configuration 4 (when the TTI whose ratio of DwPTS to GP to UpPTS is 1:1:1 does not transmit the downlink process) | 11 | 11 | 11 | 11 | 11 | 11 | 11 | 11 | 11 | |
| | Special subframe configuration 9 | 11 | 11 | 11 | 11 | 11 | 11 | 11 | | | |
| | Special subframe configuration 10 | 10 | 10 | 10 | 10 | 10 | 10 | — | | | |

| TDD uplink-downlink config-uration | Special subframe configuration | TTI n | | | | | | | | | |
|---|---|---|---|---|---|---|---|---|---|---|---|
| | | 20 | 21 | 22 | 23 | 24 | 25 | 26 | 27 | 28 | 29 |
| 3 | Special subframe configurations 0, 5 | — | — | — | — | — | — | — | | | |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | | | |
| | Special subframe configuration 4 (when the TTI whose ratio of DwPTS to GP to UpPTS is 1:1:1 does not transmit the downlink process) | — | — | — | — | — | — | — | | | |
| | Special subframe configuration 9 | — | — | — | — | — | — | — | | | |
| | Special subframe configuration 10 | — | — | — | — | — | — | — | | | |
| 4 | Special subframe configurations 0, 5 | — | — | — | — | — | — | — | | | |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | | | |
| | Special subframe configuration 4 (when the TTI whose ratio of DwPTS to GP to UpPTS is 1:1:1 does not transmit the downlink process) | — | — | — | — | — | — | — | | | |
| | Special subframe configuration 9 | — | — | — | — | — | — | — | | | |
| | Special subframe configuration 10 | — | — | — | — | — | — | — | | | |
| 5 | Special subframe configurations 0, 5 | — | — | — | — | — | — | — | | | |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | | | |
| | Special subframe configuration 4 (when the TTI whose ratio of DwPTS to GP to UpPTS is 1:1:1 does not transmit the downlink process) | — | — | — | — | — | — | — | | | |
| | Special subframe configuration 9 | — | — | — | — | — | — | — | | | |
| | Special subframe configuration 10 | — | — | — | — | — | — | — | | | |
| 6 | Special subframe configurations 0, 5 | — | — | — | — | — | — | — | 7 | 7 | 7 |
| | Special subframe configurations 1, 2, 3, 6, 7 and 8 (when the TTI whose ratio of DwPTS to GP to UpPTS is 1:1:1 does | — | — | — | — | — | — | — | 7 | 7 | 7 |

TABLE 31-continued

| | | | | | | | | | | | |
|---|---|---|---|---|---|---|---|---|---|---|---|
| | not transmit the downlink process in the configuration 4) | | | | | | | | | | |
| | Special subframe configuration 4 (when the TTI whose ratio of DwPTS to GP to UpPTS is 1:1:1 does not transmit the downlink process) | — | — | — | — | — | — | — | 7 | 7 | 7 |
| | Special subframe configuration 9 | — | — | — | — | — | — | — | 7 | 7 | 7 |
| | Special subframe configuration 10 | — | — | — | — | — | — | 6 | 6 | 6 | 6 |

| TDD uplink-downlink configuration | Special subframe configuration | TTI n 30 | 31 | 32 | 33 | 34 | 35 | 36 | 37 | 38 | 39 |
|---|---|---|---|---|---|---|---|---|---|---|---|
| 3 | Special subframe configurations 0, 5 | — | — | — | — | — | — | — | | | |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | | | |
| | Special subframe configuration 4 (when the TTI whose ratio of DwPTS to GP to UpPTS is 1:1:1 does not transmit the downlink process) | — | — | — | — | — | — | — | | | |
| | Special subframe configuration 9 | — | — | — | — | — | — | — | | | |
| | Special subframe configuration 10 | — | — | — | — | — | — | — | | | |
| 4 | Special subframe configurations 0, 5 | — | — | — | — | — | — | — | | | |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | | | |
| | Special subframe configuration 4 (when the TTI whose ratio of DwPTS to GP to UpPTS is 1:1:1 does not transmit the downlink process) | — | — | — | — | — | — | — | | | |
| | Special subframe configuration 9 | — | — | — | — | — | — | — | | | |
| | Special subframe configuration 10 | — | — | — | — | — | — | — | | | |
| 5 | Special subframe configurations 0, 5 | — | — | — | — | — | — | — | | | |
| | Special subframe configurations 1, 2, 3, 6, 7 and 8 (when the TTI whose ratio of DwPTS to GP to UpPTS is 1:1:1 does not transmit the downlink process in the configuration 4) | — | — | — | — | — | — | — | | | |
| | Special subframe configuration 4 (when the TTI whose ratio of DwPTS to GP to UpPTS is 1:1:1 does not transmit the downlink process) | — | — | — | — | — | — | — | | | |
| | Special subframe configuration 9 | — | — | — | — | — | — | — | | | |
| | Special subframe configuration 10 | — | — | — | — | — | — | — | | | |
| 6 | Special subframe configurations 0, 5 | 7 | 7 | — | — | — | — | — | | | |
| | Special subframe configurations 1, 2, 3, 6, 7 and 8 (when the TTI whose ratio of DwPTS to GP to UpPTS is 1:1:1 does not transmit the downlink process in the configuration 4) | 7 | 7 | 7 | 7 | — | — | — | | | |
| | Special subframe configuration 4 (when the TTI whose ratio of DwPTS to GP to UpPTS is 1:1:1 does not transmit the downlink process) | 7 | 7 | 7 | 7 | 7 | — | — | | | |
| | Special subframe configuration 9 | 7 | 7 | 7 | — | — | — | — | | | |
| | Special subframe configuration 10 | 6 | 6 | — | — | — | — | — | | | |

C) The TTI Whose Length is Two OSs

If the OS in the UpPTS does not transmit the ACK, the values of the K' in the different TTIs are as illustrated in Table 32.

TABLE 32

| Uplink-downlink config-uration | Special subframe configuration | TTI n | | | | | | | | | |
|---|---|---|---|---|---|---|---|---|---|---|---|
| | | 10 | 11 | 12 | 13 | 14 | 15 | 16 | 17 | 18 | 19 |
| 3 | Special subframe configurations 0, 5 | — | | | 48, 47 | 47, 46 | 46, 45 | 45, 44 | 44, 43 | 43, 42 | 42, 41 |
| | Special subframe configurations 1, 2, 6 and 7 | — | | | 48, 47, 46 | 46, 45, 44 | 44, 43, 42 | 42, 41 | 41, 40 | 40, 39 | 39, 38 |
| | Special subframe configurations 3, 4 and 8 | — | | | 48, 47, 46 | 46, 45, 44 | 44, 43, 42 | 42, 41, 40 | 40, 39 | 39, 38 | 38, 37 |
| | Special subframe configuration 9 | — | | | 48, 47, 46 | 46, 45 | 45, 44 | 44, 43 | 43, 42 | 42, 41 | 41, 40 |
| | Special subframe configuration 10 | — | 46, 45 | 45, 44 | 44, 43 | 43, 42 | 42, 41 | 41, 40 | 40, 39 | 39, 38 | 38, 37 |
| 4 | Special subframe configurations 0, 5 | — | | | 55, 54, 53, 52 | 52, 51, 50, 49 | 49, 48, 47, 46 | 46, 45, 44, 43 | 43, 42, 41, 40 | 40, 39, 38, 37 | 37, 36, 35 |
| | Special subframe configurations 1, 2, 6 and 7 | — | | | 55, 54, 53, 52 | 52, 51, 50, 49 | 49, 48, 47, 46 | 46, 45, 44, 43 | 43, 42, 41, 40 | 40, 39, 38, 37 | 37, 36, 35, 34 |
| | Special subfram configurations 3, 4 and 8 | — | | | 55, 54, 53, 52 | 52, 51, 50, 49 | 49, 48, 47, 46 | 46, 45, 44, 43 | 43, 42, 41, 40 | 40, 39, 38, 37 | 37, 36, 35, 34 |
| | Special subframe configuration 9 | — | | | 55, 54, 53, 52 | 52, 51, 50, 49 | 49, 48, 47, 46 | 46, 45, 44, 43 | 43, 42, 41, 40 | 40, 39, 38, 37 | 37, 36, 35, 34 |
| | Special subframe configuration 10 | — | 53, 52, 51, 50 | 50, 49, 48 | 48, 47, 46 | 46, 45, 44 | 44, 43, 42 | 42, 41, 40 | 40, 39, 38 | 38, 37, 36 | 36, 35, 34 |
| 5 | Special subframe configurations 0, 5 | — | | | 62, 61, 60, 59, 58, 57, 56, 55 | 55, 54, 53, 52, 51, 50, 49, 48 | 48, 47, 46, 45, 44, 43, 42 | 42, 41, 40, 39, 38, 37, 36 | 36, 35, 34, 33, 32, 31, 30 | 30, 29, 28, 27, 26, 25, 24 | 24, 23, 22, 21, 20, 19, 18 |
| | Special subframe configurations 1, 2, 6 and 7 | — | | | 62, 61, 60, 59, 58, 57, 56, 55 | 55, 54, 53, 52, 51, 50, 49, 48 | 48, 47, 46, 45, 44, 43, 42, 41 | 41, 40, 39, 38, 37, 36, 35, 34 | 34, 33, 32, 31, 30, 29, 28, 27 | 27, 26, 25, 24, 23, 22, 21 | 21, 20, 19, 18, 17, 16, 15 |
| | Special subframe configurations 3, 4 and 8 | — | | | 62, 61, 60, 59, 58, 57, 56, 55 | 55, 54, 53, 52, 51, 50, 49, 48 | 48, 47, 46, 45, 44, 43, 42, 41 | 41, 40, 39, 38, 37, 36, 35, 34 | 34, 33, 32, 31, 30, 29, 28, 27 | 27, 26, 25, 24, 23, 22, 21, 20 | 20, 19, 18, 17, 16, 15, 14 |
| | Special subframe configuration 9 | — | | | 62, 61, 60, 59, 58 57, 56, 55 | 55, 54, 53, 52, 51, 50, 49, 48 | 48, 47, 46, 45, 44, 43, 42, 41 | 41, 40, 39, 38, 37, 36, 35 | 35, 34, 33, 32, 31, 30, 29 | 29, 28, 27, 26, 25, 24, 23 | 23, 22, 21, 20, 19, 18, 17 |
| | Special subframe configuration 10 | — | 60, 59, 58, 57, 56, 55 | 55, 54, 53, 52, 51, 50 | 50, 49, 48, 47, 46, 45 | 45, 44, 43, 42, 41, 40 | 40, 39, 38, 37, 36, 35 | 35, 34, 33, 32, 31, 30 | 30, 29, 28, 27, 26, 25 | 25, 24, 23, 22, 21, 20 | 20, 19, 18, 17, 16, 15 |
| 6 | Special subframe configurations 0, 5 | — | | | 20 | 20 | 20 | 20 | 20 | 20 | 20 |
| | Special subframe configurations 1, 2, 6 and 7 | — | | | 20 | 20 | 20 | 20 | 20 | 20 | 20 |

TABLE 32-continued

| | | | | | | | | | | | |
|---|---|---|---|---|---|---|---|---|---|---|---|
| | Special subframe configurations 3, 4 and 8 | — | | | 20 | 20 | 20 | 20 | 20 | 20 | 20 |
| | Special subframe configuration 9 | — | | | 20 | 20 | 20 | 20 | 20 | 20 | 20 |
| | Special subframe configuration 10 | — | 18 | 18 | 18 | 18 | 18 | 18 | 18 | 18 | 18 |

| TDD uplink-downlink config-uration | Special subframe configuration | TTI n | | | | | | | | | |
|---|---|---|---|---|---|---|---|---|---|---|---|
| | | 20 | 21 | 22 | 23 | 24 | 25 | 26 | 27 | 28 | 29 |
| 3 | Special subframe configurations 0, 5 | 41, 40 | 40, 39 | 39, 38 | 38, 37 | 37, 36 | 36, 35 | 35, 34 | 34, 33 | 33, 32 | 32, 31 |
| | Special subframe configurations 1, 2, 6 and 7 | 38, 37 | 37, 36 | 36, 35 | 35, 34 | 34, 33 | 33, 32 | 32, 31 | 31, 30 | 30, 29 | 29, 28 |
| | Special subframe configurations 3, 4 and 8 | 37, 36 | 36, 35 | 35, 34 | 34, 33 | 33, 32 | 32, 31 | 31, 30 | 30, 29 | 29, 28 | 28, 27 |
| | Special subframe configuration 9 | 40, 39 | 39, 38 | 38, 37 | 37, 36 | 36, 35 | 35, 34 | 34, 33 | 33, 32 | 32, 31 | 31, 30 |
| | Special subframe configuration 10 | 37, 36 | 36, 35 | 35, 34 | 34, 33 | 33, 32 | 32, 31 | 31, 30 | 30, 29 | 29, 28 | 28, 27 |
| 4 | Special subframe configurations 0, 5 | 35, 34, 33 | 33, 32, 31 | 31, 30, 29 | 29, 28, 27 | 27, 26, 25 | 25, 24, 23 | 23, 22, 21 | 21, 20, 19 | | |
| | Special subframe configurations 1, 2, 6 and 7 | 34, 33, 32, 31 | 31, 30, 29, 28 | 28, 27, 26 | 26, 25 24 | 24, 23, 22 | 22, 21, 20 | 20, 19, 18 | 18, 17, 16 | | |
| | Special subframe configurations 3, 4 and 8 | 34, 33, 32, 31 | 31, 30, 29, 28 | 28, 27, 26, 25 | 25, 24, 23 | 23, 22, 21 | 21, 20, 19 | 19, 18, 17 | 17, 16, 15 | | |
| | Special subframe configuration 9 | 34, 33, 32 | 32, 31, 30 | 30, 29, 28 | 28, 27, 26 | 26, 25, 24 | 24, 23, 22 | 22, 21, 20 | 20, 19, 18 | | |
| | Special subframe configuration 10 | 34, 33, 32 | 32, 31, 30 | 30, 29, 28 | 28, 27, 26 | 26, 25, 24 | 24, 23, 22 | 22, 21, 20 | 20, 19, 18 | | |
| 5 | Special subframe configurations 0, 5 | 18, 17, 16, 15, 14, 13, 12 | | | | | | | | | |
| | Special subframe configurations 1, 2, 6 and 7 | 15, 14, 13, 12, 11, 10, 9 | | | | | | | | | |
| | Special subframe configurations 3, 4 and 8 | 14, 13, 12, 11, 10, 9, 8 | | | | | | | | | |
| | Special subframe configuration 9 | 17, 16, 15, 14, 13, 12, 11 | | | | | | | | | |
| | Special subframe configuration 10 | 15, 14, 13, 12, 11 | | | | | | | | | |
| 6 | Special subframe configurations 0, 5 | 20 | 20 | 20 | 20 | 20 | 20 | 20 | 20 | 20 | |

TABLE 32-continued

| | | | | | | | | | | | |
|---|---|---|---|---|---|---|---|---|---|---|---|
| | Special subframe configurations 1, 2, 6 and 7 | 20 | 20 | 20 | 20 | 20 | 20 | 20 | 20 | 20 | 20 |
| | Special subframe configurations 3, 4 and 8 | 20 | 20 | 20 | 20 | 20 | 20 | 20 | 20 | 20 | 20 |
| | Special subframe configuration 9 | 20 | 20 | 20 | 20 | 20 | 20 | 20 | 20 | 20 | 20 |
| | Special subframe configuration 10 | 18 | 18 | 18 | 18 | 18 | 18 | 18 | 18 | | |

| TDD uplink-downlink config- | Special subframe | TTI n | | | | | | | | | |
|---|---|---|---|---|---|---|---|---|---|---|---|
| uration | configuration | 30 | 31 | 32 | 33 | 34 | 35 | 36 | 37 | 38 | 39 |
| 3 | Special subframe configurations 0, 5 | 31, 30 | 30, 29 | 29, 28 | 28, 27 | 27, 26 | | | | | |
| | Special subframe configurations 1, 2, 6 and 7 | 28, 27 | 27, 26 | 26, 25 | 25, 24 | 24, 23 | | | | | |
| | Special subframe configurations 3, 4 and 8 | 27, 26 | 26, 25 | 25, 24 | 24, 23 | 23, 22 | | | | | |
| | Special subframe configuration 9 | 30, 29 | 29, 28 | 28, 27 | 27, 26 | 26, 25 | | | | | |
| | Special subframe configuration 10 | 27, 26 | 26, 25 | 25 | 25 | 25 | | | | | |
| 4 | Special subframe configurations 0, 5 | — | | | | | | | | | |
| | Special subframe configurations 1, 2, 6 and 7 | — | | | | | | | | | |
| | Special subframe configurations 3, 4 and 8 | — | | | | | | | | | |
| | Special subframe configuration 9 | — | | | | | | | | | |
| | Special subframe configuration 10 | — | | | | | | | | | |
| 5 | Special subframe configurations 0, 5 | — | | | | | | | | | |
| | Special subframe configurations 1, 2, 6 and 7 | — | | | | | | | | | |
| | Special subframe configurations 3, 4 and 8 | — | | | | | | | | | |
| | Special subframe configuration 9 | — | | | | | | | | | |
| | Special subframe configuration 10 | — | | | | | | | | | |
| 6 | Special subframe configurations 0, 5 | — | | | | | | | | | |
| | Special subframe configurations 1, 2, 6 and 7 | — | | | | | | | | | |
| | Special subframe configurations 3, 4 and 8 | — | | | | | | | | | |
| | Special subframe configuration 9 | — | | | | | | | | | |
| | Special subframe configuration 10 | — | | | | | | | | | |

TABLE 32-continued

| TDD uplink-downlink configuration | Special subframe configuration | TTI n 40 | 41 | 42 | 43 | 44 | 45 | 46 | 47 | 48 | 49 |
|---|---|---|---|---|---|---|---|---|---|---|---|
| 3 | Special subframe configurations 0, 5 | — | | | | | | | | | |
| | Special subframe configurations 1, 2, 6 and 7 | — | | | | | | | | | |
| | Special subframe configurations 3, 4 and 8 | — | | | | | | | | | |
| | Special subframe configuration 9 | — | | | | | | | | | |
| | Special subframe configuration 10 | — | | | | | | | | | |
| 4 | Special subframe configurations 0, 5 | — | | | | | | | | | |
| | Special subframe configurations 1, 2, 6 and 7 | — | | | | | | | | | |
| | Special subframe configurations 3, 4 and 8 | — | | | | | | | | | |
| | Special subframe configuration 9 | — | | | | | | | | | |
| | Special subframe configuration 10 | — | | | | | | | | | |
| 5 | Special subframe configurations 0, 5 | — | | | | | | | | | |
| | Special subframe configurations 1, 2, 6 and 7 | — | | | | | | | | | |
| | Special subframe configurations 3, 4 and 8 | — | | | | | | | | | |
| | Special subframe configuration 9 | — | | | | | | | | | |
| | Special subframe configuration 10 | — | | | | | | | | | |
| 6 | Special subframe configurations 0, 5 | — | | | | | | | | 13 | 13 |
| | Special subframe configurations 1, 2, 6 and 7 | — | | | | | | | | 13 | 13 |
| | Special subframe configurations 3, 4 and 8 | — | | | | | | | | 13 | 13 |
| | Special subframe configuration 9 | — | | | | | | | | 13 | 13 |
| | Special subframe configuration 10 | — | | | | | | 11 | 11 | 11 | 11 |

| TDD uplink-downlink configuration | Special subframe configuration | TTI n 50 | 51 | 52 | 53 | 54 | 55 | 56 | 57 | 58 | 59 |
|---|---|---|---|---|---|---|---|---|---|---|---|
| 3 | Special subframe configurations 0, 5 | — | | | | | | | | | |
| | Special subframe configurations 1, 2, 6 and 7 | — | | | | | | | | | |
| | Special subframe configurations 3, 4 and 8 | — | | | | | | | | | |
| | Special subframe configuration 9 | — | | | | | | | | | |
| | Special subframe configuration 10 | — | | | | | | | | | |
| 4 | Special subframe configurations 0, 5 | — | | | | | | | | | |
| | Special subframe configurations 1, 2, 6 and 7 | — | | | | | | | | | |
| | Special subframe configurations 3, 4 and 8 | — | | | | | | | | | |
| | Special subframe configuration 9 | — | | | | | | | | | |
| | Special subframe configuration 10 | — | | | | | | | | | |
| 5 | Special subframe configurations 0, 5 | — | | | | | | | | | |
| | Special subframe configurations 1, 2, 6 and 7 | — | | | | | | | | | |

TABLE 32-continued

| | | | | | | | | | | | |
|---|---|---|---|---|---|---|---|---|---|---|---|
| | Special subframe configurations 3, 4 and 8 | — | | | | | | | | | |
| | Special subframe configuration 9 | — | | | | | | | | | |
| | Special subframe configuration 10 | — | | | | | | | | | |
| 6 | Special subframe configurations 0, 5 | 13 | 13 | 13 | 13 | 13 | 13 | 13 | | | |
| | Special subframe configurations 1, 2, 6 and 7 | 13 | 13 | 13 | 13 | 13 | 13 | 13 | 13 | 13 | 13 |
| | Special subframe configurations 3, 4 and 8 | 13 | 13 | 13 | 13 | 13 | 13 | 13 | 13 | 13 | 13 |
| | Special subframe configuration 9 | 13 | 13 | 13 | 13 | 13 | 13 | 13 | 13 | | |
| | Special subframe configuration 10 | 11 | 11 | 11 | 11 | 11 | 11 | | | | |

| TDD uplink-downlink config- | Special subframe | TTI n | | | | | | | | | |
|---|---|---|---|---|---|---|---|---|---|---|---|
| uration | configuration | 60 | 61 | 62 | 63 | 64 | 65 | 66 | 67 | 68 | 69 |
| 3 | Special subframe configurations 0, 5 | — | | | | | | | | | |
| | Special subframe configurations 1, 2, 6 and 7 | — | | | | | | | | | |
| | Special subframe configurations 3, 4 and 8 | — | | | | | | | | | |
| | Special subframe configuration 9 | — | | | | | | | | | |
| | Special subframe configuration 10 | — | | | | | | | | | |
| 4 | Special subframe configurations 0, 5 | — | | | | | | | | | |
| | Special subframe configurations 1, 2, 6 and 7 | — | | | | | | | | | |
| | Special subframe configurations 3, 4 and 8 | — | | | | | | | | | |
| | Special subframe configuration 9 | — | | | | | | | | | |
| | Special subframe configuration 10 | — | | | | | | | | | |
| 5 | Special subframe configurations 0, 5 | — | | | | | | | | | |
| | Special subframe configurations 1, 2, 6 and 7 | — | | | | | | | | | |
| | Special subframe configurations 3, 4 and 8 | — | | | | | | | | | |
| | Special subframe configuration 9 | — | | | | | | | | | |
| | Special subframe configuration 10 | — | | | | | | | | | |
| 6 | Special subframe configurations 0, 5 | — | | | | | | | | | |
| | Special subframe configurations 1, 2, 6 and 7 | — | | | | | | | | | |
| | Special subframe configurations 3, 4 and 8 | 13 | | | | | | | | | |
| | Special subframe configuration 9 | — | | | | | | | | | |
| | Special subframe configuration 10 | — | | | | | | | | | |

Then, based on the three new uplink-downlink configurations in the embodiments of the disclosure, the HARQ feedback timings obtained by applying the method provided by the embodiments of the disclosure are given.

For the three new uplink-downlink configurations, when the length of the TTI is two OSs, the HARQ feedback of the PDSCH or the PDCCH/EPDCCH indicating the SPS release transmitted in the downlink TTI n−k, wherein k∈K', is performed in the uplink TTI n. The values of the K' are as illustrated in Table 33.

TABLE 33

| New uplink-downlink | TTI n | | | | | | | | | |
|---|---|---|---|---|---|---|---|---|---|---|
| configurations | 0 | 1 | 2 | 3 | 4 | 5 | 6 | 7 | 8 | 9 |
| Configuration 1 | | | | | | | | | | |
| Configuration 2 | | | | | | | | | | |
| Configuration 3 | | | | | | | | | | |
| New uplink-downlink | TTI n | | | | | | | | | |
| configurations | 10 | 11 | 12 | 13 | 14 | 15 | 16 | 17 | 18 | 19 |
| Configuration 1 | | | 16, 12 | 12, 11 | 11, 10 | 10, 9 | 9 | 9 | 9 | 9 |
| Configuration 2 | | | 16, 15 | 15, 13 | 13, 12 | 12, 11 | 11, 10 | 10, 9 | 9 | 9 |
| Configuration 3 | | 11 | 11 | 11 | 11 | 11 | 11 | 11 | 11 | 11 |
| New uplink-downlink | TTI n | | | | | | | | | |
| configurations | 20 | 21 | 22 | 23 | 24 | 25 | 26 | 27 | 28 | 29 |
| Configuration 1 | 9 | | | | | 4 | 4 | 4 | | |
| Configuration 2 | 9 | | | | | | | 6, 5, 4 | | |
| Configuration 3 | 11 | | | | | 4 | 4 | 4 | | |
| New uplink-downlink | TTI n | | | | | | | | | |
| configurations | 30 | 31 | 32 | 33 | 34 | 35 | 36 | 37 | 38 | 39 |
| Configuration 1 | | | 8, 4 | 4 | 4 | | | | | |
| Configuration 2 | | | | | 10, 9, 8, 6, 5, 4 | | | | | |
| Configuration 3 | | | 4 | 4 | 4 | | | | | |
| New uplink-downlink | TTI n | | | | | | | | | |
| configurations | 40 | 41 | 42 | 43 | 44 | 45 | 46 | 47 | 48 | 49 |
| Configuration 1 | | | | | | | | 16, 12 | 12, 11 | 11, 10 |
| Configuration 2 | | | | | | | | 16, 15, 14, 12, 11, 10, 9 | 9, 8, 7, 6, 5, 4 | |
| Configuration 3 | | | | | | | 11 | 11 | 11 | 11 |
| New uplink-downlink | TTI n | | | | | | | | | |
| configurations | 50 | 51 | 52 | 53 | 54 | 55 | 56 | 57 | 58 | 59 |
| Configuration 1 | 10, 9 [10, 9, 4] | 9 | 9 | 9 | 9 | 9 | | | | |
| Configuration 2 | | | | | | 10, 9, 6, 5, 4 | | | | |
| Configuration 3 | 11 | 11 | 11 | 11 | 11 | 11 | | | | |
| New uplink-downlink | TTI n | | | | | | | | | |
| configurations | 60 | 61 | 62 | 63 | 64 | 65 | 66 | 67 | 68 | 69 |
| Configuration 1 | 4 | 4 | 4 | 8, 4 | 4 | 4 | | | | |
| Configuration 2 | | | 10, 9, 8, 6, 5, 4 | | | | | | | 10, 9, 8, 6, 5, 4 |
| Configuration 3 | 4 | 4 | 4 | | | | | 4 | 4 | 4 |

At last, when it is assumed that both the first threshold and the second threshold in the preset feedback retransmission time association are two TTIs, an example of the HARQ time association in the case of the TDD uplink-downlink configuration 2 and the length of the TTI being 0.5 ms is provided. The HARQ feedback of the PDSCH or the PDCCH/EPDCCH indicating the SPS release transmitted in the downlink TTI n−k, wherein k∈K', is performed in the uplink TTI n. The values of the K' are as illustrated in Table 34 (situation 1) and Table 35 (situation 2).

TABLE 34

| Different special subframe configurations of the TDD uplink-downlink configuration 2 | TTI n | | | | | | | | | |
|---|---|---|---|---|---|---|---|---|---|---|
| | 0 | 1 | 2 | 3 | 4 | 5 | 6 | 7 | 8 | 9 |
| Special subframe configurations 0, 5, 9 and 6:2:6 | — | — | — | — | 8, 7, 6, 5 | 5, 4, 3 | | | — | — |
| Special subframe configurations 1, 2, 3, 4, 6, 7, 8 | | | | — | 11, 8, 7, 6 | 6, 5, 4, 3 | | | | |
| | 10 | 11 | 12 | 13 | 14 | 15 | 16 | 17 | 18 | 19 |
| Special subframe configurations 0, 5, 9 and 6:2:6 | — | — | | — | 8, 7, 6, 5 | 5, 4, 3 | | | — | — |
| Special subframe configurations 1, 2, 3, 4, 6, 7, 8 | | | | — | 11, 8, 7, 6 | 6, 5, 4, 3 | | | | |

TABLE 35

| Different special subframe configurations of the TDD uplink-downlink configuration 2 | TTI n | | | | | | | | | |
|---|---|---|---|---|---|---|---|---|---|---|
| | 0 | 1 | 2 | 3 | 4 | 5 | 6 | 7 | 8 | 9 |
| Special subframe configurations 0, 5, 9 and 6:2:6 | — | — | — | 7, 6, 5 | 5, 4 | 4, 3 | | | — | — |
| Special subframe configurations 1, 2, 3, 4, 6, 7, 8 | | | | 10, 7, 6 | 6, 5, 4 | 4, 3 | | | | |
| | 10 | 11 | 12 | 13 | 14 | 15 | 16 | 17 | 18 | 19 |
| Special subframe configurations 0, 5, 9 and 6:2:6 | — | — | | 7, 6, 5 | 5, 4 | 4, 3 | | | — | — |
| Special subframe configurations 1, 2, 3, 4, 6, 7, 8 | | | | 10, 7, 6 | 6, 5, 4 | 4, 3 | | | | |

The embodiments of the disclosure also provide a piece of communication equipment, which includes a memory and a processor.

The memory is configured to store a computer program.

The processor is connected with the memory, and is configured to be able to execute the method for determining an HARQ feedback timing provided by any above technical solution by executing the computer program.

The processors here may include: an Application Processor (AP), a Central Processing Unit (CPU), a Digital Signal Processor (DSP) or a Field Programmable Gate Array (FPGA).

The memory may include: a storage medium for storaging the computer program non-instantaneously.

The communication equipment here may be the aforementioned base station.

The processor is connected with the memory through a bus. The bus may include Integrated Circuit (IC) bus.

The embodiments of the disclosure provide a computer storage medium, in which a computer executable instruction is stored. The computer executable instruction is used for executing the method for determining an HARQ feedback timing provided by any above embodiment.

The storage media provided by the embodiments may be various types of storage media. In some embodiments, the storage media may be a non-transitory storage media.

The above is the preferred embodiments of the disclosure. It should be noted that for those of ordinary skill in the art, all modifications made according to the principles of the disclosure should fall within the protection scope of the disclosure.

INDUSTRIAL APPLICABILITY

According to the technical solutions provided in the embodiments of the disclosure, the relative position association between the data transmission TTI and the feedback TTI of the data transmission TTI in the HARQ process, or the relative position association between the initial transmission TTI, the feedback TTI and the retransmission TTI is determined according to the length of the TTI. In such a manner, the number of the HARQ processes corresponding to different lengths of the TTI may be determined, and the HARQ feedback timings in these cases may be obtained, thereby providing a support for the low-delay transmission, and producing a positive effect in industry; and moreover, the technical solutions provided by the disclosure may be implemented by inputting computer program instructions in base stations and terminals, so the technical solutions have the characteristics of being easy to be implemented in industry.

The invention claimed is:

1. A method for determining a hybrid automatic repeat request (HARQ) feedback timing, comprising:
   - determining a configuration of a currently-used time division duplex (TDD) frame structure;
   - determining a length of a currently-used transmission time interval (TTI); and
   - determining, according to the configuration of the TDD frame structure and the length of the TTI, a relative position association between a data transmission TTI and a feedback TTI of the data transmission TTI in an HARQ process, or a relative position association between an initial transmission TTI, a feedback TTI and a retransmission TTI in an HARQ process, wherein in each radio frame, numbering sequentially all TTIs comprised in the radio frame; the relative position association between the feedback TTI and the data transmission TTI comprises an TTI interval between the feedback TTI and the data transmission TTI, or, wherein in each subframe, numbering sequentially all TTIs comprised in the subframe; the relative position association between the feedback TTI and the data transmission TTI comprises: a subframe interval between the feedback TTI and the data transmission TTI, a number of the feedback TTI in a subframe where the feedback TTI is located, and a number of the data transmission TTI in a subframe where the data transmission TTI is located.

2. The method according to claim 1, wherein the determining, according to the configuration of the TDD frame structure and the length of the TTI, the relative position association between the data transmission TTI and the feedback TTI of the data transmission TTI in the HARQ process, or the relative position association between the initial transmission TTI, the feedback TTI and the retransmission TTI in the HARQ process comprises:

determining a position of the initial transmission TTI in each HARQ process;

selecting, according to a preset feedback retransmission time association, the feedback TTI and the retransmission TTI in the HARQ process from the TDD frame structure; and obtaining the relative position association between the data transmission TTI and the feedback TTI of the data transmission TTI in the HARQ process, or the relative position association between the initial transmission TTI, the feedback TTI and the retransmission TTI in the HARQ process, wherein data of no more than one HARQ process is transmitted in one TTI; the preset feedback retransmission time association comprises: an interval between the feedback TTI and the initial transmission TTI is greater than a first threshold, and an interval between the feedback TTI and the retransmission TTI is greater than a second threshold.

3. The method according to claim 1, wherein the configuration of the TDD frame structure comprises: uplink-downlink configuration of the TDD frame structure and special subframe configuration, wherein the uplink-downlink configuration comprises one of uplink-downlink configurations 0, 1, 2, 3, 4, 5 or 6 of the LTE TDD defined in 3GPP TS 36.211; the special subframe configuration comprises at least one of special subframe configurations 0, 1, 2, 3, 4, 5, 6, 7, 8, 9 defined in 3GPP TS 36.211 or a new special subframe configuration 10; in the special subframe configuration 10, a ratio of a downlink pilot time slot (DwPTS) to a guard period (GP) to an uplink pilot time slot (UpPTS) is 6:2:6.

4. The method according to claim 1, wherein when the length of the TTI is 0.5 ms, the configuration of the TDD frame structure is uplink-downlink configuration 0 of the LTE TDD, for special subframe configuration 0, 5, 9 or 10, in case that the TTIs are numbered sequentially in a radio frame starting from 0, upon detection of a PDSCH transmission or a physical downlink control channel (PDCCH)/enhanced physical downlink control channel (EPDCCH) indicating a downlink semi-persistent scheduling (SPS) release in TTI n−k, where $k \in K'$, intended for the UE and a HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4, TTI 5, TTI 6, TTI 14, TTI 15 or TTI 16 is {4};

for the special subframe configuration 1, 2, 3, 4, 6, 7 or 8, in case that the TTIs are numbered sequentially in the radio frame starting from 0, upon detection of the PDSCH transmission or the PDCCH/EPDCCH indicating the downlink SPS release in the TTI n−k, where $k \in K'$, intended for the UE and the HARQ-ACK response for the PDSCH transmission or the PDCCH/EPDCCH indicating the downlink SPS release is to be provided, the UE transmits the HARQ-ACK response in the uplink TTI n; a value of the K' corresponding to the feedback TTI comprises: the K' corresponding to TTI 4, TTI 5, TTI 6, TTI 7, TTI 14, TTI 15, TTI 16 or TTI 17 is {4}.

5. A piece of communication equipment for determining a hybrid automatic repeat request (HARQ) feedback timing, comprising a processor and a memory storing computer-readable operation instructions, wherein when the computer-readable operation instructions in the memory are run, the processor is configured to:

determine a configuration of a currently-used time division duplex (TDD) frame structure;

determine a length of a currently-used transmission time interval (TTI); and determine, according to the configuration of the TDD frame structure and the length of the TTI, a relative position association between a data transmission TTI and a feedback TTI of the data transmission TTI in an HARQ process, or a relative position association between an initial transmission TTI, a feedback TTI and a retransmission TTI in an HARQ process, wherein the processor is further configured to:

in each radio frame, number sequentially all TTIs comprised in the radio frame; the relative position association between the feedback TTI and the data transmission TTI comprises an TTI interval between the feedback TTI and the data transmission TTI;

or, in each subframe, number sequentially all TTIs comprised in the subframe; the relative position association between the feedback TTI and the data transmission TTI comprises: a subframe interval between the feedback TTI and the data transmission TTI, a number of the feedback TTI in a subframe where the feedback TTI is located, and a number of the data transmission TTI in a subframe where the data transmission TTI is located.

6. The piece of communication equipment according to claim 5, wherein the processor is further configured to:

determine a position of the initial transmission TTI in each HARQ process, select, according to a preset feedback retransmission time association, select the feedback TTI and the retransmission TTI in the HARQ process from the TDD frame structure; and obtain the relative position association between the data transmission TTI and the feedback TTI of the data transmission TTI in the HARQ process, or the relative position association between the initial transmission TTI, the feedback TTI and the retransmission TTI the HARQ process, wherein data of no more than one HARQ process is transmitted in one TTI; the preset feedback retransmission time association comprises: an interval between the feedback TTI and the initial transmission TTI is greater than a first threshold, and an interval between the feedback TTI and the retransmission TTI is greater than a second threshold.

7. The piece of communication equipment according to claim 5, wherein, when the length of the TTI is 0.5 ms, the configuration of the TDD frame structure is uplink-downlink configuration 0 of the LTE TDD, for special subframe configuration 0, 5, 9 or 10, in case that the TTIs are numbered sequentially in a radio frame starting from 0, an HARQ feedback of a PDSCH or a physical downlink control channel (PDCCH)/enhanced physical downlink control channel (EPDCCH) indicating a semi-persistent scheduling (SPS) release which is transmitted in a downlink TTI n−k and intended for the UE, wherein k∈K', is performed in an uplink TTI n; values of the feedback timing K' comprise: a value of the K' corresponding to TTI 4, TTI 5, TTI 6, TTI 14, TTI 15 or TTI 16 is 4;

for the special subframe configuration 1, 2, 3, 4, 6, 7 or 8, in case that the TTIs are numbered sequentially in the radio frame starting from 0, the HARQ feedback of the PDSCH or the PDCCH/EPDCCH indicating the SPS release which is transmitted in the downlink TTI n−k and intended for the UE, wherein k∈K', is performed in the uplink TTI n; values of the feedback timing K' comprise: a value of the K' corresponding to TTI 4, TTI 5, TTI 6, TTI 7, TTI 14, TTI 15, TTI 16 or TTI 17 is 4.

8. The method according to claim 1, wherein when the length of the TTI is 0.5 ms, the configuration of the TDD frame structure is uplink-downlink configuration 1 of the LTE TDD, for special subframe configuration 0, 5, 9 or 10, in case that the TTIs are numbered sequentially in a radio frame starting from 0, upon detection of a PDSCH transmission or a physical downlink control channel (PDCCH)/enhanced physical downlink control channel (EPDCCH) indicating a downlink semi-persistent scheduling (SPS) release in TTI n−k, where k∈K', intended for the UE and a HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 or TTI 14 is {6, 5}, a value of K' corresponding to TTI 5, TTI 6, TTI 7, TTI 15, TTI 16 or TTI 17 is {5};

for special subframe configuration 1, 2, 3, 4, 6, 7 or 8, in case that the TTIs are numbered sequentially in the radio frame starting from 0, upon detection of the PDSCH transmission or the PDCCH/EPDCCH indicating the downlink SPS release in the TTI n−k, where k∈K', intended for the UE and the HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 or TTI 14 is {6, 5}, a value of K' corresponding to TTI 5 or TTI 15 is {5, 4}, a value of K' corresponding to TTI 6, TTI 7, TTI 16 or TTI 17 is {4}.

9. The method according to claim 1, wherein when the length of the TTI is 0.5 ms, the configuration of the TDD frame structure is uplink-downlink configuration 2 of the LTE TDD, for special subframe configuration 0, 5, 9 or 10, in case that the TTIs are numbered sequentially in a radio frame starting from 0, upon detection of a PDSCH transmission or a physical downlink control channel (PDCCH)/enhanced physical downlink control channel (EPDCCH) indicating a downlink semi-persistent scheduling (SPS) release in TTI n−k, where k∈K', intended for the UE and a HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 or TTI 14 is {12, 8, 7, 6}, a value of K' corresponding to TTI 5 or TTI 15 is {6, 5, 4};

for special subframe configuration 1, 2, 3, 4, 6, 7 or 8, in case that the TTIs are numbered sequentially in the radio frame starting from 0, upon detection of the PDSCH transmission or the PDCCH/EPDCCH indicating the downlink SPS release in the TTI n−k, where k∈K', intended for the UE and the HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 or TTI 14 is {12, 11, 8, 7}, a value of K' corresponding to TTI 5 or TTI 15 is {7, 6, 5, 4}.

10. The method according to claim 1, wherein when the length of the TTI is 0.5 ms, the configuration of the TDD frame structure is uplink-downlink configuration 3 of the LTE TDD, for special subframe configuration 0, 5, 9 or 10, in case that the TTIs are numbered sequentially in a radio frame starting from 0, upon detection of a PDSCH transmission or a physical downlink control channel (PDCCH)/enhanced physical downlink control channel (EPDCCH) indicating a downlink semi-persistent scheduling (SPS) release in TTI n−k, where k∈K', intended for the UE and a HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 is {14, 13, 12}, a value of K' corresponding to TTI 5 is {12, 11}, a value of K' corresponding to TTI 6 is {11, 10}, a value of K' corresponding to TTI 7 is {10, 9}, a value of K' corresponding to TTI 8 is {9, 8}, a value of K' corresponding to TTI 9 is {8, 7};

for special subframe configuration 1, 2, 3, 4, 6, 7 or 8, in case that the TTIs are numbered sequentially in the radio frame starting from 0, upon detection of the PDSCH transmission or the PDCCH/EPDCCH indicating the downlink SPS release in the TTI n−k, where k∈K', intended for the UE and the HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 is {14, 13, 12}, a value of K' corresponding to TTI 5 is {12, 11, 10}, a value of K' corresponding to TTI 6 is {10, 9}, a value of K' corresponding to TTI 7 is {9, 8}, a value of K' corresponding to TTI 8 is {8, 7}, a value of K' corresponding to TTI 9 is {7, 6}.

11. The method according to claim 1, wherein when the length of the TTI is 0.5 ms, the configuration of the TDD frame structure is uplink-downlink configuration 4 of the LTE TDD, for special subframe configuration 0, 5, 9 or 10, in case that the TTIs are numbered sequentially in a radio frame starting from 0, upon detection of a PDSCH transmission or a physical downlink control channel (PDCCH)/enhanced physical downlink control channel (EPDCCH) indicating a downlink semi-persistent scheduling (SPS) release in TTI n−k, where k∈K', intended for the UE and a HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 is {16, 15, 14, 13}, a value of K' corresponding to TTI 5 is {13, 12, 11, 10}, a value of K' corresponding to TTI 6 is {10, 9, 8, 7}, a value of K' corresponding to TTI 7 is {7, 6, 5};

for special subframe configuration 1, 2, 3, 4, 6, 7 or 8, in case that the TTIs are numbered sequentially in the radio frame starting from 0, upon detection of the PDSCH transmission or the PDCCH/EPDCCH indicating the downlink SPS release in the TTI n−k, where k∈K', intended for the UE and the HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 is {16, 15, 14, 13}, a value of K' corresponding to TTI 5 is {13, 12, 11, 10}, a value of K' corresponding to TTI 6 is {10, 9, 8, 7}, a value of K' corresponding to TTI 7 is {7, 6, 5, 4}.

12. The method according to claim 1, wherein when the length of the TTI is 0.5 ms, the configuration of the TDD frame structure is uplink-downlink configuration 5 of the LTE TDD, for special subframe configuration 0, 5, 9 or 10, in case that the TTIs are numbered sequentially in a radio frame starting from 0, upon detection of a PDSCH transmission or a physical downlink control channel (PDCCH)/enhanced physical downlink control channel (EPDCCH) indicating a downlink semi-persistent scheduling (SPS) release in TTI n−k, where k∈K', intended for the UE and a HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 is {22, 18, 17, 16, 15, 14, 13, 12, 11}, a value of K' corresponding to TTI 5 is {11, 10, 9, 8, 7, 6, 5, 4};

for special subframe configuration 1, 2, 3, 4, 6, 7 or 8, in case that the TTIs are numbered sequentially in the radio frame starting from 0, upon detection of the PDSCH transmission or the PDCCH/EPDCCH indicating the downlink SPS release in the TTI n−k, where k∈K', intended for the UE and the HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 is {22, 21, 18, 17, 16, 15, 14, 13, 12}, a value of K' corresponding to TTI 5 is {12, 11, 10, 9, 8, 7, 6, 5, 4}.

13. The method according to claim 1, wherein when the length of the TTI is 0.5 ms, the configuration of the TDD frame structure is uplink-downlink configuration 6 of the LTE TDD, for special subframe configuration 0, 5, 9 or 10, in case that the TTIs are numbered sequentially in a radio frame starting from 0, upon detection of a PDSCH transmission or a physical downlink control channel (PDCCH)/enhanced physical downlink control channel (EPDCCH) indicating a downlink semi-persistent scheduling (SPS) release in TTI n−k, where k∈K', intended for the UE and a HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4, TTI 5, TTI 6, TTI 7 or TTI 8 is {6}, a value of K' corresponding to TTI 14, TTI 15 or TTI 16 is {4};

for special subframe configuration 1, 2, 3, 4, 6, 7 or 8, in case that the TTIs are numbered sequentially in the radio frame starting from 0, upon detection of the PDSCH transmission or the PDCCH/EPDCCH indicating the downlink SPS release in the TTI n−k, where k∈K', intended for the UE and the HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4, TTI 5, TTI 6, TTI 7, TTI 8 or TTI 9 is {6}, a value of K' corresponding to TTI 14, TTI 15, TTI 16 or TTI 17 is {4}.

14. The communication equipment according to claim 5, wherein when the length of the TTI is 0.5 ms, the configuration of the TDD frame structure is uplink-downlink configuration 1 of the LTE TDD, for special subframe configuration 0, 5, 9 or 10, in case that the TTIs are numbered sequentially in a radio frame starting from 0, upon detection of a PDSCH transmission or a physical downlink control channel (PDCCH)/enhanced physical downlink control channel (EPDCCH) indicating a downlink semi-persistent scheduling (SPS) release in TTI n−k, where k∈K', intended for the UE and a HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 or TTI 14 is {6, 5}, a value of K' corresponding to TTI 5, TTI 6, TTI 7, TTI 15, TTI 16 or TTI 17 is {5};

for special subframe configuration 1, 2, 3, 4, 6, 7 or 8, in case that the TTIs are numbered sequentially in the radio frame starting from 0, upon detection of the PDSCH transmission or the PDCCH/EPDCCH indicating the downlink SPS release in the TTI n−k, where k∈K', intended for the UE and the HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 or TTI 14 is {6, 5}, a value of K' corresponding to TTI 5 or TTI 15 is {5, 4}, a value of K' corresponding to TTI 6, TTI 7, TTI 16 or TTI 17 is {4}.

15. The communication equipment according to claim 5, wherein when the length of the TTI is 0.5 ms, the configuration of the TDD frame structure is uplink-downlink configuration 2 of the LTE TDD, for special subframe configuration 0, 5, 9 or 10, in case that the TTIs are numbered sequentially in a radio frame starting from 0, upon detection of a PDSCH transmission or a physical downlink control channel (PDCCH)/enhanced physical downlink control channel (EPDCCH) indicating a downlink semi-persistent scheduling (SPS) release in TTI n−k, where k∈K', intended for the UE and a HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 or TTI 14 is {12, 8, 7, 6}, a value of K' corresponding to TTI 5 or TTI 15 is {6, 5, 4};

for special subframe configuration 1, 2, 3, 4, 6, 7 or 8, in case that the TTIs are numbered sequentially in the radio frame starting from 0, upon detection of the PDSCH transmission or the PDCCH/EPDCCH indicating the downlink SPS release in the TTI n−k, where k∈K', intended for the UE and the HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 or TTI 14 is {12, 11, 8, 7}, a value of K' corresponding to TTI 5 or TTI 15 is {7, 6, 5, 4}.

16. The communication equipment according to claim 5, wherein when the length of the TTI is 0.5 ms, the configuration of the TDD frame structure is uplink-downlink configuration 3 of the LTE TDD, for special subframe configuration 0, 5, 9 or 10, in case that the TTIs are numbered sequentially in a radio frame starting from 0, upon detection of a PDSCH transmission or a physical downlink control channel (PDCCH)/enhanced physical downlink control channel (EPDCCH) indicating a downlink semi-persistent scheduling (SPS) release in TTI n−k, where k∈K', intended for the UE and a HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 is {14, 13, 12}, a value of K' corresponding to TTI 5 is {12, 11}, a value of K' corresponding to TTI 6 is {11, 10}, a value of K' corresponding to TTI 7 is {10, 9}, a value of K' corresponding to TTI 8 is {9, 8}, a value of K' corresponding to TTI 9 is {8, 7};

for special subframe configuration 1, 2, 3, 4, 6, 7 or 8, in case that the TTIs are numbered sequentially in the radio frame starting from 0, upon detection of the PDSCH transmission or the PDCCH/EPDCCH indicating the downlink SPS release in the TTI n−k, where k∈K', intended for the UE and the HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 is {14, 13, 12}, a value of K' corresponding to TTI 5 is {12, 11, 10}, a value of K' corresponding to TTI 6 is {10, 9}, a value of K' corresponding to TTI 7 is {9, 8}, a value of K' corresponding to TTI 8 is {8, 7}, a value of K' corresponding to TTI 9 is {7, 6}.

17. The communication equipment according to claim 5, wherein when the length of the TTI is 0.5 ms, the configuration of the TDD frame structure is uplink-downlink configuration 4 of the LTE TDD, for special subframe configuration 0, 5, 9 or 10, in case that the TTIs are numbered sequentially in a radio frame starting from 0, upon detection of a PDSCH transmission or a physical downlink control channel (PDCCH)/enhanced physical downlink control channel (EPDCCH) indicating a downlink semi-persistent scheduling (SPS) release in TTI n−k, where k∈K', intended for the UE and a HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 is {16, 15, 14, 13}, a value of K' corresponding to TTI 5 is {13, 12, 11, 10}, a value of K' corresponding to TTI 6 is {10, 9, 8, 7}, a value of K' corresponding to TTI 7 is {7, 6, 5};

for special subframe configuration 1, 2, 3, 4, 6, 7 or 8, in case that the TTIs are numbered sequentially in the radio frame starting from 0, upon detection of the PDSCH transmission or the PDCCH/EPDCCH indicating the downlink SPS release in the TTI n−k, where k∈K', intended for the UE and the HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 is {16, 15, 14, 13}, a value of K' corresponding to TTI 5 is {13, 12, 11, 10}, a value of K' corresponding to TTI 6 is {10, 9, 8, 7}, a value of K' corresponding to TTI 7 is {7, 6, 5, 4}.

18. The communication equipment according to claim 5, wherein when the length of the TTI is 0.5 ms, the configuration of the TDD frame structure is uplink-downlink configuration 5 of the LTE TDD, for special subframe configuration 0, 5, 9 or 10, in case that the TTIs are numbered sequentially in a radio frame starting from 0, upon detection of a PDSCH transmission or a physical downlink control channel (PDCCH)/enhanced physical downlink control channel (EPDCCH) indicating a downlink semi-persistent scheduling (SPS) release in TTI n−k, where k∈K', intended for the UE and a HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 is {22, 18, 17, 16, 15, 14, 13, 12, 11}, a value of K' corresponding to TTI 5 is {11, 10, 9, 8, 7, 6, 5, 4};

for special subframe configuration 1, 2, 3, 4, 6, 7 or 8, in case that the TTIs are numbered sequentially in the radio frame starting from 0, upon detection of the PDSCH transmission or the PDCCH/EPDCCH indicating the downlink SPS release in the TTI n−k, where k∈K', intended for the UE and the HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4 is {22, 21, 18, 17, 16, 15, 14, 13, 12}, a value of K' corresponding to TTI 5 is {12, 11, 10, 9, 8, 7, 6, 5, 4}.

19. The communication equipment according to claim 5, wherein when the length of the TTI is 0.5 ms, the configuration of the TDD frame structure is uplink-downlink configuration 6 of the LTE TDD, for special subframe configuration 0, 5, 9 or 10, in case that the TTIs are numbered sequentially in a radio frame starting from 0, upon detection of a PDSCH transmission or a physical downlink control channel (PDCCH)/enhanced physical downlink control channel (EPDCCH) indicating a downlink semi-persistent scheduling (SPS) release in TTI n−k, where k∈K', intended for the UE and a HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4, TTI 5, TTI 6, TTI 7 or TTI 8 is {6}, a value of K' corresponding to TTI 14, TTI 15 or TTI 16 is {4};

for special subframe configuration 1, 2, 3, 4, 6, 7 or 8, in case that the TTIs are numbered sequentially in the radio frame starting from 0, upon detection of the PDSCH transmission or the PDCCH/EPDCCH indicating the downlink SPS release in the TTI n−k, where k∈K', intended for the UE and the HARQ-ACK response for the PDSCH transmission or the PDCCH/EPDCCH indicating the downlink SPS release is to be provided, the UE transmits the HARQ-ACK response in the uplink TTI n; values of the K' corresponding to different feedback TTIs comprise: a value of K' corresponding to TTI 4, TTI 5, TTI 6, TTI 7, TTI 8 or TTI 9 is {6}, a value of K' corresponding to TTI 14, TTI 15, TTI 16 or TTI 17 is {4}.

* * * * *